METHOD AND APPARATUS FOR PROTECTING VEHICLE LOADS

Filed Dec. 3, 1959 25 Sheets-Sheet 1

Inventor
William H. Peterson
By Mann, Brown & McWilliams.
Attys.

INVENTOR.
William H. Peterson
BY
Mann, Brown & McWilliams,
Attys.

Oct. 10, 1961 W. H. PETERSON 3,003,436

METHOD AND APPARATUS FOR PROTECTING VEHICLE LOADS

Filed Dec. 3, 1959 25 Sheets-Sheet 3

Inventor
William H. Peterson
By Mann, Brown & McWilliams.
Attys.

METHOD AND APPARATUS FOR PROTECTING VEHICLE LOADS

Filed Dec. 3, 1959 25 Sheets-Sheet 4

Inventor
William H. Peterson

By Mann, Brown & Mc Williams
Attys.

METHOD AND APPARATUS FOR PROTECTING VEHICLE LOADS

Filed Dec. 3, 1959 25 Sheets-Sheet 5

INVENTOR.
William H. Peterson
BY
Mann, Brown & McWilliams,
Attys.

METHOD AND APPARATUS FOR PROTECTING VEHICLE LOADS

INVENTOR.
William H. Peterson
BY
Mann, Brown & Mc Williams
Attys

CARTON FORCES PER LAYER

END WALL ONLY

TOP LAYER —— $F_{TE}$

MIDDLE LAYER —— $F_{ME}$

BOTTOM LAYER — $F_{BE}$ $F_c$ = CUSHION OR COUPLER FORCE $F_H$ = HORIZONTAL FORCE ON A SINGLE CARTON $F_V$ = VERTICAL FORCE ON A SINGLE CARTON

INVENTOR.
WILLIAM H. PETERSON
BY
Mann, Brown & McWilliams
ATTORNEYS

INVENTOR.
WILLIAM H. PETERSON
BY
Munson, Brown & McWilliams
ATTORNEYS

INVENTOR.
WILLIAM H. PETERSON
BY
Mann, Brown + McWilliams,
ATTORNEYS

METHOD AND APPARATUS FOR PROTECTING VEHICLE LOADS

Filed Dec. 3, 1959 25 Sheets-Sheet 10

INVENTOR.
WILLIAM H. PETERSON
BY
Mann, Brown + McWilliams
ATTORNEYS

Oct. 10, 1961 W. H. PETERSON 3,003,436

METHOD AND APPARATUS FOR PROTECTING VEHICLE LOADS

Filed Dec. 3, 1959 25 Sheets-Sheet 11

*INVENTOR.*
WILLIAM H. PETERSON
*BY*
*Mann, Brown & McWilliams*
ATTORNEYS

Oct. 10, 1961 W. H. PETERSON 3,003,436

METHOD AND APPARATUS FOR PROTECTING VEHICLE LOADS

Filed Dec. 3, 1959 25 Sheets-Sheet 12

THEORETICAL PEAK LADING FORCE AND CUSHION STROKE TIME DURATION FOR VARIOUS LENGTHS OF CUSHION TRAVEL AT 10 M.P.H. IMPACTS

INVENTOR.
WILLIAM H. PETERSON
BY
Mann, Brown & McWilliams.
ATTORNEYS

Oct. 10, 1961 W. H. PETERSON 3,003,436

METHOD AND APPARATUS FOR PROTECTING VEHICLE LOADS

Filed Dec. 3, 1959 25 Sheets-Sheet 13

*INVENTOR.*
WILLIAM H. PETERSON
*BY*
Mann, Brown & McWilliams
ATTORNEYS

Oct. 10, 1961 W. H. PETERSON 3,003,436

METHOD AND APPARATUS FOR PROTECTING VEHICLE LOADS

Filed Dec. 3, 1959 25 Sheets-Sheet 14

INVENTOR.
WILLIAM H. PETERSON
BY
Mann, Brown & McWilliams.
ATTORNEYS

INVENTOR.
WILLIAM H. PETERSON
BY
Mann, Brown & McWilliams
ATTORNEYS

Oct. 10, 1961 W. H. PETERSON 3,003,436

METHOD AND APPARATUS FOR PROTECTING VEHICLE LOADS

Filed Dec. 3, 1959 25 Sheets-Sheet 16

INVENTOR.
WILLIAM H. PETERSON
BY
Mann, Brown & McWilliams
ATTORNEYS

| CUSHION TRAVEL (INCH) | IMPACT SPEED (M.P.H.) | SPEED OF LADING AFTER IMPACT FT/SEC. | MOMENTUM OF LADING AFTER IMPACT (LB.-SEC.) | IMPULSE DELIVERED BY END WALL (LB.-SEC.) | % OF TOTAL IMPULSE |
|---|---|---|---|---|---|
| 30.4 | 9.6 | 8.7 | 13,900 | 2970 | 21.4 |
| 25.1 | 9.7 | 8.8 | 14,000 | 3740 | 26.7 |
| 22.1 | 9.6 | 8.7 | 13,900 | 5750 | 41.4 |
| 19.0 | 9.5 | 8.6 | 13,700 | 9670 | 70.6 |

% OF TOTAL MOMENTUM DELIVERED TO LADING BY IMPULSE AT END WALL FOR A SERIES OF IMPACTS AT AN AVERAGE SPEED OF 9.6 M.P.H.

Inventor
William H. Peterson
By Mann, Brown & McWilliams
Attys.

METHOD AND APPARATUS FOR PROTECTING VEHICLE LOADS

| FORCE TOP LAYER (LBS) | FORCE BOTTOM (LBS) | AVERAGE FORCE (LBS) | AVERAGE TOTAL FORCE (LBS) | CUSH. TRAVEL (INCHES) | ACCEL. $A_1$ (g's) |
|---|---|---|---|---|---|
| 1645 | 1655 | 1650 | 8240 | 30.4 | .161 |
| 2610 | 2660 | 2635 | 13160 | 25.1 | .257 |
| 4750 | 5875 | 5312 | 26,000 | 22.1 | .508 |
| 9750 | 10,125 | 9937 | 99,600 | 19.0 | .969 |

ACCELERATION OF LOAD DUE TO END WALL PRESSURE FOR SERIES OF 9.6 M.P.H. IMPACTS

Inventor
William H. Peterson.
By Mann, Brown & Mc Williams
Attys.

METHOD AND APPARATUS FOR PROTECTING VEHICLE LOADS

Filed Dec. 3, 1959 25 Sheets-Sheet 19

INVENTOR.
William H. Peterson
BY
Mann, Brown & Mc Williams
Attys.

Inventor
William H. Peterson
By Mann, Brown & Mc Williams.
Attys.

METHOD AND APPARATUS FOR PROTECTING VEHICLE LOADS

Filed Dec. 3, 1959

25 Sheets-Sheet 21

INVENTOR.
William H. Peterson
BY
Munn, Brown & McWilliams.
Attys.

Oct. 10, 1961 W. H. PETERSON 3,003,436

METHOD AND APPARATUS FOR PROTECTING VEHICLE LOADS

Filed Dec. 3, 1959 25 Sheets-Sheet 22

INVENTOR.
William H. Peterson
BY
Mann, Brown & McWilliams,
Attys.

METHOD AND APPARATUS FOR PROTECTING VEHICLE LOADS

INVENTOR.
William H. Peterson
BY
Mann, Brown & McWilliams
Attys.

METHOD AND APPARATUS FOR PROTECTING VEHICLE LOADS

Inventor
William H. Peterson
By
Mann, Brown & McWilliams.
Attys.

METHOD AND APPARATUS FOR PROTECTING VEHICLE LOADS

Filed Dec. 3, 1959

Inventor
William H. Peterson
By
Mann, Brown & McWilliams.
Attys

United States Patent Office 3,003,436

Patented Oct. 10, 1961

3,003,436

METHOD AND APPARATUS FOR PROTECTING VEHICLE LOADS

William H. Peterson, Homewood, Ill., assignor to Pullman Incorporated, Chicago, Ill., a corporation of Delaware Filed Dec. 3, 1959, Ser. No. 856,963
27 Claims. (Cl. 105—454)

This invention provides a new approach to the problem of damage to lading in transit, and is particularly directed to the protection of lading while being transported in or on railway cars.

While the problem, my work in solving it, and the solution afforded by this invention are closely associated with, and will be discussed in connection with, railroad freight shipment, it will be obvious that the invention has broader aspects and its benefits can be applied to various types of passenger-carrying vehicles as well as freight-carrying vehicles.

Statistics show that during the year 1957 the United States railroads paid out in lading damage claims a total of $116,213,191.00. Approximately one-third of this amount (namely, $38,700,000.00) can be attributed to damage claims for commodities packed in fibre boxes and like containers (which are included within a class which I call "resilient lading") even though this type of commodity accounts for only one-fifth of the gross freight revenue. Furthermore, a large part of the damage to this lading is the result of impact during switching operations.

Obviously, the lading damage problem is of long standing, and many attempts have been made to solve it. It has generally been thought that reducing forces transmitted to the car by the coupler during switching operations was a key to the solution in that this should result in a proportionate reduction in lading damage. As an indication of this, on page 727 of Car Builders' Cyclopedia, 20th edition, published in 1957 by Simmons-Boardman Publishing Corporation, the Waugh Cushion Underframe is described, and the following statement is made concerning its advantages:

"Where cars are cushioned by means of the Waugh Cushion Underframe, forces transmitted to the car structure are much lower at all speeds of impact than is the case with conventional gears.

"This is illustrated in the chart above which shows the peak coupler forces for impacts of 50-ton box cars loaded to 169,000 lb. on the rail and equipped with various types of cushioning devices. In all impacts the hammer car was equipped with a friction draft gear.

"Since a coupler force of 500,000 lb. is considered maximum for assurance of damage-free lading, the extra protection afforded by the Cushion Underframe is noteworthy. Even where impacts exceed 10 m.p.h., coupler force for the supercushion underframe is well below the damage zone."

I have found, by examining damage reports, that there are many instances in which lading has been damaged when the coupler forces are relatively low and other cases where lading has not been damaged when the coupler forces are relatively high. This led me to believe that reduction in coupler forces, in and of itself, was not the solution to the lading damage problem. It occurred to me that there must be some relationship between the particular type of lading being carried and the forces acting on the car, and I suspected that resilient lading, as hereinafter defined, must be considered in a different light from what I shall term "rigid lading," namely, lading which has inherent rigidity or substantial non-compressibility, such as structural clay tile units, brick, structural steel, lumber, machinery and the like.

In order to clearly understand what is meant by "resilient lading" as distinguished from "rigid lading," it may be said that "resilient lading" is always characterized by some measure of compressibility, and perhaps the most common type of "resilient lading" is that which is packed in boxes or containers which have a tendency to compress when subjected to load and then spring back to essentially their original form when the load is released, thus creating an oscillatory system similar to a mass suspended between springs. The extent to which the containers recover their original form after compaction depends upon the extent of compaction and whether the containers are merely flexed rather than crushed during initial loading. Experience has taught that fibre boxes, particularly those of the corrugated type, may compress as much as ½ inch per box when subjected to end loading, without damaging the contents; and, obviously, when this compaction is multiplied by the number of boxes making up a horizontal layer of the goods being shipped, the amplitude of the oscillatory system becomes very substantial. The term "resilient lading," however, includes other forms of compressible or semi-compressible lading, such as granulated or pulverized material packed in bags or sacks, and, in general, it may be said that "resilient lading" includes any form of compressible lading which if over-compacted results in damage to the lading itself, or impairs its usefulness.

Inasmuch as this invention is applicable to both resilient and rigid lading, as will later be made evident, and inasmuch as, in some instances, it is difficult to categorize a particular lading as either resilient or rigid lading, it is convenient to use the term "shiftable lading" as generic to both resilient and rigid lading. By shiftable lading is meant lading which, whether used with tie downs or not, has a tendency to shift its position with respect to the support which carries it when the car carrying the support is subjected to longitudinal impacts of substantial magnitude.

Cushion underframe cars have long been considered a possible answer to the lading damage problem, but even though these cushion underframe cars have frequently had what has been known as "long travel cushion units" of from 8 inches to 10 or 11 inches, experience has shown that these cars have not solved the problem, and, in some instances, it has even been found that with certain kinds of lading, more damage to lading has been experienced with the cushion underframe car than with standard or conventional cars provided with draft gears. For example, impact tests where a standard car and an 8 inch travel cushion underframe car were both loaded identically with first a load of clay building tile and then a load of glass bottled goods in fibre cartons, showed that while the coupler forces in the cushion underframe car were substantially less than in the standard car for both classes of load, the cushion car in certain instances actually showed more damage to the bottled goods than did the standard car.

The fact is that up to the time the present invention was made, there has been no satisfactory solution to the lading damage problem, and this is evidenced by the fact that as late as November 11, 1957, in the Official Proceedings of the Canadian Railway Club, under that date, at page 6, may be found the following admission that the problem of lading damage is far from being solved:

"The need for more adequate protection to cars and lading has long been recognized by all concerned and efforts are constantly being made to achieve this objective. The overall problem is one of considerable complexity and although many benefits have been derived in recent years, no entirely satisfactory solution has been found.

"The vastly improved riding characteristics of freight car trucks have practically eliminated lading damage caused by vertical and lateral shocks. Improved car loading techniques have also contributed to a further reduction of lading damage. Another contribution has been made with more efficient cushioning devices designed to alleviate the damaging effects of longitudinal shocks.

"However, despite these benefits, the problem of reducing longitudinal shocks is still a long way from being satisfactorily solved. Much more concentrated study and exploration is necessary before this objective can be achieved."

Publications showing typical efforts to solve the problem are as follows:

A Mathematical Law of Impact Between Cars, E. M. Richards, Railway Mechanical Engineer, November and December 1923, volume 97, pp. 760–762 and 817–819.

Development in High Capacity Shock Absorbers and Buffers, A. P. Fitzjohn, Bulletin of the Int. Railway Congress Association, January 1956, pp. 78–82.

Southern Pacific Box Car Underframe Has Hydraulic Squeeze to Ease Shocks, Railway Freight Traffic, July 1957, p. 21.

Vibration and Shock in Freight Cars as Causes of Lading Damage, James C. Settles, Transactions of the ASME, November 1958, pp. 1622–28, volume 80.

Santa Fe Builds 100 Shock Control Cars, Railway Locomotives and Cars, October 1958, pp. 21, 22.

Pullman-Standard Advertisement A–9627, Railway Age, January 10, 1955, vol. 138, pp. 51–56.

Obviously, solutions to the general problem, to be practical, must effect a substantial reduction in lading damage claims, and since resilient lading accounts for one-third of all damage claim payments, the elimination of damage to this class of lading necessarily would reduce total damage claim payments by a substantial amount. Furthermore, if resilient lading can be protected, rigid lading is also protected.

It is, therefore, a principal object of my invention to provide methods and apparatus that are specifically designed for the protection of resilient lading, although they will also afford maximum protection for other less critical types of lading, with consequent further savings in damage claim payments.

Some effort has been made in the past to reduce lading damage, particularly in the case of resilient lading, by the use of compartmentizers or other load-subdividing devices, and while they have been effective to some extent in reducing the percentage of loss, their costs have restricted their use in attempting to solve the problem. Furthermore, these load-subdividing devices, in some instances at least, make loading and unloading more difficult and reduce the total capacity of the car.

It was generally accepted at the time I made my invention that 10 inches of cushion travel was about the maximum that would accomplish any useful result, and that any length of travel of a practical nature beyond 10 inches would have little effect in lessening lading damage.

I conceived the idea that in the case of resilient lading the inherent stability of the vertical tiers of containers and frictional forces acting between the containers and the floor and sides of the car and the containers themselves could or might be an important factor in the solution of the problem. The term "inherent stability of the vertical tiers of containers" refers to the tendency of any vertical stack of rectangular boxes to resist tipping until the horizontal forces applied to the center of gravity of each box in the tier exceed a given amount.

I reasoned that when lading is set into motion by a car body, it is accomplished by two basic mechanisms: (1) by pressure of the car end wall against the end of the load; and (2) by frictional contact of the floor and sides of the car with the load. It then occurred to me that by using substantially longer travel than had heretofore been considered feasible, I might possibly make use of these frictional forces and the inherent stability of the tiers in protecting the lading. In a series of experiments which I thereafter conducted for the purpose of analyzing the forces acting upon resilient lading under excessive car impact, I found that coupler forces may be reduced by as much as eight-fold by extending travel to say 19 inches and yet the destructive forces from 10 mile per hour impacts acting upon resilient lading (which, for convenience, may be called the "lading forces") are still at levels causing high damage to certain types of resilient lading, as for example glass bottles as shown in FIGURE 19. This confirmed my impression that a reduction in coupler force alone, would not solve the problem.

When, in my experiments, I increased the cushion travel to approximately 20 inches and beyond, I found that there was a sharp and unexpected reduction of lading force which tended to verify my belief that the friction forces between containers and with respect to the bottom and sides of the car and the inherent stability of the tiers of cartons were, in fact, related to the lading forces themselves.

For example, I found that in a group of impacts conducted at speeds of 9.6 miles per hour, employing as lading canned goods packaged in fibre cartons, the coupler force was found to be only about 107,500 lb. when cushion travel was extended to 19 inches. This is in comparison with values of 900,000 to 1,000,000 lb., of coupler force found in a standard car at this speed, and obviously represents a drastic reduction in coupler force. However, when lading forces were measured with the 19 inch travel cushion unit, they were found to still be well into the damage range with values averaging 1475 lb./ft.$^2$ compared with 1000 lb./ft.$^2$ which previous static tests had shown would cause damage to gallon glass bottled goods, though in this instance lading forces were below the level of lading force generally supposed to cause damage to canned goods, namely 2,000 lb./ft.$^2$. When the cushion travel was extended to approximately 30 inches, coupler forces were only reduced to 74,500 lb. which is not very spectacular after considering the reduction from 1,000,000 to 107,500 lb. However, despite this relatively small decrease in coupler force, lading forces experienced a remarkable decrease by dropping to only 245 lb./ft.$^2$, a six-fold reduction. In other words, lowering the coupler force by about 30 percent in this range reduced the lading force by about 83.5 percent. In order to confirm that this was not an error in measurement, impacts were then continued at increasing speeds employing approximately 30 inches of travel, up through what may be considered a collision speed of 14.2 miles per hour, and the load under test remained undamaged. Forces continued to remain at much lower levels than any previous calculations had shown.

I also found that when cushion travel was increased up to 20 inches and beyond, there was little or no vertical bounce of the car on impact, which meant that the frictional forces could be used effectively in reducing the lading forces acting on the lading through the end wall of the car. It is obvious that any severe impacting of a car through the coupler will set up turning moments that will be reflected in elevating and lowering certain portions of the car which constitutes the vehicle pitching or vertical bouncing referred to herein.

Viewed in another way, by making use of the frictional forces available, and the stability of the tiers, I am able to use up much of the energy on impact by the work done in getting the lading to move with the car prior to the time that the cushioning unit finishes its stroke. Insofar as the stability of the tiers is concerned, the long travel cushioning has the effect of keeping the longitudinal forces acting on the centers of gravity of each box in a vertical tier within the limits which prevent tipping of the tiers with the result that there is no great buildup of longitudinal forces, particularly in the upper layers of the tiers, due to overturning effects of the individual tiers.

By extending the travel of the cushioning unit to a range of from 20 inches to 40 inches, I found, for the first time, an opportunity to use the frictional forces and the inherent stability of the container tiers as substantial factors in reducing the lading forces experienced by the lading itself. This is in contrast to the action which takes place when cushion travel on the order of 10 inches or less is used, in which, upon impact, the car pitches, the lading is jostled and bounced, and the vertical tiers of containers are upset or tilted with the result that the frictional forces are not involved.

Incidentally, an inherent advantage in overcoming vertical bounce in this manner is that is removes one of the causes of hot boxes, because it is when there is separation of the car from its journals that waste grabs are likely to occur.

I further made the important discovery that if the frictional contact is disturbed by vertical pitching and bouncing of the car, as experienced with 8 inch and 10 inch cushions, then more pressure at the end wall is required to accomplish the given motion of the lading, and what is lost in accelerating the load by friction contact must be made up by increased force at the car end which in turn causes the damage. At about 20 inches of travel the frictional forces begin to come into play in a substantial manner, and at about 30 inches of travel it appears that the frictional forces have increased to a point where they are doing most of the work of accelerating the load. Beyond approximately 30 inches of travel, the lading force begins to level off rather rapidly, and at 40 inches of travel it is apparent that further extension of the travel distance will produce very little reduction in lading force. It is interesting to note that with respect to freight car lengths of from about 30 feet to 70 feet, which may be said to be representative of the range of freight car lengths used in U.S. railroad practice, a cushion travel of about 5 percent of the car length falls, roughly, within the 20 inches to 40 inches of travel which I have found to be the effective range.

It is, therefore, an object of this invention to provide cushion travel interposed appropriately between the car coupler and the load and having a range of 20 inches to 40 inches, approximately (over and above normal draft gear travel), so that characteristics of the resilient lading itself, including the frictional forces between elements of the lading, and between the lading and the car body plus the inherent stability of the vertical tiers of containers, may be used as additional supplemental factors in reducing lading forces causing damage.

These investigations, together with further experiments, revealed also the interesting fact that if the time of closure of the cushioning unit could be delayed sufficiently to allow the resilient lading to be fully compacted against the end of the car (i.e. achieve maximum compaction) before closure of the cushioning unit took place, or before the cushioning unit completes its stroke, this becomes another factor in reducing the lading forces.

Viewed in another manner, damage free operation is obtainable if the resilient lading is put into motion as a unit through frictional forces, and maximum compaction of the lading, as a result of the impact, is achieved before the cushioning device closes, and before the car body reaches the end of the time period of its acceleration (either positive or negative), because at this latter moment and with short travel cushions, lading forces can continue to rise to high damage peaks diminished only by the motion already imparted to the lading by friction even though the impact as far as the cushion is concerned, is over with.

It is, therefore, another object of this invention to interpose a cushioning unit in a railway car between the coupler and the load having a sufficient length of travel that maximum compaction of resilient lading takes place before the cushioning unit reaches the end of its cushion travel.

Also of great importance is the fact that at 30 inches of cushioning unit travel, not only are all classes of resilient lading effectively protected, but also rigid lading may be carried without imposing excess coupler forces on the car. This is of great significance because it means that the car structure may be substantially lightened, with consequent economies in the car construction cost. Reduced forces between car ends and the lading means that the car ends may be of lighter construction. The same car structure can be used equally effectively for resilient lading and rigid lading, whereas, before, this had not been possible. The relatively long travel also reduces the rate of energy absorption and transfer sufficiently that hydraulic cushioning mechanisms can effectively be used without running into the problems always attendant with hydraulic units having short travel and consequent high pressures. Of course, other types of energy transferring and dissipating cushioning mechanisms may be used, such as friction devices, rubber devices, pneumatic devices, and combinations of all such devices, but in all such instances, dissipative energy system arrangements of such devices are contemplated except insofar as is required to return the device to its initial position after the impact energy has been transferred and/or dissipated.

A still further object of the invention, therefore, is to provide a vehicle structure capable of carrying both resisient and rigid lading, of lighter and less costly construction than is conventional, and furnishing complete protection to such lading at impact speeds up to about 12 miles per hour for the most fragile type of resilient lading.

I prefer that the cushioning device have essentially a constant force energy absorption throughout its stroke or travel during impact for maximum effectiveness, but, of course, a reasonable deviation as a result of practical design limitations can be tolerated.

It should also be understood that the cushioning mechanism may constitute a series of devices, including draft gears, a cushion underframe, or cushioning between the car body and the load, such as in containers of piggyback cars, or the cushioning mechanisms may be at any one of these places. However, the 20 inches to 40 inches of cushion travel contemplated in my invention is in addition to the 2¾ inches or thereabouts, of travel conventionally employed in draft gears.

This application is a continuation-in-part of my prior application Serial No. 797,529, filed March 5, 1959, and the entire disclosure of that application is hereby incorporated by reference to the extent that it is not inconsistent with the present disclosure.

Other objects, uses and advantages of this invention will become obvious or be apparent from a consideration of the following detailed description and the accompanying drawings.

Figure 16:
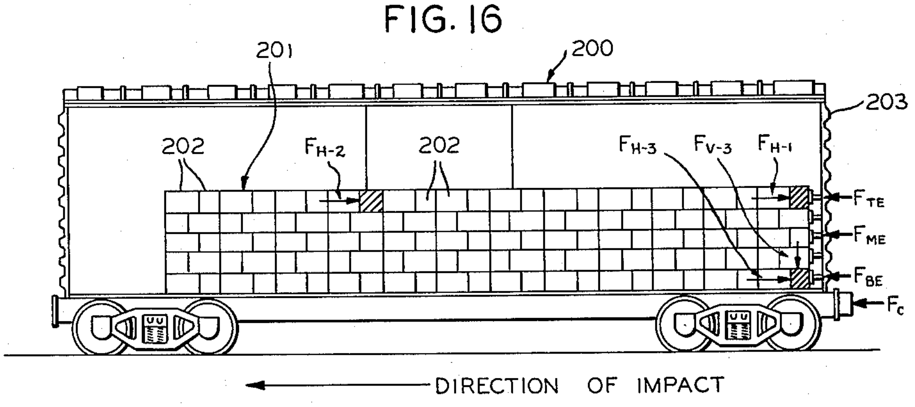
FIGURES 16 and 17 are diagrammatic vertical and horizontal sections through a railroad boxcar that was subjected to a series of longitudinal impacts in tests made on my invention, illustrating the arrangement of the lading and points of application of instrumentation employed.
Figure 17:
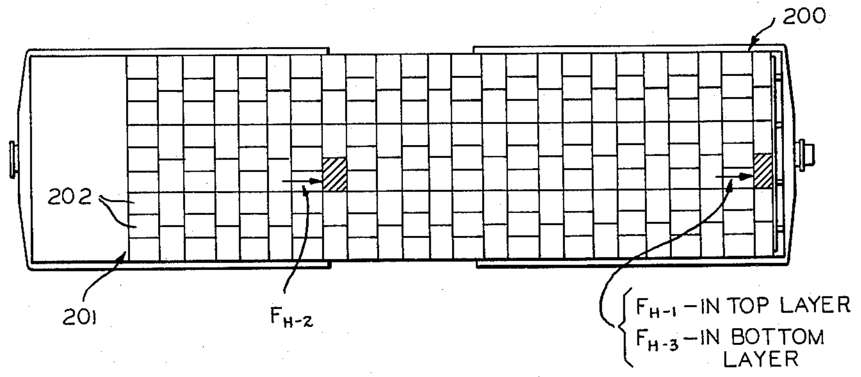
Figure 28:
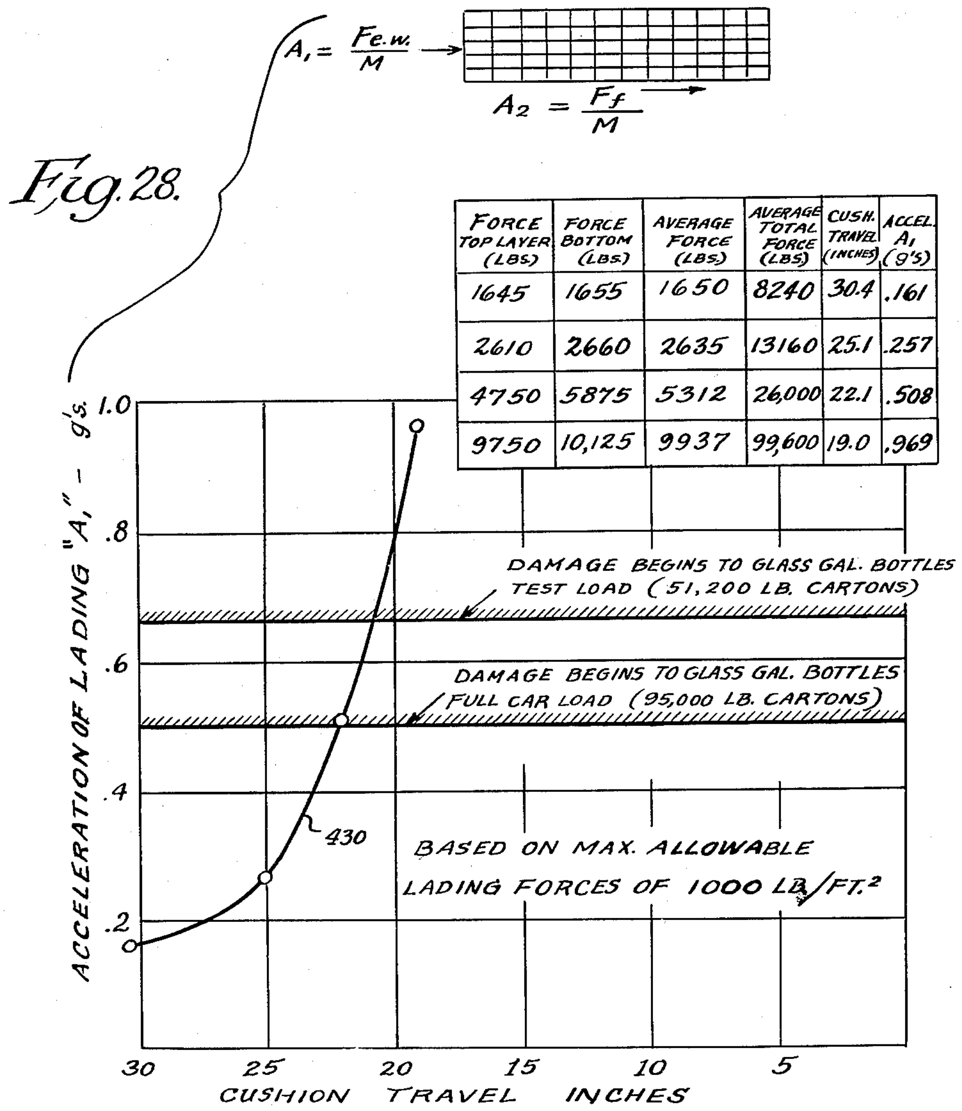
Figures 29, 30:
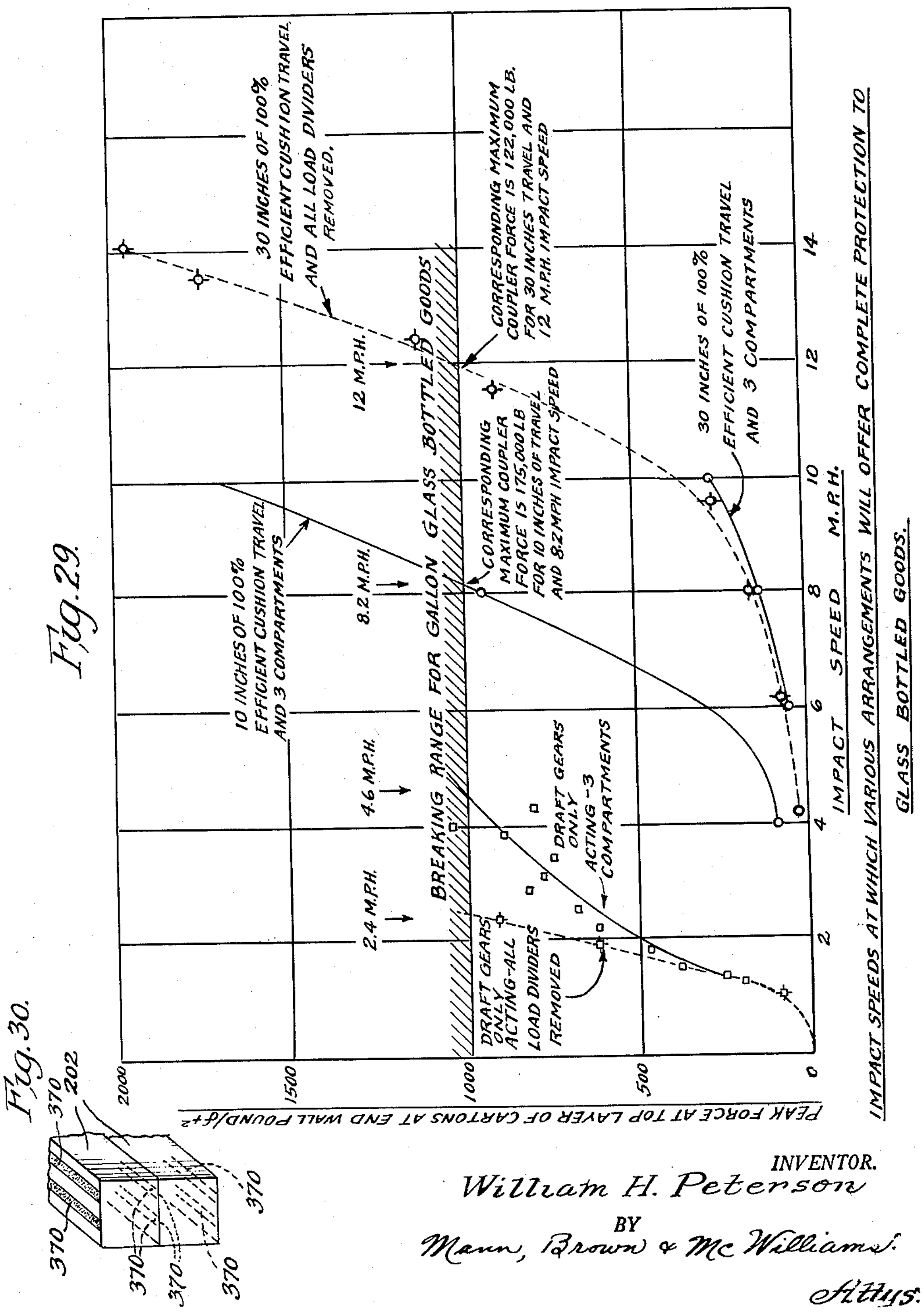

FIGURE 28 is a graph plotting lading acceleration in "g's," due to car end wall pressure, for the cushion travel lengths indicated in the accompanying chart (under the test conditions of FIGURES 16 and 17) indicating the level where damage begins to several different sizes of loads (the acceleration component plotted is the $A_1$ component shown in the accompanying diagram illustrating the acceleration components contributed by the different forces acting on a resilient lading load during an impact);

FIGURE 29 is a graph illustrating the manner in which certain cushioning and compartmenting arrangements will offer complete protection to the resilient lading referred to in connection with FIGURES 16 and 17 when free standing cars are impacted at different speeds.

Figures 13, 14:
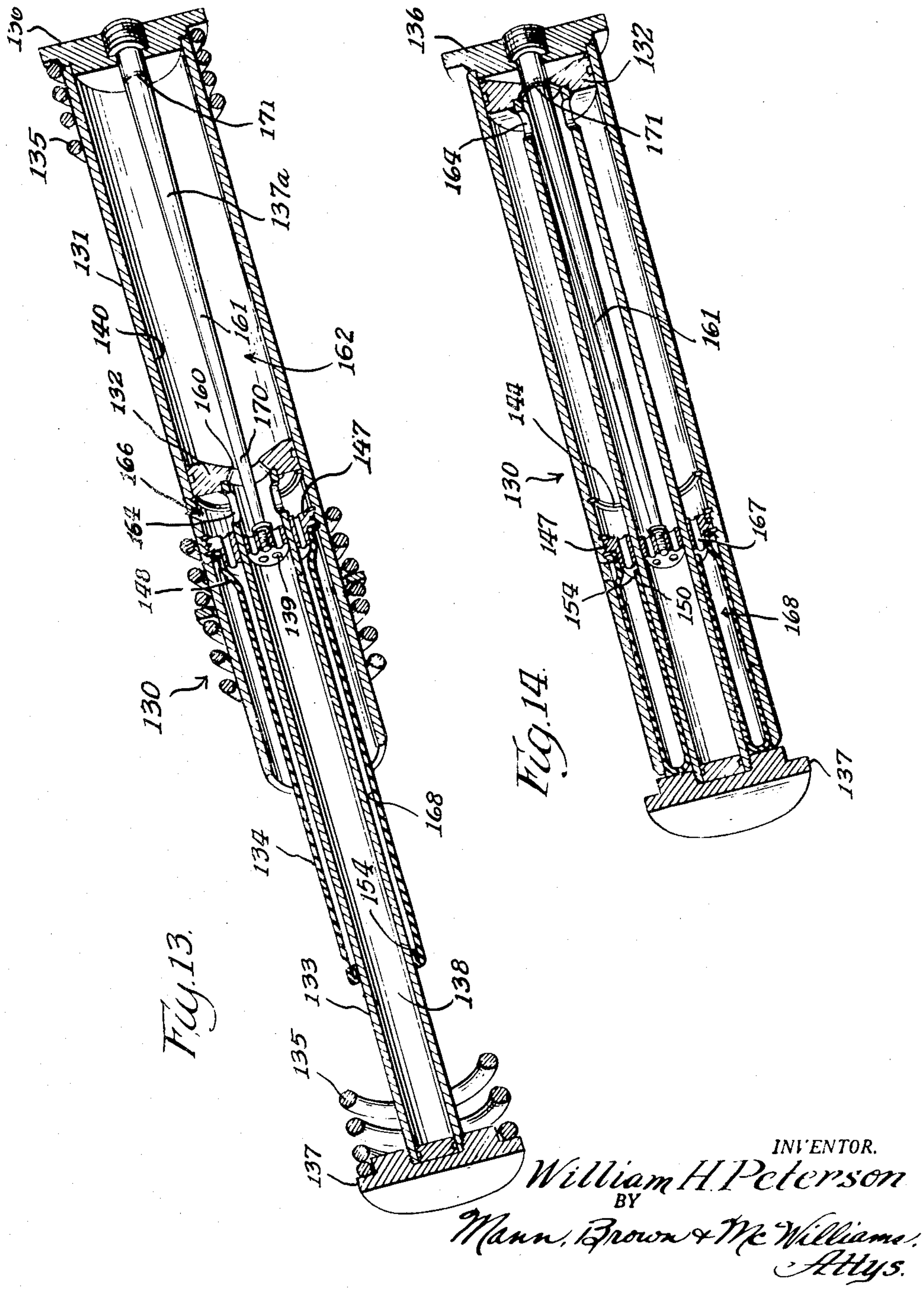
FIGURES 13 and 14 are diagrammatic perspective views, in section, illustrating one embodiment of a specific long travel hydraulic cushion device that may be used in practicing my invention, and showing it in extended and contracted positions, respectively.
Figure 15:
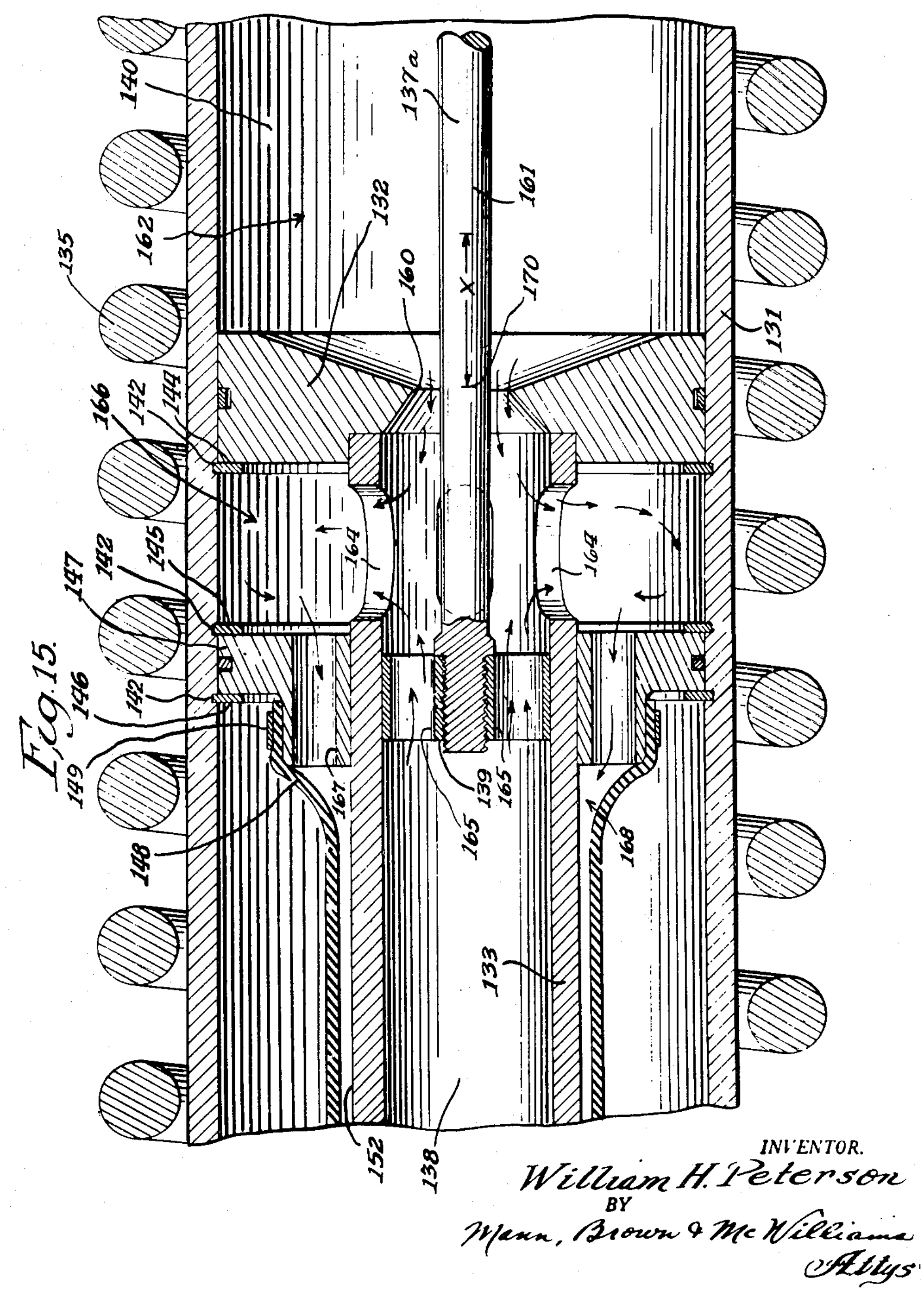
FIGURE 15 is an enlarged sectional view of the midportion of the cushion unit of FIGURES 13 and 14, positioned as shown in FIGURE 13, illustrating the direction of the hydraulic liquid flow on initiation of the contraction stroke of the hydraulic unit.
Figures 31, 32, 33, 34:
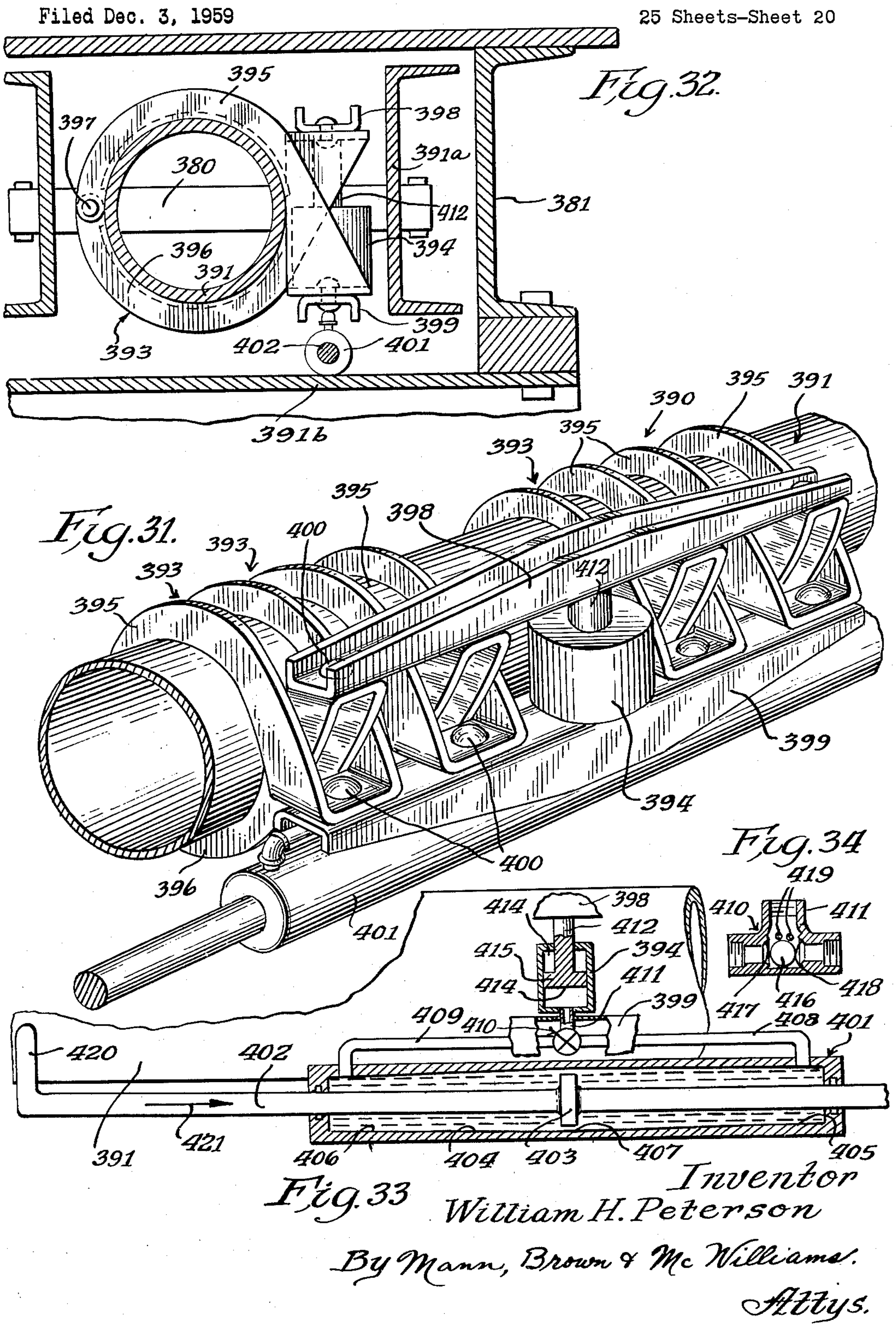
Figure 35:
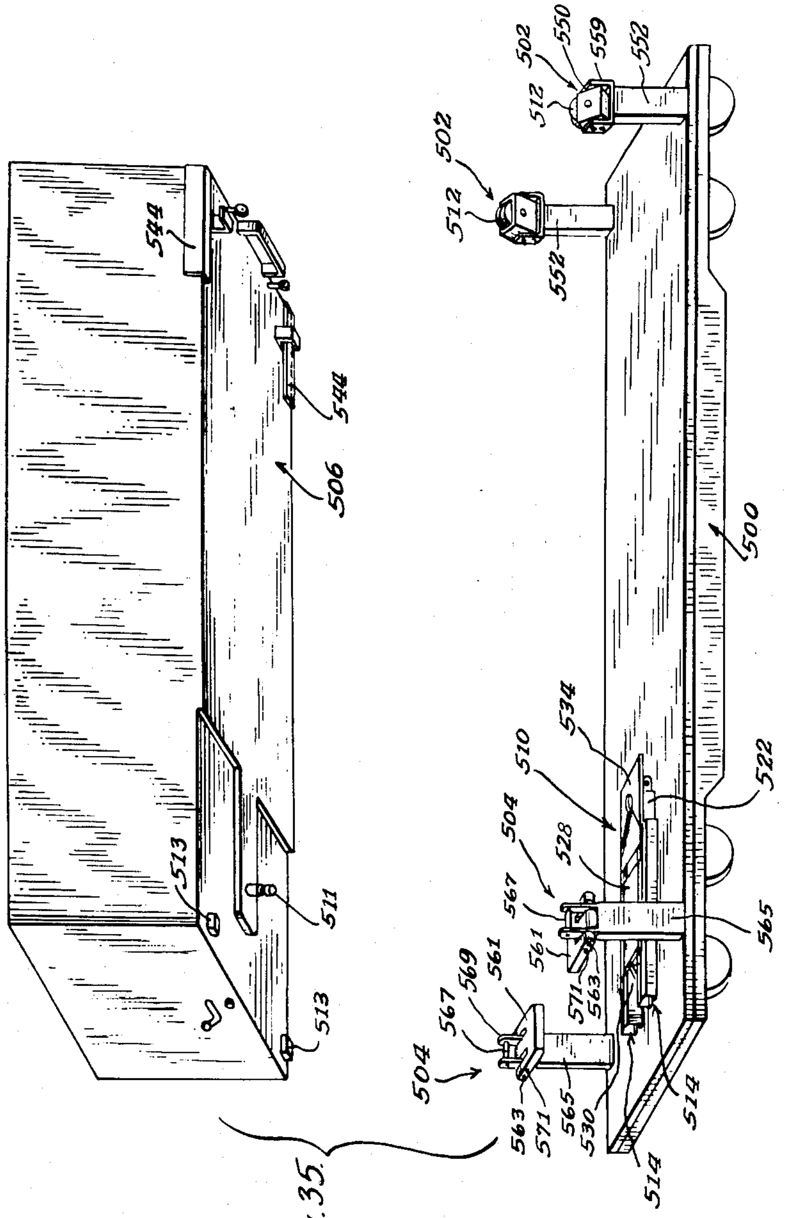
Figure 36:
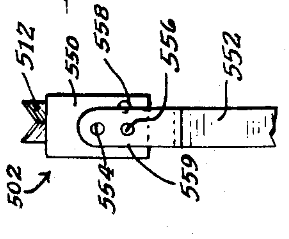
Figure 37:
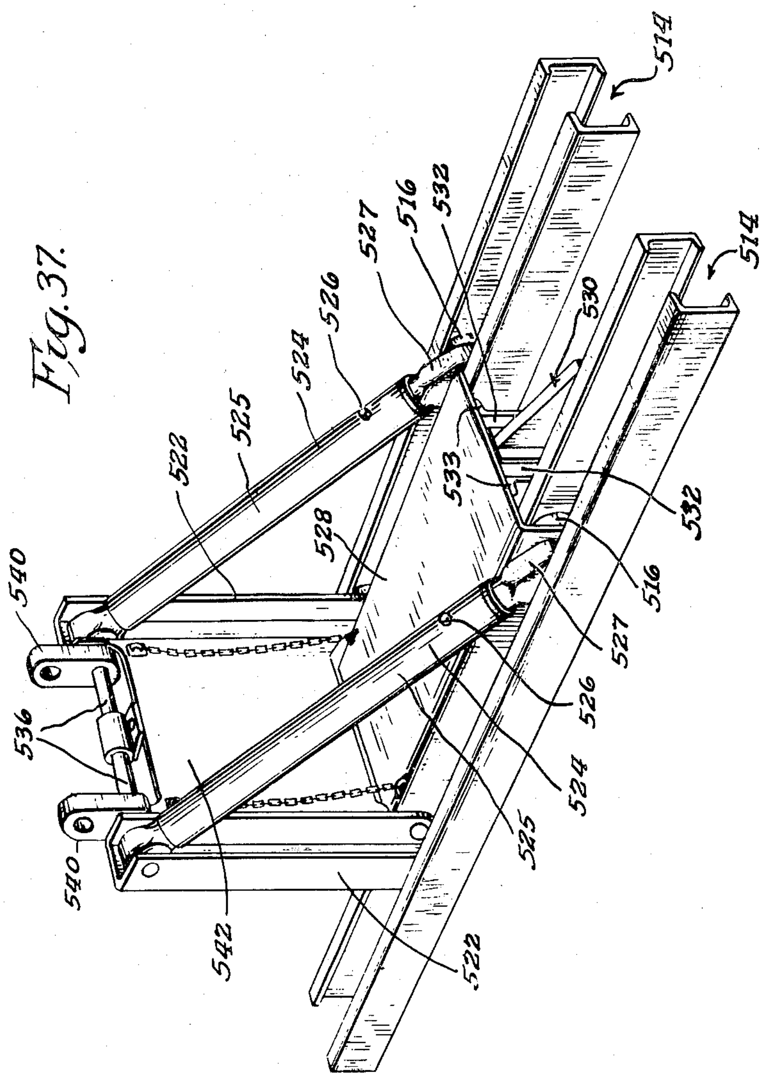
Figure 39:
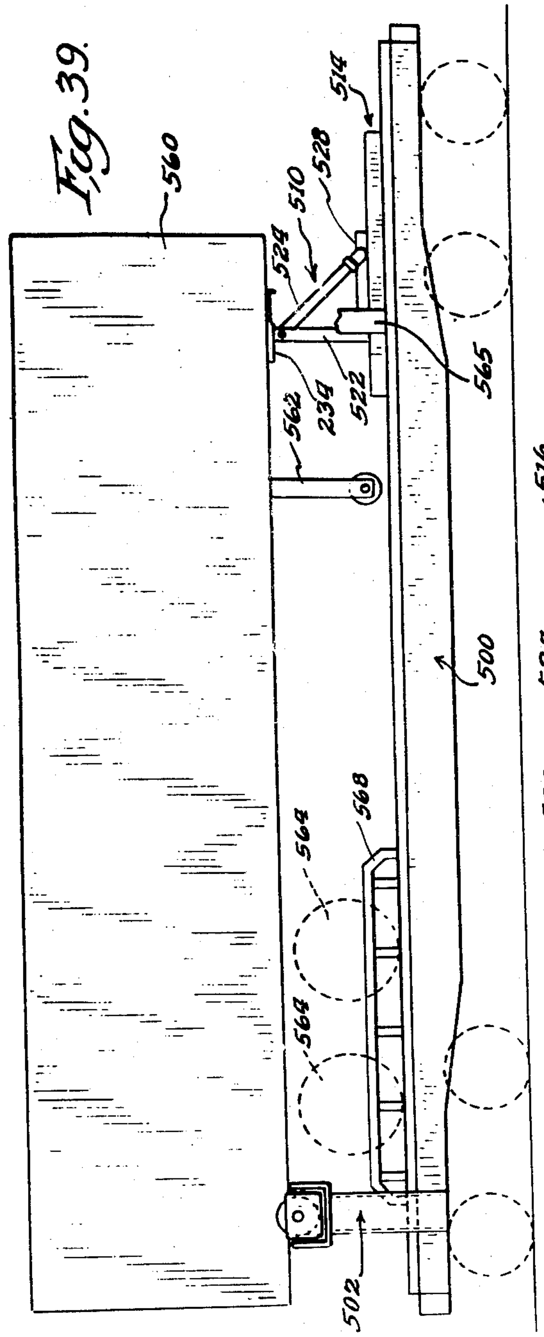
Figure 38:
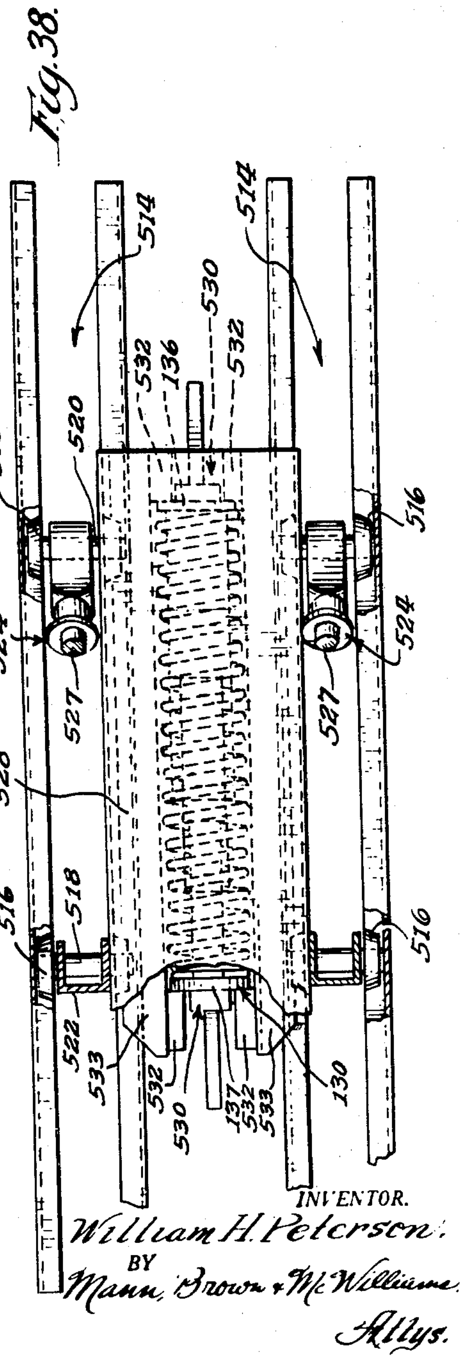
Figure 40:
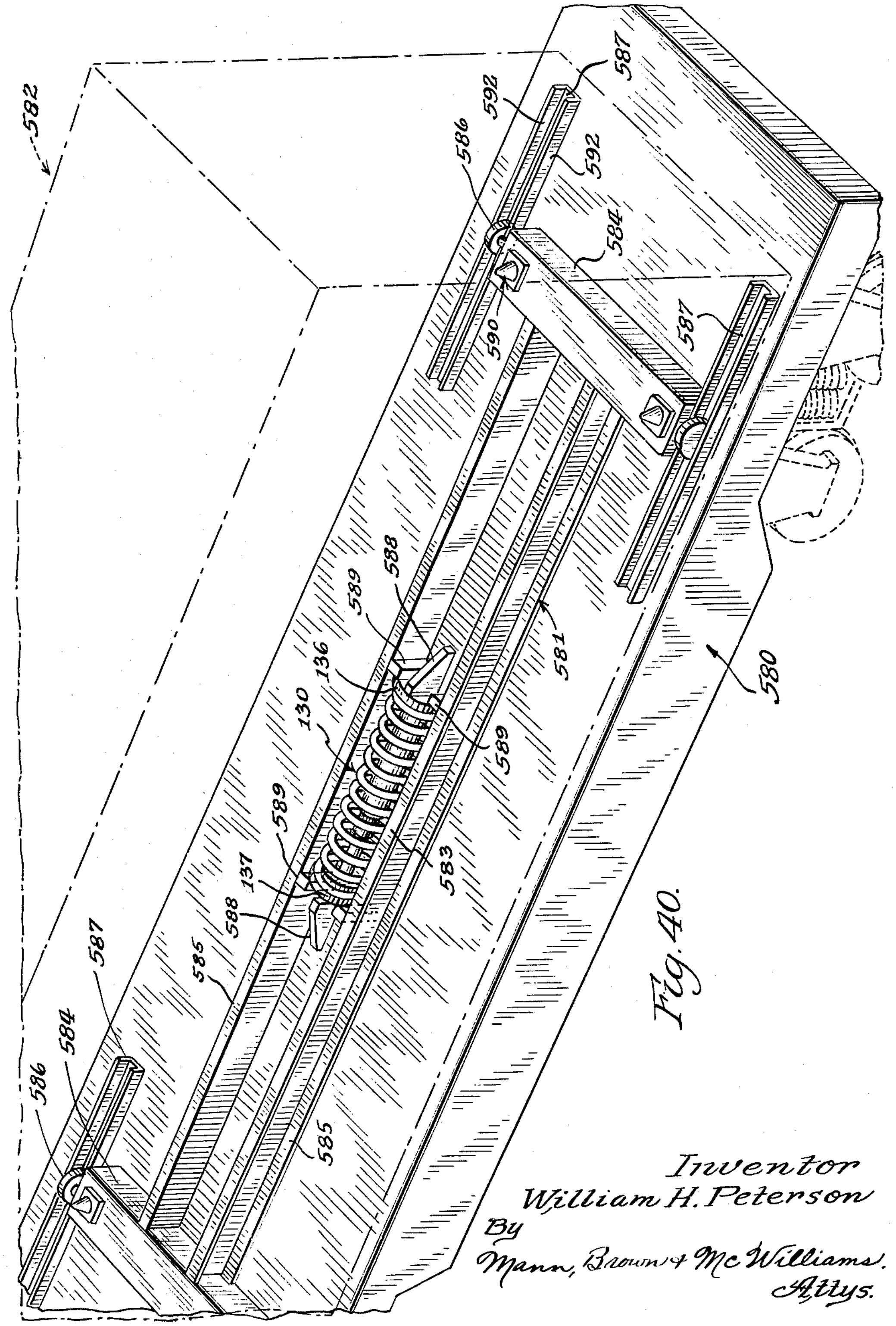
Figure 41:
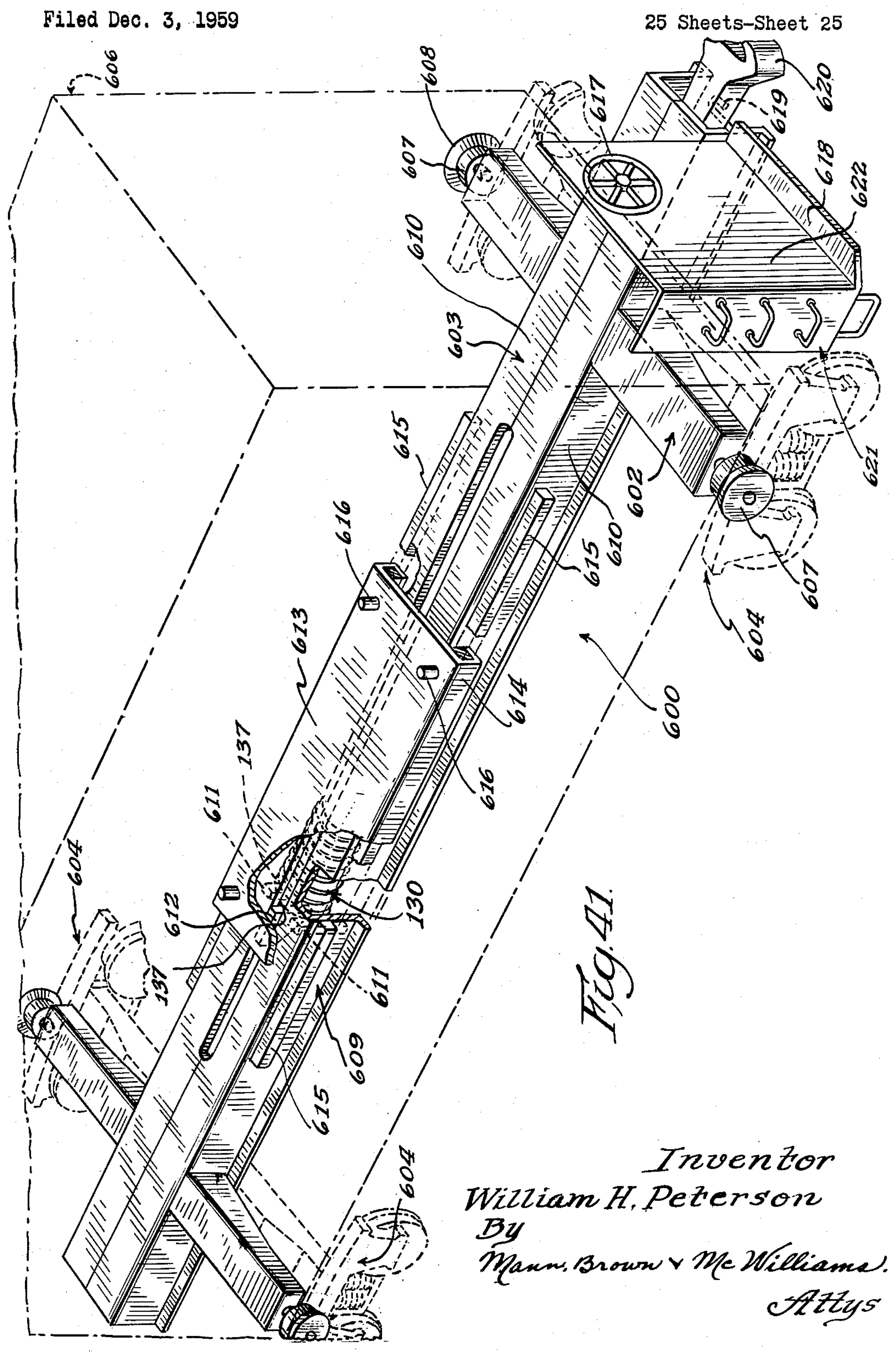

FIGURE 30 is a fragmental diagrammatic perspective view illustrating how the beneficial frictional characteristics inherent in resilient lading may be accentuated;

FIGURE 31 is a diagrammatic perspective view of a friction type cushioning device providing a cushion travel in the range contemplated by this invention;

FIGURE 32 is an end view of the cushion device of FIGURE 31, showing also some associated railroad car underframe details in section;

FIGURE 33 is a diagrammatic sectional view through the hydraulic control cylinder and associated parts of the device of FIGURE 31;

FIGURE 34 is an enlarged fragmental sectional view of a two-way check valve employed in the device of FIGURE 31;

FIGURE 35 is an exploded perspective view of a railroad flatcar and freight container of a freight handling system to which my invention is applicable;

FIGURE 36 is an elevational view of one of the rear brackets of the railroad car of FIGURE 35;

FIGURE 37 is a perspective view of the fifth wheel stand unit employed on the railroad car of FIGURE 16;

FIGURE 38 is a plan view of the trackways and housing of the fifth wheel stand of FIGURE 37, illustrating the manner in which the hydraulic cushion unit of FIGURES 13–15 is applied to the railroad car of FIGURE 35;

FIGURE 39 is an elevational view showing a conventional semi-trailer container of the type that is customarily associated with the piggyback system of transportation as mounted on the railroad car of FIGURE 35 for transport; and FIGURES 40 and 41 diagrammatically illustrate several freight transporting railroad vehicles to which the principles of my invention have been applied, and are provided primarily to indicate how my invention simplifies railroad freight car construction.

However, it should be understood that the specific disclosure which follows is for the purpose of complying with Section 112 of Title 35 of the U.S. Code, and the appended claims should be construed as broadly as the prior art will permit consistent with the disclosure herein made.

GENERAL ORGANIZATION

Inasmuch as the present invention involves some broad and basic concepts, it is important at the outset to understand some of the principles involved.

The invention is intended primarily to protect lading against damage during switching operations in classification yards, and although it is the aim in such yards to keep cars from striking one another at speeds of more than three or four miles an hour, it often happens that the coupling speeds in making up a train exceed these speeds and may in some instances amount to twelve miles an hour or more.

The problem of protecting lading against excessive coupling speeds is accentuated because normal train operations place limitations on the type and placement of the cushioning units or devices used in protecting the lading. In other words, if it were possible to use draft gears having substantially more than the two and three-quarters inches commonly employed, the lading might be protected to some extent in switching operations, but there would be so much slack in the train during normal operation that other problems would arise. It is for this reason that the A.A.R. specifies the permissible travel for draft gears when acting in draft and buff.

The present invention does not interfere with normal train operation and it is contemplated under normal circumstances that conventional draft gears will be used at both ends of the car. However, interposed between the draft gears and the car load or lading is an additional cushioning unit which comes into play on impact.

Figure 1:
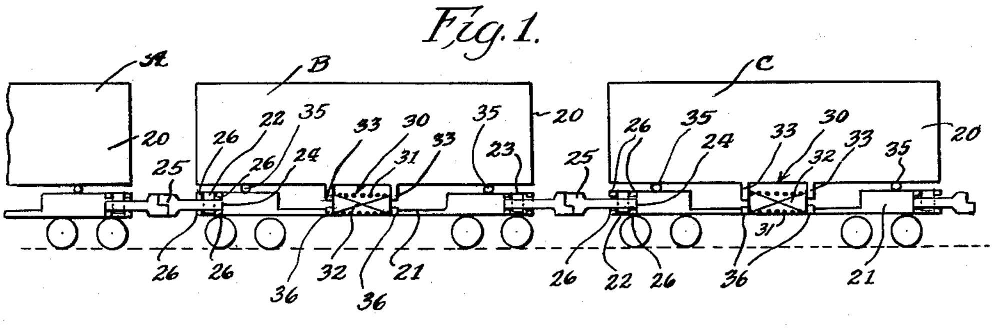
FIGURE 1 is a diagrammatic representation of several railroad cars in a train illustrating in a general way the manner in which this invention is applied thereto.

Referring now to FIGURE 1, let us assume that a train consists of a number of cars including cars A, B, and C. These cars may be of the type diagrammatically illustrated in FIGURE 1, in which the body is separate from the car underframe structure, and the underframe structure, the trucks supporting same and the brake rigging move as a unit with respect to the body (when a longitudinal impact is to be absorbed). Also, the cars may be of the cushion underframe type, which employ a sliding sill (or what is known in the art as a draft and buffing column) as part of the underframe, which moves under the impetus of an impact, with respect to the car trucks, brake rigging and car body (see FIGURES 10–12).

Each of the cars shown in FIGURE 1 has a car body 20 mounted on an underframe 21 provided with conventional draft gears 22 and 23 actuated in the usual manner by coupler yokes 24 which envelop the gear and are carried by couplers 25. The draft gears are mounted between stop lugs generally indicated at 26 which impart the buff and draft forces to the car underframe (or to the sliding sill in the case of a cushion underframe car which is not shown in FIGURE 1) and hence to the car body. Rollers 35 are shown applied between body 20 and underframe 21 in FIGURE 1 to diagrammatically make clear that there is relative movement of the load with respect to the sill member carrying the couplers when buff and draft forces are occasioned.

In the present invention, a cushioning device generally designated 30 is interposed between the draft gears and the load on the car, and it is contemplated that either the body 20 has movement relative to the underframe 21 as in the showing of FIGURE 1, or the draft gears 22 and 23 with their stops 26 are mounted on a draft and buffing column of a cushion underframe car. In either event, the cushioning device 30 is maintained in extended position by a return spring 31, and the cushioning unit per se 32 has a travel between twenty and forty inches. The cushioning unit 32 is applied between pairs of stops 33 and 36 which flank the unit and stops 33 and 36 may be fixed to the body and underframe respectively, as shown diagrammatically in FIGURE 1, or may be fixed to the sliding sill and underframe, respectively, in a cushion underframe arrangement, or they may be applied to any location between the draft gears and the load that will permit the cushioning action contemplated by this invention.

Whether the draft gears 22 and 23 are mounted in a sliding sill or draft and buffing column, as conventional in cushion underframe cars, or whether they are mounted on a fixed center sill as is conventional with standard cars is immaterial because in either event, the draft gears operate in normal fashion in buff and draft in train operation and the car body 20 with its load shifts with respect to the sliding sill or fixed underframe only in response to forces which are sufficient to compress the cushioning unit 32.

To summarize, the present invention provides for normal train operation through the action of draft gears or their equivalent in buff and draft, and the cushioning device 30 is brought into play only when acceleration forces (whether positive or negative) cause it to be actuated.

BASIC PRINCIPLES INVOLVED

It has already been stated that resilient lading such as goods contained in cartons is the most difficult to protect from loss due to excess accelerations, and this class of lading accounts for one-third of all claims against the railroads. The solution to this problem not only protects resilient lading from damage, but affords even greater protection to rigid lading.

This is accomplished by introducing an entirely new principle into lading protection. That principle involves the concept of providing cushion travel between the coupler and the car body sufficient in capacity and length that the impact energy is transformed in substantial quantities to kinetic energy, either gained or lost, imparted to the load prior to the time that the car end of the struck car exerts its force against the lading. The same general principle applies when the striking car is protected according to the teachings of this invention.

Figure 2:
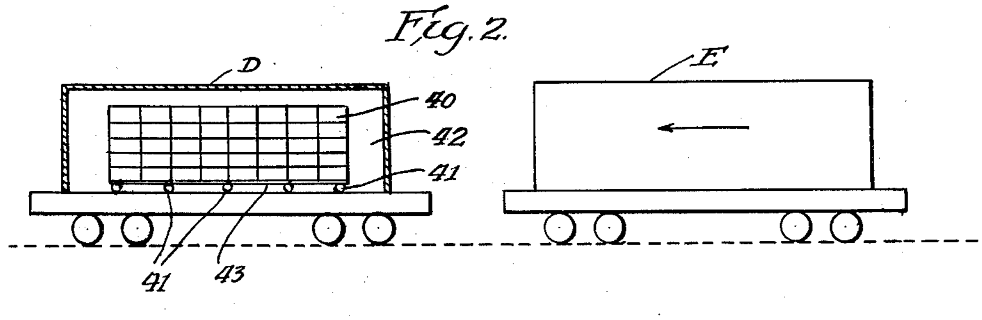
FIGURE 2 is a diagrammatic representation of a railroad car impact situation in which a moving standard railroad car impacts against a stationary standard railroad car of the boxcar type carrying a resilient lading.

Consider, for example, the situation in FIGURE 2 in which car D is at rest but free to move and car E is about to strike car D at an excessive velocity. Let us suppose in this instance that the lading represented at 40 is mounted on a platform 43 carried on frictionless rollers 41.

Let us assume further that cars E and D each weigh 50,000 pounds when unloaded and that the lading 40 in car D weighs 100,000 pounds. Also, let us assume that car E is to strike car D at a velocity of ten miles per hour.

The Law of Conservation of Momentum for inelastic bodies (which is applicable to cars which couple upon impact) says that $$V_2=\frac{M_1}{M_1+M_2}(V_1)$$

in which $V_2$ is the velocity of the struck car after impact, $V_1$ the velocity of the striking car, and $M_1$ and $M_2$ the masses of the striking and the struck car, respectively.

Assuming that car D is unloaded, this means that car E striking car D will result in the two cars moving away together at a velocity of five miles per hour.

If the lading were on the frictionless rollers 41, it is clear that under the circumstances stated above, the end 42 of car D will strike the lading 40 at a velocity of five miles per hour, and, of course, the damage to the lading would be tremendous.

Actually, this is approximately what occurs when cars of conventional design impact under excessive speeds because the load is jostled and vertically bounced, which has much the same effect as if the lading were mounted on frictionless rollers.

Now let us suppose that this vertical bounce and jostling can be eliminated through long travel cushioning units, and under these circumstances certain factors, such as the inherent stability of the vertical tiers of cartons, the friction between the cartons, and the friction between the entire car lading and the car body, may be introduced as factors to create acceleration of the lading prior to the time that the car end 42 strikes the lading 40 (or in reality for maximum compaction of the load to occur prior to such time).

In this instance, the striking car (weighing 50,000 pounds) meets a resistance of 150,000 pounds, and by the formula of conservation of momentum, the two cars after impact move away at a velocity of two and one-half miles per hour.

Figure 3:
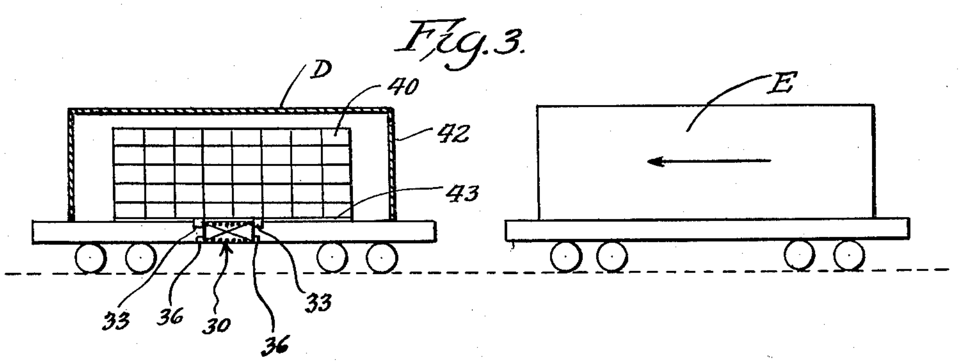
FIGURE 3 is similar to FIGURE 2, but showing a cushion device having the characteristics contemplated by this invention in association with the struck car and its lading.

In other words, by providing a cushioning device in car D as indicated at 30 in FIGURE 3 having a travel of sufficient length (namely, between 20 and 40 inches for cars ranging from 30 to 70 feet or more in length) so that acceleration of the lading 40 is achieved through the action of friction and the stability of the vertical tiers of the cartons before the maximum compaction of the lading occurs, this damaging impact between the car end and the lading is amazingly reduced, if not substantially eliminated. While the lading in car D of FIGURE 3 is shown applied to a platform 43, the same principle applies if the lading rests directly on the car body floor, and the cushion device 30 is interposed between the car body and its underframe, as the situation would probably be in actual practice.

Obviously, it takes a large amount of energy to move 100,000 pounds to a velocity of two and one-half miles per hour. It is equally obvious that the force required to move this mass to such speed in a fraction of a second is also of large magnitude. By using the long travel cushioning unit contemplated by this invention, the greater portion of this large energy, i.e., residual energy of impact not dissipated by the cushioning device, or used in returning it to normal operating position, is imparted to the load by means of the frictional forces and the stability of the carton tiers, leaving only a small part of the total energy to be imparted to the lading through the pressure at the end of the load by the car end wall.

With this preliminary explanation, which should not be considered in a limiting sense, but rather as one possible explanation of the phenomena which I have observed in tests, it will now be helpful to consider specific structures which may be utilized to obtain these highly beneficial results.

APPLICATION OF INVENTION TO RAILROAD CARS

Figures 4, 5, 6:
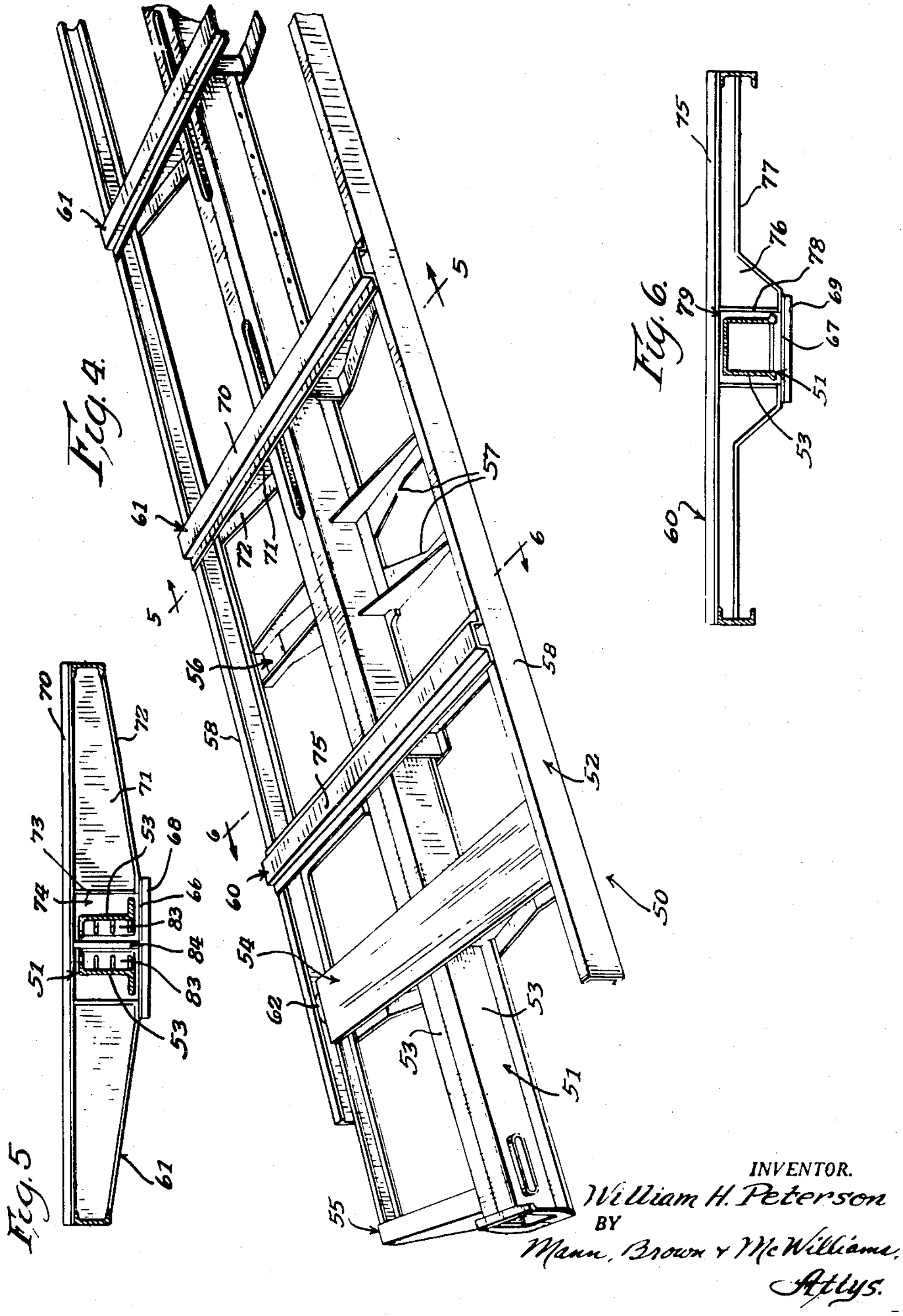
FIGURE 4 is a diagrammatic perspective view of a specific cushioned body railroad car arrangement that may be employed in practicing my invention.
FIGURE 5 is a diagrammatic cross-sectional view approximately along line 5—5 of FIGURE 4.
FIGURE 6 is a diagrammatic cross-sectional view approximately along line 6—6 of FIGURE 4.

FIGURES 4–7 illustrate one specific form of railroad car in which my invention is embodied. The car structure is generally indicated by reference numeral 50 and generally comprises a cushion body car arrangement (as distinguished from a cushion underframe arrangement) including a center sill structure 51 of the type known in the art as "Z–26" and a body underframe structure 52 which is mounted for movement with respect to the center sill structure 51. Any type of car body may be mounted on or associated with body underframe structure 52, whether of the boxcar, flatcar, gondola car or passenger car type. As indicated in FIGURES 4, 5 and 9, the center sill structure includes the usual Z-shaped members 53 fixed together in the customary manner and fixedly carrying a bolster structure 54 of any suitable design at each end of the car (only one of which is shown) which ride on and are pivotally connected to the usual railroad car trucks by means of conventional center plate and kingpin arrangement (not shown). A hand brake and uncoupling rod support 55 is also carried by each end of the center sill structure, as are the brake "AB" valve support 56 and brake reservoir supports 57; the dead lever brake arm and brake rigging may be secured to the center sill structure in any suitable manner. The center sill structure 51 carries the usual couplers (not shown) suitably mounted at each end thereof and associated in the customary manner with conventional draft gear.

The body underframe structure 52 comprises spaced side sills 58 connected together by end cross bearer structures 60 (only one is shown) and spaced center cross bearer structures 61.

In the form shown in FIGURES 4–9, the side sill members 58 are in the form of channels in each of which is received a roller 62 (see FIGURES 4 and 8) journalled at each end of each bolster structure 54. Thus, the underframe structure 52 rides on rollers 62, which are rotatably mounted on pins 63 (see FIGURE 8) secured in any suitable manner to the ends of the bolster structures 54 (see FIGURE 8).

The center cross bearer structures 61 may be of any suitable design, though in the illustrated form (see FIGURE 5) they comprise channels 70 and plates 71, 72 and 73 and 66 rigidly united to form a rigid structure that defines an opening 74 through which the center sill structure 51 extends. The end cross bearer structures 60 are of similar construction (see FIGURE 6), they being formed by channels 75 and plates 76, 77, 78 and 67 all integrally united to define opening 79 through which the center sill structure 51 extends. Plates 66 and 67 may be reinforced by channels 68 and 69, respectively.

Figures 7, 8, 9:
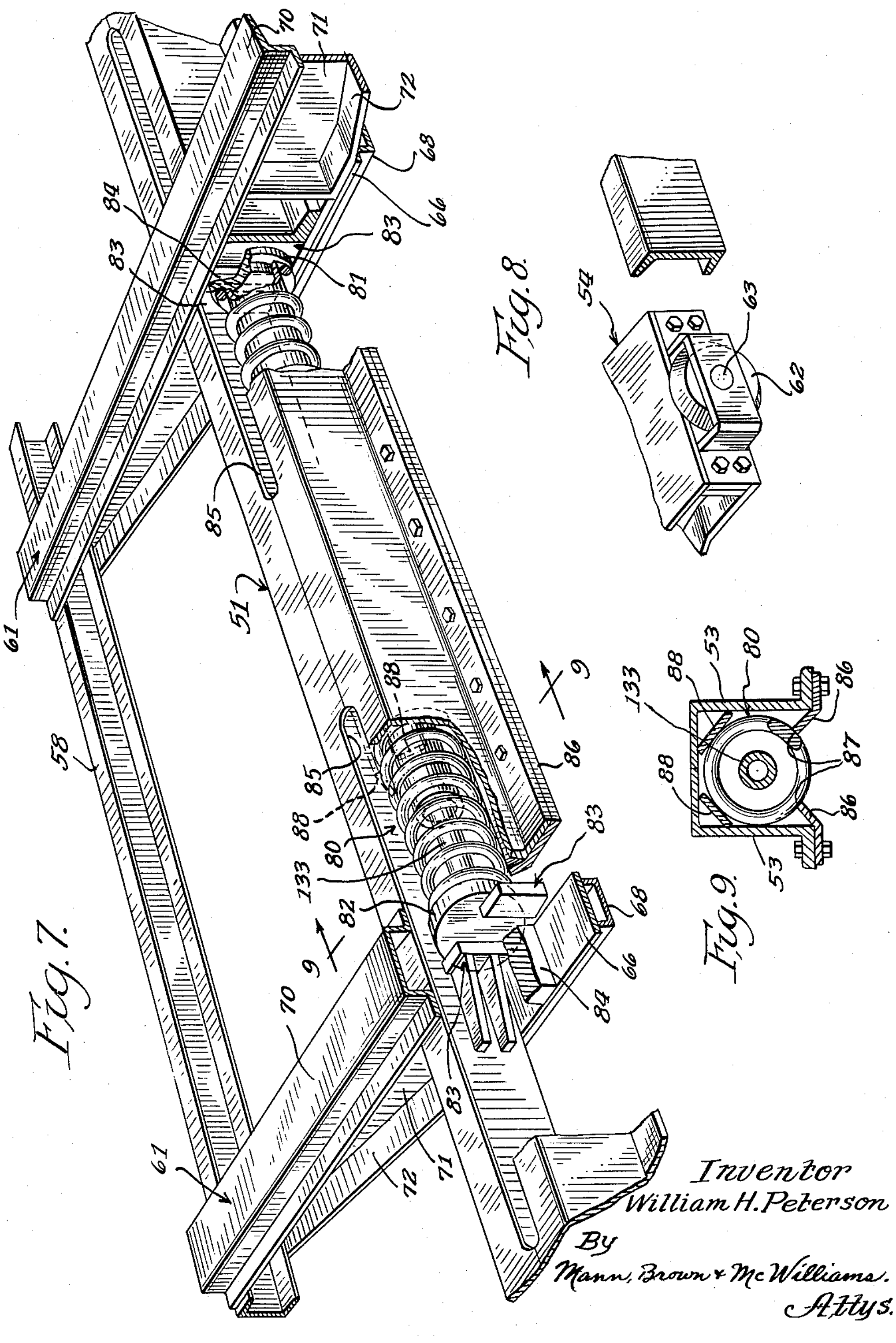
FIGURE 7 is an enlarged perspective view illustrating the manner in which a preferred form of cushioning unit is applied to the car structure of FIGURE 4.
FIGURE 8 is a diagrammatic fragmental perspective view illustrating the roller arrangement that is employed between the underframe and center sill of the structure shown in FIGURE 4.
FIGURE 9 is a diagrammatic sectional view approximately along line 9—9 of FIGURE 7 further illustrating the manner in which the cushion unit is applied to the car center sill.

Referring to FIGURE 7, a hydraulic unit 80 of the type contemplated by this invention is employed where indicated within the center sill structure 51. Unit 80 includes followers 81 and 82 that bear against center sill lugs 83, which at each end of the unit 80 are spaced on either side of a center lug or stop member 84 that is fixed to the respective center cross bearer structures 61 in any suitable manner. The center sill structure may be slotted as at 85 to permit the necessary travel of the center lugs or stop members 84, and carrier plates 86 are secured to the bottom of the center sill structure to hold the hydraulic unit in place. As seen in FIGURE 9, the ends or ridges 87 of carrier plates 86 together with guide plates 88 fixed to the respective members 53 guide the hydraulic unit 80 in its contraction and extension strokes.

It will be observed that center sill lugs 83 and underframe lugs 84 correspond respectively to stops 36 and 33 of the showing of FIGURE 1.

When the unit 80 is mounted substantially as shown in the car structure 50 of FIGURES 4–9, buff and draft forces applied to the center sill structure 51 will be cushioned to provide the results described above.

Figure 10:
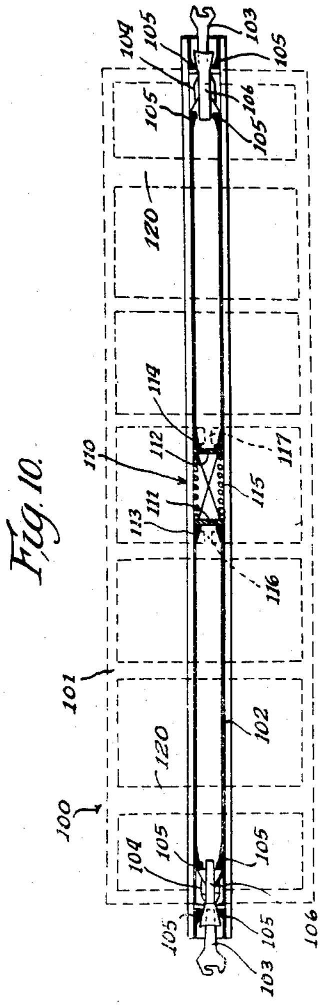
FIGURE 10 illustrates diagrammatically a type of cushion underframe car having the invention applied thereto.
Figure 11:
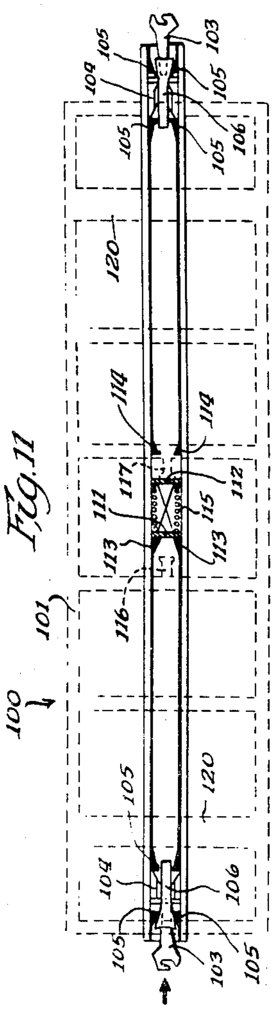
FIGURES 11 and 12 illustrate the embodiment of FIGURE 10 under opposite conditions of impact.
Figure 12:
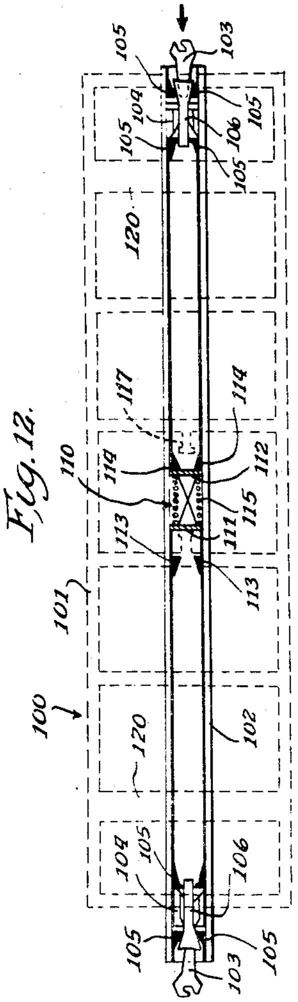

In the embodiment of FIGURES 10–12, the invention is applied to a diagrammatically illustrated cushion underframe car 100, which is intended to represent a cushion underframe car of the type described in Meyer Patent 2,764,299. Car 100 includes an underframe structure 101 (shown in dashed lines), on which any desired type of railroad car body may be mounted or erected, which underframe slidably carries a draft and buffing column 102 having secured at each end thereof conventional couplers 103 and draft gear 104. Draft gear 104 are shown applied between draft gear lugs 105 and the couplers 103 are operatively secured to the draft gear by conventional yokes 106.

Interposed between draft column 102 and the underframe structure 101, where indicated by reference numeral 110, is a cushion device arranged in accordance with this invention, which includes followers 111 and 112 that are held against the spaced pairs of lugs 113 and 114 of the draft column by return spring 115 which also holds the cushion device in extended position. Spaced stops 116 and 117, fixed to underframe structure 101, also engage followers 111 and 112, respectively, as indicated in FIGURE 10. Cushion device 110 may be of any suitable type having a cushioned closure on contraction travel between 20 and 40 inches, together with the energy dissipating characteristics hereinafter described.

The neutral position of the draft column with respect to the underframe structure is that indicated in FIGURE 10, wherein the draft column is centered with respect to the underframe structure 101 by return spring 115, and this positioning obtains during all normal train operations that car 100 may be used for, the conventional draft gear 104 being relied upon to absorb and dissipate the buff and draft forces customarily encountered when the car is in service.

However, when a severe impact is applied to the draft column 102 in the direction of the arrow of FIGURE 11, the draft column 102 moves to the right of FIGURE 11 with respect to the underframe structure 101. The pair of lugs 113 will therefore press the left hand follower 111 toward the underframe stop 117, and the impetus of the impact closes or contracts the cushion device. During the closure of the cushion device, the energy of the impact is gradually transferred to the underframe through its stop 117, and when the device approaches full closure, the various elements described have the general relationship shown in FIGURE 11. The return spring 115 then returns the draft column to its centered position of FIGURE 10, and also restores the cushion device to its extended position.

Impacts from the opposite direction are transferred to the underframe 101 in a similar manner, as indicated by the showing of FIGURE 12.

In the arrangement of FIGURES 10–12, the lugs 113 and 114 correspond to stops 36 of FIGURE 1, while stops 116 and 117 correspond to stops 33 of the same figure. The underframe 101 includes body bolsters 120 which ride on and are pivoted to conventional car trucks by means of the usual center plate and kingpin arrangements.

The cushion arrangement in the embodiment of FIGURES 4–9 operates in a manner similar to that diagrammatically illustrated in FIGURES 11 and 12, though the draft column (or sliding sill) in the latter figures moves with respect to the body bolsters 120 of underframe 101 as well as the car trucks to which the body bolsters 120 are connected, while in the embodiment of FIGURES 4–9, the center sill 51, its bolster structures 54, and the car trucks move with respect to the body underframe 52 and any body associated therewith.

FIGURES 13–15 illustrate a preferred form of several different types of long travel cushioning devices that may be employed to provide the force travel characteristic that is desirable in practicing my invention. The device of FIGURES 13–15 is the hydraulic cushion device disclosed and claimed in my copending application Serial No. 782,786, filed December 24, 1958, the disclosure of which is hereby incorporated by this reference. This device is also shown applied to the cushion body car arrangement of FIGURES 4–9.

Reference numeral 130 of FIGURES 13 and 14 generally indicates the hydraulic unit of said copending application Serial No. 782,786, which generally comprises a tubular cylinder 131 in which a piston head 132 is reciprocably mounted, a tubular piston rod 133 fixed to the piston head 132, an invaginating tubular member or boot 134 connected between the tubular cylinder 131 and the tubular piston rod 133, and helical compression springs 135 extending between the closure members 136 and 137 of the tubular cylinder 131 and tubular piston rod 133, respectively.

The closure member 136 of tubular cylinder 131 carries a metering pin 137ª that is reciprocably received within the bore 138 of the tubular piston rod 133. The metering pin 137ª preferably is provided with a guide member 139 at its projecting end.

The internal surface 140 of tubular cylinder 131 is formed in any suitable manner as at 142 (see Figure 15) to receive three snap rings 144, 145 and 146. The snap ring 144 serves as a stop for piston head 132 when the device is in its extended position of FIGURE 13, while the snap rings 145 and 146 hold in place a piston rod guide member 147 to which one end 148 of the invaginating boot or tubular member 134 is secured by a suitable clamp 149 (see FIGURE 15). The other end 150 of boot 134 is turned outside in, and is secured to the external surface 152 of the piston rod 133 by a suitable clamp 154 (see FIGURE 13).

The device 130 is charged with hydraulic liquid as described in said copending application to completely fill the space defined by the tubular cylinder 131, the tubular piston rod 133 and the invaginating boot 134. When the device is in use, as when employed as a cushion unit for a cushion underframe of a railroad car, the normal positioning of the device components is that shown in FIGURES 13 and 15, the device being mounted between suitable abutments such as the stops and lugs shown in FIGURES 4–12. When the cushion underframe receives a shock in either buff or draft, either the tubular cylinder 131 will commence movement to the left of FIGURE 13 or the tubular piston rod 133 and piston head 132 will commence movement to the right of FIGURE 13, or possibly both movements may occur. In any event, as the device 130 retracts under the force being cushioned, the metering pin 137ª displaces hydraulic liquid contained within the tubular piston rod 133 and the piston head 132 causes a hydraulic liquid flow through its orifice 160 through which the metering pin 137ª extends. The metering pin 137ª shown is provided with a tapered surface 161 that preferably is designed to provide a constant force travel characteristic as the hydraulic cushion contracts under the shock imposed upon it; that is, the arrangement is such that for every unit of travel, the cushioning device provides a substantially constant cushioning effect.

As best shown in FIGURE 15, the oil flow then initiated is from chamber 162 on the high pressure side of piston head 132 through orifice 160 and into the bore 138 of tubular piston rod 133, thence radially outwardly of the piston rod 133 through orifices or ports 164 of the tubular piston rod. As the hydraulic liquid within the tubular piston rod is diplaced by the metering pin 137ª, it likewise moves through ports 164, as indicated by the arrows (see FIGURE 15). Metering pin guide member 139 is formed with relatively large apertures 165 to permit a free flow of hydraulic liquid during movement of the metering pin.

The hydraulic liquid flow through ports 164 is under relatively high velocity and creates great turbulence in the chamber 166 that is formed by the space between tubular piston guide member 147 and piston head 132. This great turbulence is caused at least in part by the radially directed flow of hydraulic liquid impinging directly against the inner surface 140 of tubular cylinder 131, and is responsible for dissipation of much of the kinetic energy of the hydraulic liquid in the form of heat.

As the contraction of the cushion device 130 proceeds, the high pressure chamber 162 is reduced in volume by the advancement of the piston head 132 toward the tubular cylinder closure member 136. The hydraulic liquid passing through orifice 160 fills the chamber 166 behind the piston head 132, while a volume of hydraulic liquid equivalent to that displaced by the total entry into the fluid chamber of the piston rod 133, passes through apertures 167 of guide member 147 into the space 168 enclosed by the invaginating boot or tubular member 134 which inflates or expands and rolls to the position suggested by FIGURE 14. The aperture 167, as seen in FIGURES 14 and 15, are relatively large in cross-sectional area, which provides or permits a relatively large volume and consequently low pressure hydraulic liquid flow from chamber 166 to space 168. This avoids generation of any appreciable compressive force on the relatively slender metering pin and prevents any possibility of its buckling.

After the shock has been fully dissipated, compression springs 135, acting in tandem, return the hydraulic cushion components to the initial extended position of FIGURE 13. During this movement under the action of the compression springs, the oil flow illustrated in FIGURE 15 is reversed, and invaginating tubular member or boot 134 deflates and returns to the position of FIGURE 13, thereby insuring that the hydraulic liquid displaced by the piston head 132 and piston rod 133 is restored to its normal operative locations.

It will thus be seen that not only is the device 130 composed of few and simple components, and that all sliding or dynamic seals are eliminated in favor of static seals, but a reliable double acting long travel cushioning action is provided. Furthermore, all kinetic energy applied to the cushioning device, with the exception of the small potential energy stored in the return springs 135, is either dissipated in the form of heat by the passing of the hydraulic liquid through orifice 160 and the turbulence in chamber 166, or is transferred as kinetic energy to the struck car with its load; and, as brought out in my said copending application Serial No. 782,786, device 130 is hermetically sealed against hydraulic leakage and entry of ambient air.

Reference may be had to said copending application Serial No. 782,786 for a more specific description of this unit. It may be added, however, that the tapering surface 161 of the metering pin 137[a] extends between points 170 and 171 (See FIGURES 13 and 14), and that the contour of tapered surface 161 in the illustrated embodiment is designed from the relationship $$A_x = A_0\sqrt{1-\frac{x}{\alpha}}$$

wherein $A_x$ is the orifice area of any position $x$ (see FIGURE 15) along the total nominal stroke $d$ (the length of the tapered surface 161), and $A_0$ is the initial orifice area defined by orifice 160 at the beginning of a stroke, in the case where a completely rigid body is being cushioned from impact. While in most cases and for a given car weight this assumption will result in a reasonably efficient design, small alterations can be readily made to this shape to give a closer approach to the optimum constant force travel characteristic for a given situation after a few experimental trials. However, the shape given by the above formula is the best starting point. Furthermore, it is usually possible to obtain a reasonably efficient design by approximating the curved shape given by the above expression as by calculating a series of spaced cross-sectional areas so determined by straight tapers, if this facilitates manufacture. Moreover, the pin could be contoured so as to provide for the desired stroke of from about 20 to 40 inches while having a reserve stroke which would give a substantially higher force travel characteristic than that throughout the normal stroke, in order to protect against overloads or other unusually severe conditions. In fact there is no limit to the possibilities of how the pin might be shaped to suit special situations or the application of existing knowledge of this art. The orifice areas referred to are the orifice areas of orifice 160 minus the cross-sectional area of the metering pin at any given position along the stroke of the metering pin.

The components of the unit 130 may be formed from any suitable materials, boot 134 being formed from suitable impervious, flexible, rubber-like material with special additives for low temperature flexibility and clamps 149 and 154 being of the type of clamp sold under the trademark "Punch-lok," made and sold by the Punch-lok Company of Chicago, Illinois. The unit 130 is preferably charged with the high viscosity index oil sold by Shell Oil Company under the trade designation Aeroshell No. 4, as this oil desirably has a relatively small variation in viscosity between the extremes of minus 60 degrees F. and 150 degrees F.

The hydraulic liquid when the device 130 is in fully extended position is under very little pressure, perhaps no more than 2 p.s.i., but even though the pressures in the high pressure chamber 162 may rise to as much as 8,000 p.s.i. as when the device is employed in railroad cars to cushion buff and draft forces, the maximum pressure within the invaginating boot 134 (when fully inflated) is believed to be about 10 p.s.i. Boot 134 stretches about 100 percent when fully inflated. Units 130 can be designed for operating pressures up to the limit of the yield strength of cylinder 131 and the device of FIGURES 13–15 when employed in car structures, for instance, of the types shown in FIGURES 4–12, is capable of handling kinetic energy of impact on the order of a million foot pounds, depending, of course, on the specific design required for a specific purpose. Units 130 will thus easily handle 15 mile per hour impacts when applied to, for instance, the railroad car structures of FIGURES 4–12.

In the showing of FIGURES 4–9, followers 81 and 82 correspond to closure members 136 and 137 of the device of FIGURES 13–14.

TECHNICAL DATA SHOWING UNEXPECTED RESULTS

*(A) Predictability*

As previously stated, it has always been assumed that any means by which coupler forces could be reduced would result in proportionate reduction in lading damage. Again referring to page 727, Car Builders' Cyclopedia, 20th edition, supra, in which the Waugh cushion underframe is described, there is shown a chart which indicates that the peak coupler force for impacts of a fully loaded 50-ton car at an impact speed of ten miles an hour is about 360,000 pounds for the Waugh super-cushion underframe (which is said to have an 11 inch cushioned travel), and because this peak coupler force is substantially below the 500,000 pounds, which was considered maximum "for assurance of damage-free lading," is was concluded that full protection was being offered to lading carried by such cars.

My experience, however, with cushion underframe cars having a cushion travel of eight or ten inches convinced me that coupler force alone could not be used as a criterion in protecting lading damage. I found, for example, that in some instances a cushion underframe car having an eight or ten inch cushion travel actually resulted in some instances to slightly more damage to certain kinds of lading of the resilient lading class, than a standard car equipped merely with conventional draft gears, although furnishing reasonably satisfactory protection to rigid lading.

This anomaly, coupled with calculations which I made, convinced me that resilient lading follows a different pattern than rigid lading with respect to its susceptibility to damage, and I then had a series of tests run on a car 200 (see FIGURES 16 and 17) loaded with resilient lading to determine the actual lading forces under various conditions of cushion underframe travel and at different impact speeds. The tests were run without any load-subdividers and calibrated dynamometers utilizing electric strain gauges were employed for force measurements where indicated in FIGURES 16 and 17 at $F_{TE}$, $F_{ME}$, $F_{BE}$, $F_C$, $F_{H-1}$, $F_{H-2}$, $F_{H-3}$ and $F_{V-3}$.

These tests employed a moving striking car (not shown) of 169,900 pounds gross weight and car 200 (see FIGURE 16) of 52,600 pounds, which was initially stationary and carried a lading 201 of 51,200 pounds composed of 900 fibre cartons 202 of canned animal food, loaded in five layers in accordance with the bonded short block pattern as designated in Union Pacific Railroad loading practices. The strain gauges at the end of the car were applied to the car end wall 203 as indicated in FIGURES 16 and 17 to measure dynamic compressive forces exerted on the cartons, which are the above described lading forces. The two cars were free to move after impact.

The cushioning unit which I used in these tests was carried at the striking end of the striking car in place of the usual coupler, so that the force exerted by the cushioning unit was substantially the same as coupler force. The cushioning unit could be adjusted to various lengths of 100 percent efficient cushion travel (meaning travel of a constant force type with no uncontrolled recoil), and after obtaining the force measurements and interpreting the results, I found that my premise had been correct and that when I increased cushion travel to about 19 inches I began to get, with 9.6 mile per hour impacts, an unexpected drop in lading force, and when I extended cushion travel to 30$\frac{7}{16}$ inches, lading force was reduced as much as 83.4 percent, while cushion force dropped only 30.6 percent, as graphically illustrated in FIGURE 18. This was completely contrary to all prior engineering theory and teachings.

Parenthetically, it may be said that in all of the test data considered in the present disclosure, the struck car was not coupled to other cars, and, except for slight variations, the cushion force is substantially equal to coupler force.

It should be understood that coupler force is the force acting on the coupled during impact, and cushion force is the force acting on the cushioning device during the same impact. In a cushion underframe car having a sliding sill with the cushioning device operating between the sill and the remainder of the car, the coupler force involved in any given impact is substantially equal to cushion force in view of the relatively small inertia of the sliding sill. In a standard car employing only standard draft gears for cushioning purposes, these two forces are substantially the same because of the comparatively small inertia of the couplers. In the test car of FIGURE 16 in which the only cushioning employed was on the striking end of the striking car, the cushioning force was substantially equal to the coupler force as indicated by the legend for $F_c$ in FIGURE 16, and all test data in this disclosure was based on this condition.

However, in a cushion rack car such as shown in FIGURE 40, or in a piggyback car such as shown in FIGURE 39, or the container car such as shown in FIGURE 35, the cushion force is substantially less than the coupler force in the case of an impact involving only two cars, one of which is a car of the above described type and built in accordance with my invention, because in such case the greater mass that is interposed between the car and the cushion element in the car of my invention possesses sufficient momentum or inertia (as the case may be) to effect this differentiation.

It is important to realize that when a single car equipped with this invention is impacted against a string of standing cars, as is conventional in classification yard practice, or when a string of cars is impacted against a single car equipped with this invention, in either case the mass of the string of cars is so great as compared to the uncushioned part of the mass of the car equipped with this invention that such uncushioned part of the single car has its velocity changed so abruptly that all of the data set forth in this disclosure with respect to the need for 20 inches to 40 inches of travel is fully applicable, regardless of the type of car employed.

In a broad sense, all reference in this disclosure to cushion force is intended to mean that force applied to the container or structure containing the lading and delivered to it by any combination of masses through a cushioning element. It is immaterial whether the cushioned container or structure impacts into this combination of masses, or the combination of masses impacts into the cushioned container or structure. In other words, it makes no difference which part of the system is at rest or any given state of motion prior to impact, as long as a change in the state of motion occurs.

In the test setup, referred to heretofore in connection with FIGURES 16 and 17, there was a single impacting mass, namely the mass of the striking car, and, in this case, cushion force is, for all practical purposes equal to coupler force, considering that the mass of the cushion plunger is negligible. The important thing to recognize is that the so-called cushion forces are the forces actually delivered to the container structure carrying the lading. Equally important is the understanding that in the application of this invention to various arrangements, such as sliding sill cars, cushion body cars, cushion rack cars, and cushion fifth wheel stand cars, it is of no consequence, as far the the container or the structure containing the lading is concerned, what combination of masses delivered the impact to the cushioning device; and, by the same token, it is unimportant what forces—coupler force or others—are developed in the process of delivering an impact to the cushioning device.

Also, it should be understood that the expression "100% efficient" as used in reference to the cushioning device means a cushioning device which transmits essentially only that portion of the kinetic energy necessary to satisfy the Law of Conversation of Momentum, and which substantially disipates the rest of the kinetic energy required to accomplish an inelastic impact save only the energy stored in return springs necessary to recenter the device and the energy involved in lading friction, elastic structural deflection, noise and the like. In other words, a "100% efficient cushion" is a cushion which dissipates energy with minimum travel.

This "100% efficiency" of the cushioning device, of course, implies an optimum condition and necessarily requires that the cushioning device have substantially constant force-travel characteristics (i.e., for every increment of travel of the cushioning device, substantially the same force is developed). To the extent that a cushioning device does not have this constant force-travel characteristic and is not therefore 100% efficient, the 20 inch to 40 inch range of travel must be correspondingly increased or adjusted.

In other words, and viewed in another light, the cushioning mechanism should have a travel of from about 20 inches to about 40 inches, or its equivalent, and be characterized by its ability to dissipate a sufficient amount of the energy of impact (other than that portion of such energy needed to recenter the mechanism), either on closing of the mechanism, or on closing and return of the mechanism (note that the restricted flow of hydraulic liquid in the cushioning mechanism 130 on its return to normal is energy dissipating and thus cushion 130 has controlled recoil), so that the residual energy of impact, or a large part of it, is transmitted by friction to the lading and translated into kinetic energy in the lading, thereby holding lading forces to a minimum. Thus, in essence this makes the cushioning mechanism contemplated by my invention a dissipative energy system cushion as opposed to a conservative energy system cushion that stores and returns substantially all kinetic energy applied to it, although such dissipative energy system cushion should have sufficient energy storing and return characteristics to return the cushion and the railroad vehicle car parts between which the cushion is interposed, to neutral or centered position. Consequently, all friction, hydraulic, rubber, pneumatic and other types of cushioning devices employed for use in practicing this invention must be incorporated in dissipative energy system arrangements having the characteristics above indicated and the cushioning arrangements herein specifically disclosed are illustrative of such arrangements.

It should not be understood from what has been said above that some variation from a "100% efficient cushion," whether it be due to design limitation or otherwise, cannot be tolerated. For instance, there may be some instances in which the cushioning device may exhibit high force peaks but of such short duration as to not materially affect the action of the device, particularly with respect to the lading forces ultimately developed.

Returning again to an analysis of the test results mentioned above, reference is made to FIGURE 19 wherein lading force in pounds per square foot is plotted against cushion travel in inches for impact speeds of 10 miles per hour (the indicated levels for damage to canned goods and bottled goods had been determined by previous static tests). Curve 301 in this chart represents not absolute values, but only the slope of the lading force curve which might be expected to result from different cushion travels when calculated using the best-known techniques available prior to my invention. The slope of this curve would clearly indicate that, while there is some drop-off in lading force when extremely long cushion travel is provided, the drop is nevertheless so slight as to offer little promise.

Curve 302 shows the results which I actually obtained in my tests, and it will be observed that at about 21 inches of cushion travel, the lading force may be brought down below the damage level for the most fragile of all resilient lading, namely, gallon glass bottles, and that this curve tends to level out at around 30 inches of travel. Obviously, these test results exhibited a most amazing and unexpected drop in lading force as compared with previously calculated prophecies, with this inexplicable lading force drop coming within the range of approximately 20 to 40 inches of cushion travel. The same basic results have been achieved with the hydraulic cushioning unit shown in FIGURES 13–15.

Making use of some of the information determined from test results, I then attempted to re-calculate the lading forces which might be expected with various amounts of cushion travel, putting into the equations additional factors and assigning better values for the constants, and the curve resulting from this re-calculation is shown at 303. It is interesting to note that even this curve does not furnish the basis for predicting the amazing protection which may be furnished to lading when cushion travel of from 20 to 40 inches is provided.

The equations used to obtain values for plotting curves 301 and 303 are based on vibration analysis theory and the equation for the latter curve was worked out by me taking into consideration all the factors which I believed entered into the lading damage problem and could be represented appropriately in the equation. After working out the equation and plotting the curve 303, I verified the equation for conformity with accepted vibration analysis theory by referring to page 295 in "Mechanics of Vibration" by H. M. Hansen and Paul F. Chenea (1952) published by John Wiley & Sons, New York. The particular values for constants in these general formulae were, in the case of curve 301, deduced from previous tests on cartoned bottle lading, and, in the case of curve 303, were the best overall average values that could be assigned upon a review of all of the comprehensive testing program directed to this end, including the tests which produced curve 302.

It is easy to understand why persons skilled in the art have failed to seriously consider cushion travel in excess of ten inches or thereabouts (over and above draft gear travel) because it has been known for a long time that cushion travel in excess of ten inches resulted in relatively small additional reductions in coupler force. This is shown vividly in FIGURE 20 in which it will be observed that the coupler force curve as related to cushion travel tends to become asymptotic in character, thereby indicating that little reduction in lading damage could be expected with cushion travel exceeding ten inches.

With regard to curve 302, it was impossible to obtain lading force test data in the cushion travel range under about 18 inches, at a ten mile per hour impact, as the lading would have been destroyed or severly damaged, and this is why curve 302 is not shown for cushion travels under about 18 inches.

Figure 20:
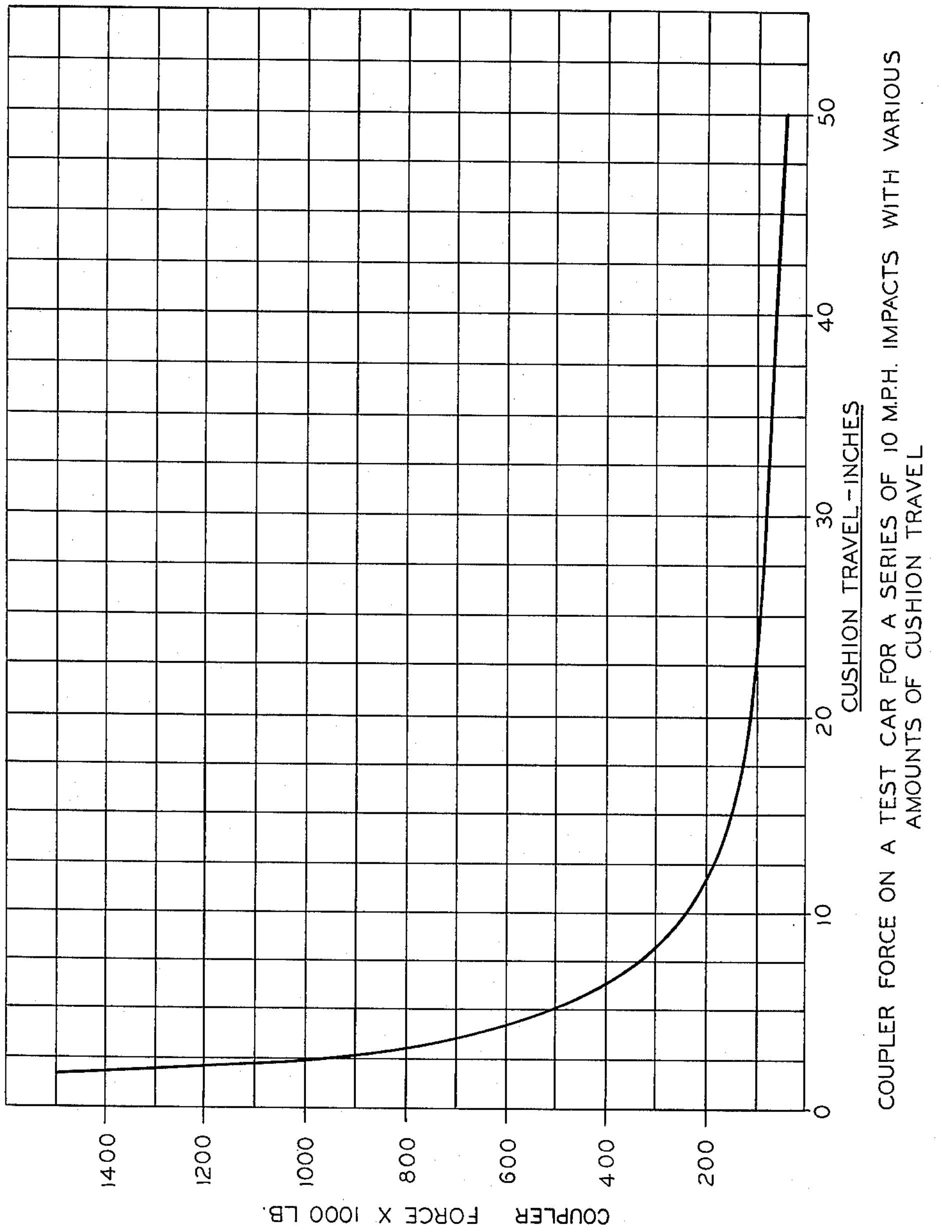
FIGURE 20 is a graph illustrating theoretical coupler forces that may be obtained with various 100 percent efficient cushion travel lengths for 10 mile per hour impacts.

The theoretical coupler forces involved in the coupler force curve of FIGURE 20 were found by employing the law of conservation of momentum, as expressed by the equation applicable to inelastic bodies (as railroad cars are essentially inelastic bodies):

$$M_1V_1=(M_1+M_2)V_2$$

where in $M_1$ is the mass of the striking car, $V_1$ is the striking car's velocity, $M_2$ is the mass of the struck car and its load, and $V_2$ is the combined velocity of the cars after impact. By rearranging the terms $$V_2=\frac{M_1}{M_1+M_2}(V_1)$$

Since mass times velocity equals momentum, $(M_2)(V_2)$ is equivalent to the momentum gained by the struck car (as it was initially stationary).

We also know from Newton's Second Law of Motion that when an unbalanced force F acts for a time T upon a body of mass M, changing the velocity of the body from $V_0$ to $V_F$, the relation between these terms is:

$$F=MA=M\frac{(V_F-V_0)}{T}$$

Thus, $FT=(M)(V_F-V_0)$, and the product FT is known as an impulse, which is numerically equivalent to the change in momentum.

In the system of masses and impact speed under consideration, the coupler force $F_C$ is the unbalanced force, whereby $F_CT=M_2V_2$. Thus $F_C$ may then be computed for the different values of T.

The length of cushion travel (under constant force-travel conditions) for any particular coupler force may then be determined from the fundamental expression $$F_c=\frac{V^2}{2d}(M_e)$$

wherein $d$ is the distance of cushioned travel, V is the impact speed, and $M_e$ is the equivalent mass of the striking car and the loaded struck car. The above formula determines the coupler force curve shown in FIGURE 20.

(B) *Time factors*

Another part of my concept has to do with time factors. Let us consider first what happens when a conventional car having draft gears, carrying a load of resilient lading, receives an impact at an excessive velocity. The draft gears cushion the blow to the extent of their capacity, and, during this cushioning action, the resultant coupler force (or cushion force, since in this instance the two would be substantially the same) applied to the car body starts to accelerate (either positively or negatively) the car body. As the draft gear closes, the coupler force rises sharply and the remainder of the blow is taken elastically by the car body to the extent that it can, with resultant increase in acceleration of the car body. Because of the rapid acceleration of the car body under these circumstances, the lading forces become disastrously large and damage to lading is bound to result. The peak forces experienced by the lading take place after the draft gears have closed, and after the coupler force has reached its peak.

Figure 21:
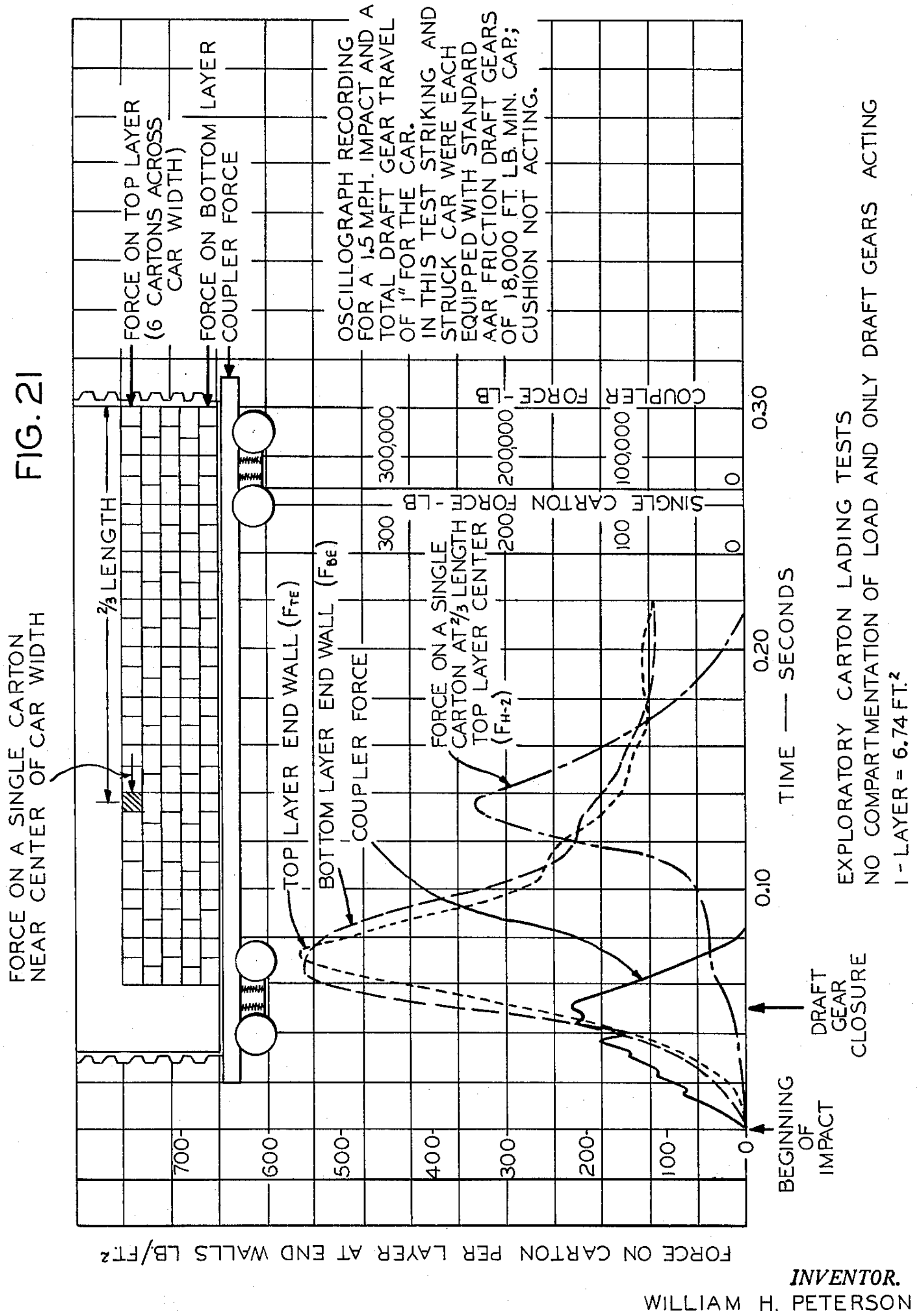
FIGURE 21 is a graph showing the phase relationship between coupler forces and the lading forces experienced by the indicated portions of the lading, loaded as shown in FIGURES 16 and 17, for a 1.5 mile per hour impact in which only standard draft gear were made operative to absorb the impact shock, and indicating also the time of draft gear closure.

This is illustrated in a general way by the chart shown in FIGURE 21 which shows the phase relationship between coupler force and peak lading force when a car equipped only with standard draft gears and carrying a load of resilient lading conforming to the test conditions already mentioned is struck at 1½ miles an hour. At higher speeds, the phase difference between peak coupler force and peak lading force would be accentuated.

In like manner, the same phenomena occurs with cushion underframe cars of 8 inch or 10 inch travel, although the forces involved, both with respect to coupler force and lading force, are of lesser magnitude for the same impact speed. As cartons are crushed and broken, this phase difference becomes more and more pronounced. This has been verified by actual slow-motion moving pictures taken of such cars at impacts of 8 miles an hour.

With this information at hand, it occurred to me that if the time duration of the cushioning action could be delayed beyond the time limit it takes the lading to experience peak forces (i.e. achieve maximum compaction), these peak lading forces could be reduced to safe levels. Of course, it would be impractical to extend the draft gear strokes but the lengthened cushion action could be obtained by employing a cushion device 30 between the draft gear and the lading.

Obviously, this concept ties in closely with the concept previously described of transforming some of the impact force into kinetic energy with respect to the load so that the final blow of the car end against the lading could be reduced or eliminated.

Figure 19:
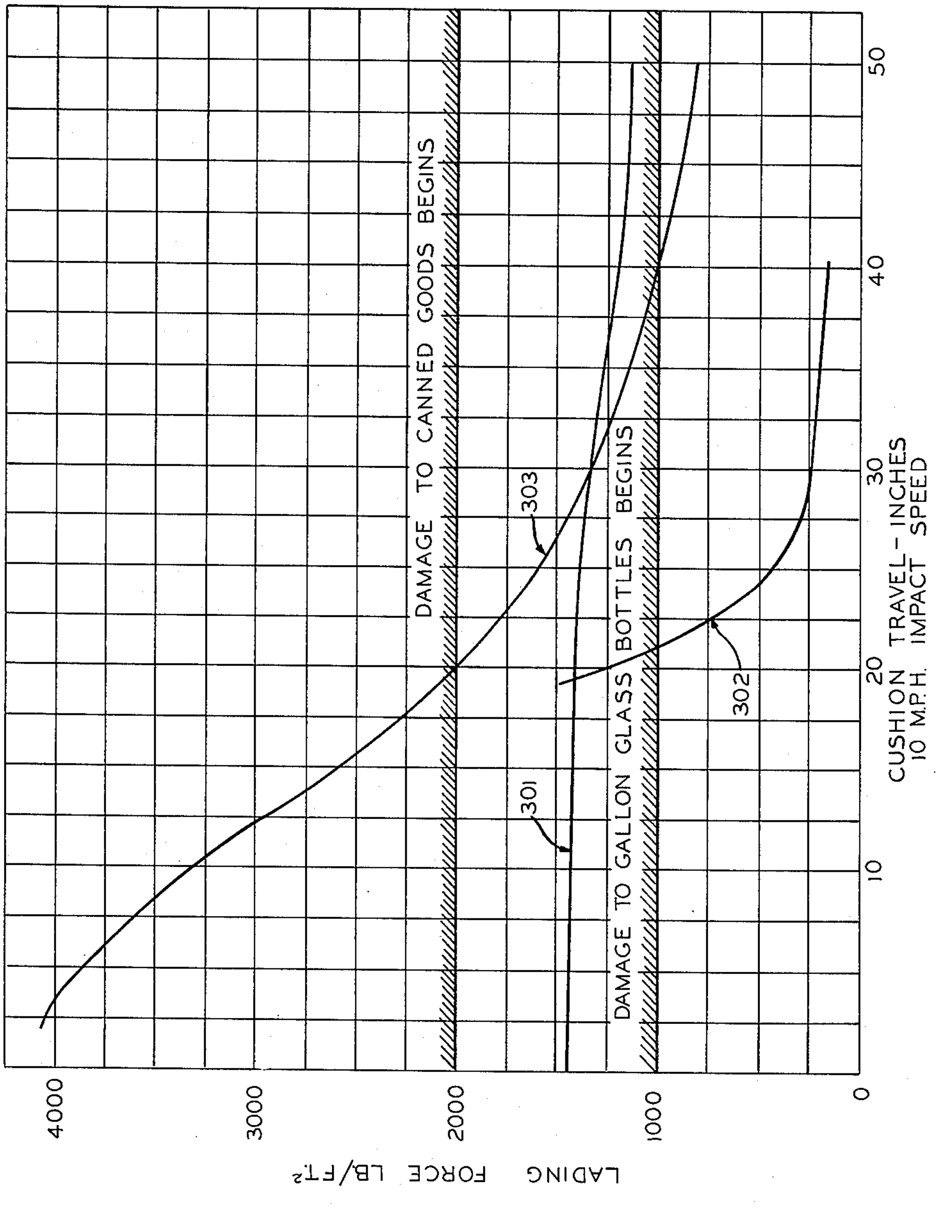
FIGURE 19 is a graph comparing several theoretical resilient lading force curves with a resilient lading force curve plotted from actual test data obtained during the course of tests of my invention, and with the shaded areas above the 1,000 and 2,000 lb./ft.$^2$ lines being used here and in other figures to show approximate damage levels.
Figure 22:
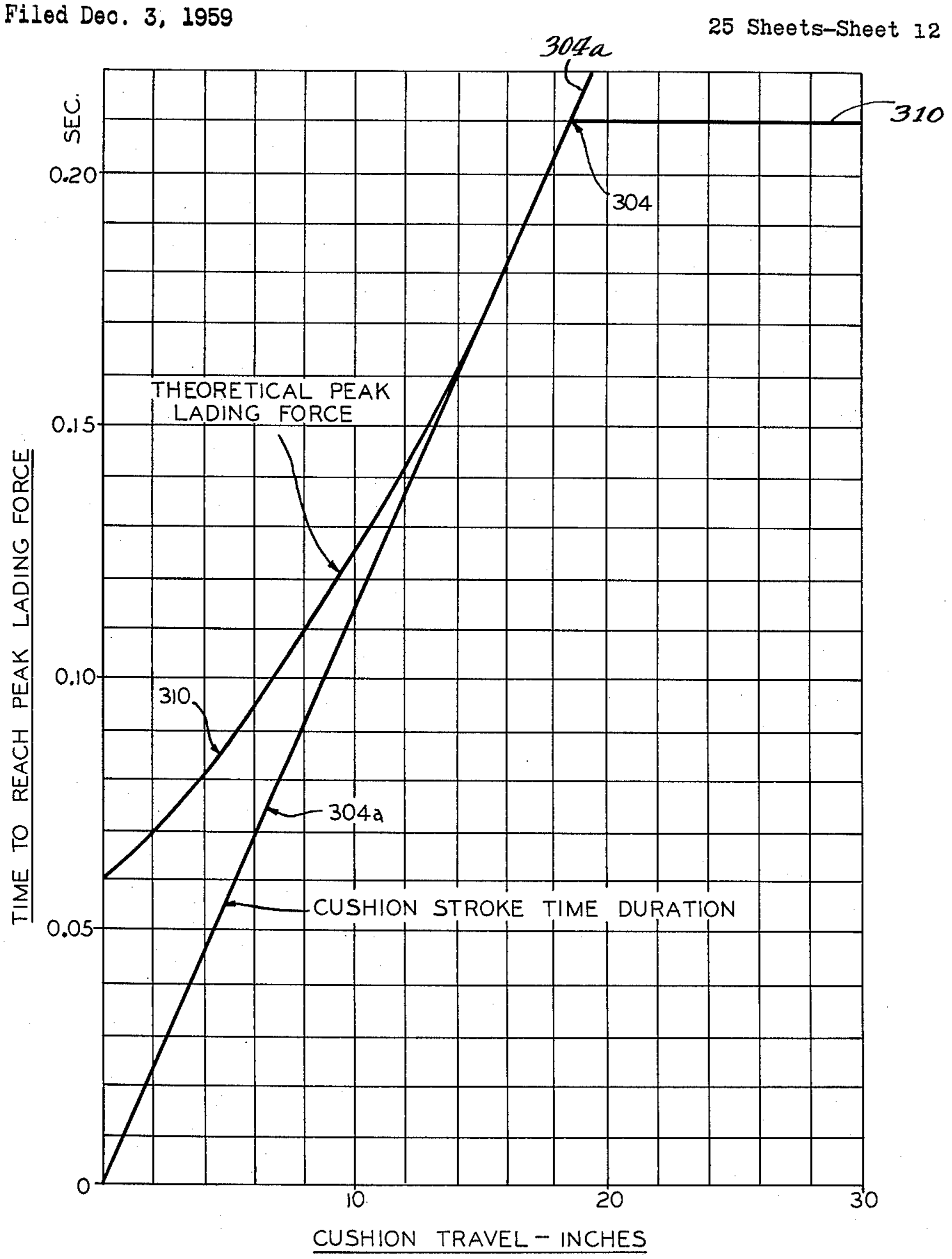
FIGURE 22 is a graph comparing the time occurrence of lading force peaks (for the test car loaded as shown in FIGURES 16 and 17) for different lengths of cushion travel at 10 mile per hour impacts, against cushion closure times for different lengths of cushion travel.

A calculation of the time required to reach peak lading forces for various lengths of cushion travel (for the system of masses and cushion device used in the tests that resulted in curve 302 of FIGURE 19, and assuming a 10 mile per hour impact speed), provides the theoretical results indicated by curve 310 of FIGURE 22. Theoretical curve 310 in FIGURE 22 is obtained by taking the lading force factor $(X-Y)$ computed for various time durations of cushion force pulse (as shown in FIGURE 2B of my parent application, Serial No. 797,529, and discussed at page 13, line 10 through page 14, line 20 thereof), and relating these time durations to their corresponding cushion travel distances in accordance with the chart shown at the right-hand side of said FIGURE 2B. This chart is based upon the fundamental formula $$T=\frac{2d}{V}$$

which gives the relationship between cushion travel, impact speeds, and time of cushion gear closure. Some typical values for this relationship are shown in the following chart:

TIME OF CUSHION CLOSURE FOR VARIOUS VELOCITIES AND CUSHION TRAVELS

| CUSHION TRAVEL—In.=d. | IMPACT SPEED—M.P.H.=V. | | | | | | | |
|---|---|---|---|---|---|---|---|---|
| | 4 | 8 | 9 | 9.6 | 10 | 11 | 12 | 14 |
| 8 | .227 | .114 | .101 | .095 | .091 | .083 | .076 | .065 |
| 10 | .284 | .143 | .127 | .119 | .114 | .103 | .095 | .081 |
| 12 | .341 | .171 | .152 | .142 | .137 | .124 | .114 | .097 |
| 18 | .511 | .256 | .228 | .213 | .205 | .186 | .170 | .146 |
| 19 | .537 | .269 | .239 | .224 | .215 | .195 | .179 | .153 |
| 20 | .568 | .285 | .253 | .237 | .228 | .207 | .189 | .162 |
| 30 | .852 | .428 | .380 | .356 | .341 | .310 | .284 | .243 |
| 40 | 1,135 | .570 | .506 | .474 | .455 | .414 | .378 | .324 |
| 60 | 1,702 | .854 | .760 | .711 | .682 | .620 | .568 | .487 |

TIME OF CUSHION GEAR CLOSURE—SEC.=T
FOR A CONSTANT FORCE—TRAVEL CUSHION WHERE $T=\frac{2d}{V}$ Curve 310 indicates that at approximately 18.5 inches of travel and at about .21 second of time, the theoretical lading force peaks (for the specific load under consideration) reach a maximum and that for all longer travels, the maximum lading force peak is reached after approximately the same time duration. The break in curve 310 is clearly indicated at 304.

Curve 304*a* indicates the time duration of the cushion device employed in the tests that resulted in curve 302 of FIGURE 19, for different lengths of cushion travel (again assuming the system of masses and impact speed of the tests resulting in curve 302). Curve 304*a* is a plot of the formula $$T=\frac{2d}{V}$$

based upon the values set forth in this above chart for ten mile an hour impact speeds.

A study of the curves of FIGURE 22 indicates that when cushion travel is extended to at least 18.5 inches, the peak lading forces that will be experienced by the lading on a 10 mile per hour impact will be experienced before the cushion closes. This confirms my original thinking that tests made should employ cushion travels well in excess of 18.5 inches, since travels in excess of this length would appear to provide the time factor necessary to show any lading force reductions.

The data attained in the tests previously described in connection with FIGURES 16 and 17, shows that curve 310 is substantially correct as indicated by the strain gauge records depicted in FIGURE 23. It is also apparent from FIGURE 23 that peak lading forces are reduced to comparatively low levels by extending the length of cushion travel beyond the time it takes the lading to reach peak forces. In this figure, curve 305 shows that the cushioning unit had completed its action in about .30 second, while the peak lading forces occurred at about .19 second, as indicated by curves 306 and 307, which show the lading forces recorded by strain gauges located at positions $F_{TE}$ and $F_{BE}$ respectively as shown in FIGURE 16. Of course, the .19 second recording is quite close to the theoretical calculated time for achieving the maximum lading forces indicated by theoretical curve 310.

Figure 23:
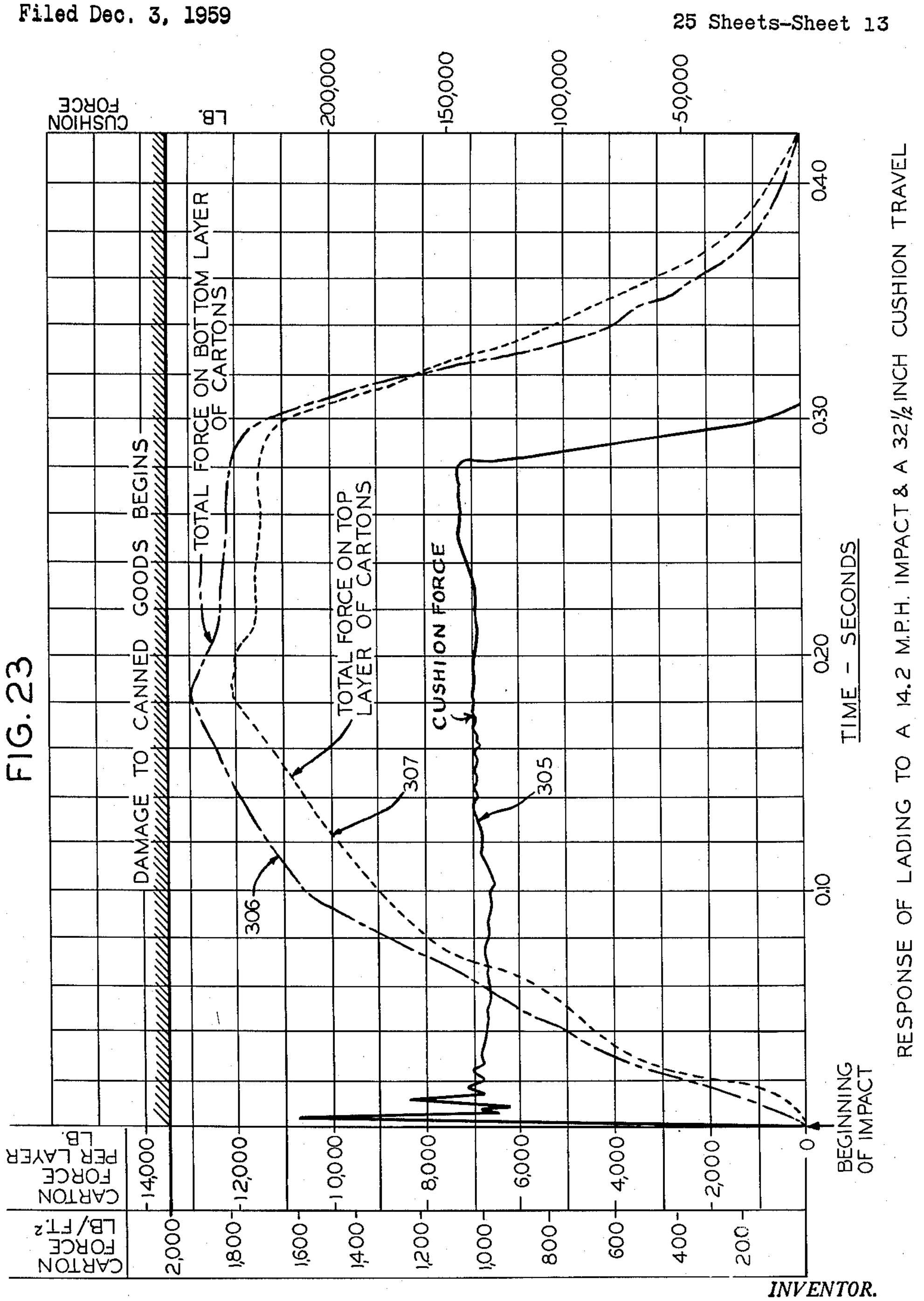
FIGURE 23 is a chart illustrating oscillograph records of lading forces (as experienced by the indicated portions of the lading of FIGURES 16 and 17) and cushion forces for 14.2 mile per hour impact with a 32½ inch cushion travel.

While the lading forces shown in FIGURE 23 rise above the damage level for glass bottle goods, canned goods are adequately protected even at a 14.2 mile per hour impact.

My studies of this data as well as the remainder of the data that resulted in curve 302 of FIGURE 19 make it apparent to me that where the cushion stroke is extended beyond the time it takes for lading to experience peak lading forces, the frictional forces and the inherent stability of the tiers of cartoned goods increasingly serve to impart the impetus of the impact to the load through the car floor, so that the load will be moving relative to the ground, and will have achieved maximum compaction against the end wall of the car by the time the cushion unit completed its action. Manifestly, curves 302, 306 and 307 indicate that the highly destructive action of the car end wall striking the load to produce peak lading forces can be materially reduced even with collision speed impacts.

Viewed in still another light, it is clear from these curves that the peak lading force on the cartons, and thus maximum compaction of the lading, occurred during the closing action of the cushioning device, and once maximum compaction had taken place and the load was started in its movement to or near the terminal velocity at which the struck car must move as a result of the impact, the completion of the cushion unit stroke had no effect in increasing lading forces.

It has been pointed out elsewhere in the specification that not only is this an object of my invention but it is also equally important to keep the peak lading forces below prescribed levels, and all of this is graphically shown in FIGURES 24 and 25.

Figure 24:
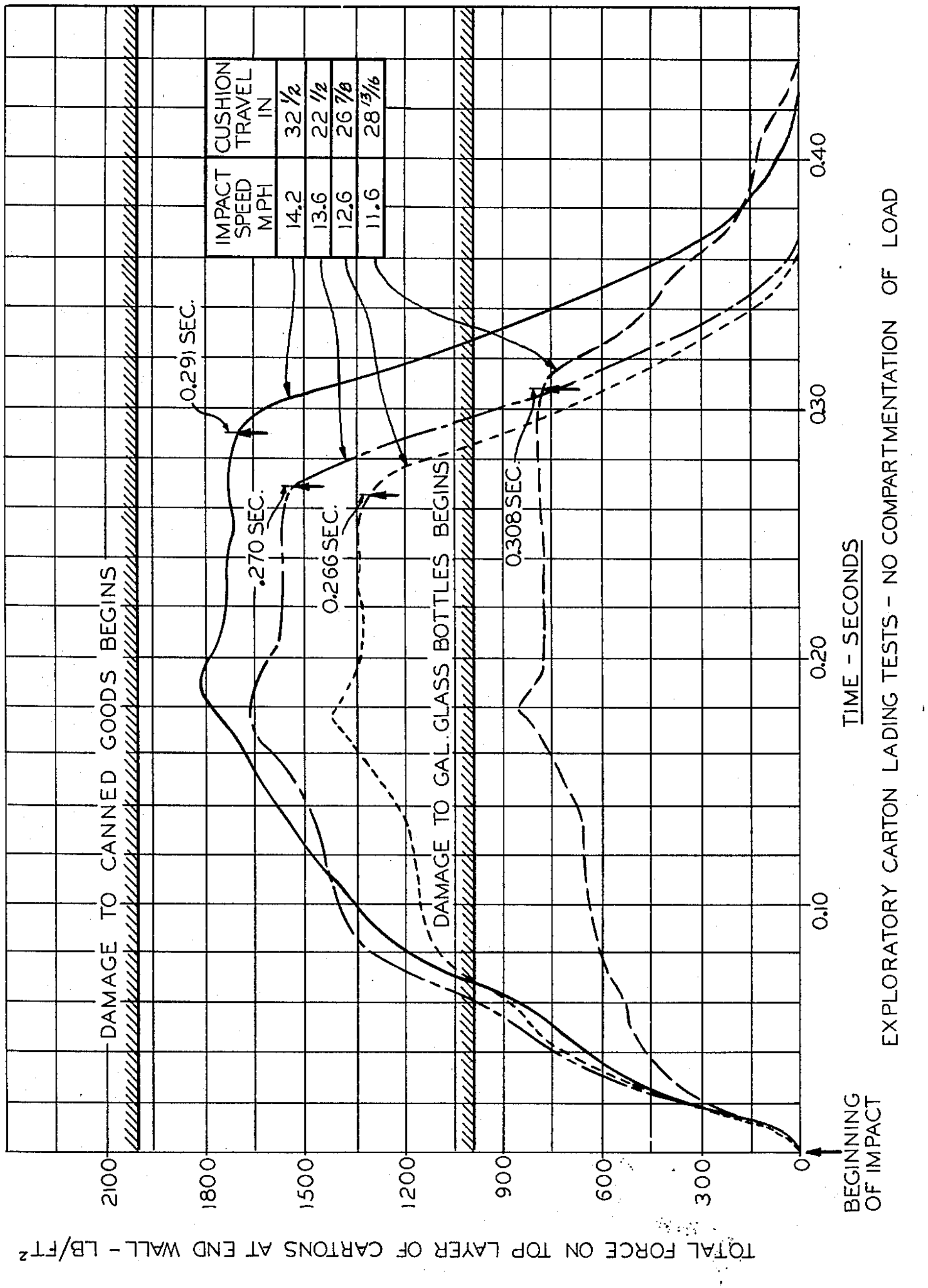
FIGURE 24 is similar to FIGURE 23, but illustrates the lading forces experienced by the top layer of cartons (in the test car of FIGURES 16 and 17) for impacts at the speeds indicated, with the arrows shown in association with each curve indicating the time of closure of the cushion device employed.

In FIGURE 24 the force experienced by the lading is shown in pounds per square foot for the different impact speeds and cushion travels indicated. The arrows shown in association with each curve indicate the time termination of the cushion force pulse and it will be observed that the cushion travel extends well beyond the time it takes for the lading to experience maximum compressive forces, and thus maximum compaction.

Figure 25:
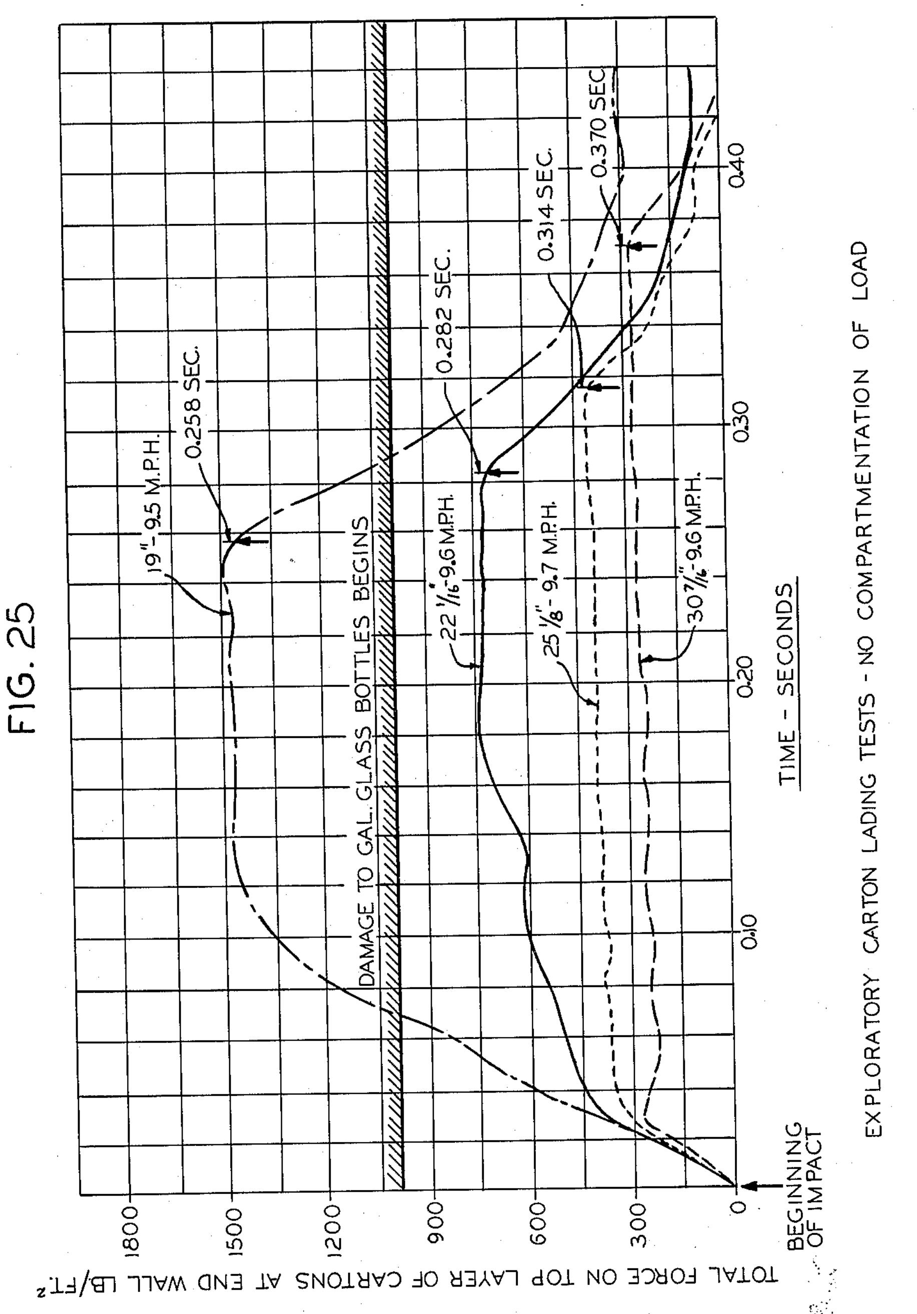
FIGURE 25 is similar to FIGURE 24, but shows the lading force experienced by the top layer of cartons for the cushion travels indicated at impacts averaging about 9½ miles per hour, with the arrows shown in association with the respective curves indicating the time of closure of the cushion device for each impact.

FIGURE 25 shows the lading force experienced by the top layer of cartons against the end wall at impact speeds of about 9½ miles an hour and shows the comparative results for 19 inches, 22¹⁄₁₆ inches, 25⅛ inches and 30⁷⁄₁₆ inches of travel (again the arrows indicate the time termination of the cushion force impulse). It is interesting to note how the characteristic of the lading response curve changes with the increase in travel of the cushioning unit. The very fact that the lading response curve for the 30⁷⁄₁₆ inch travel is so much reduced quantitatively, and of such a different character, demonstrates the increased influence of friction on the load and the inherent stability of the vertical tiers of cartons that occurs at longer travels.

While FIGURES 23 and 24 indicate that, with regard to the lading involved in the tests referred to in connection with FIGURES 16 and 17, the lading forces rose above the bottled goods damage level for impacts in excess of about 12 miles per hour, this must be contrasted with results achieved with cars equipped with standard cushioning devices, or cushion underframe cars having an 8 or 10 inch travel, wherein tests have shown that damage to bottled goods occurs at about 4 mile per hour impacts or less.

(*C*) *Maximum lading force versus impact speed*

Figure 26:
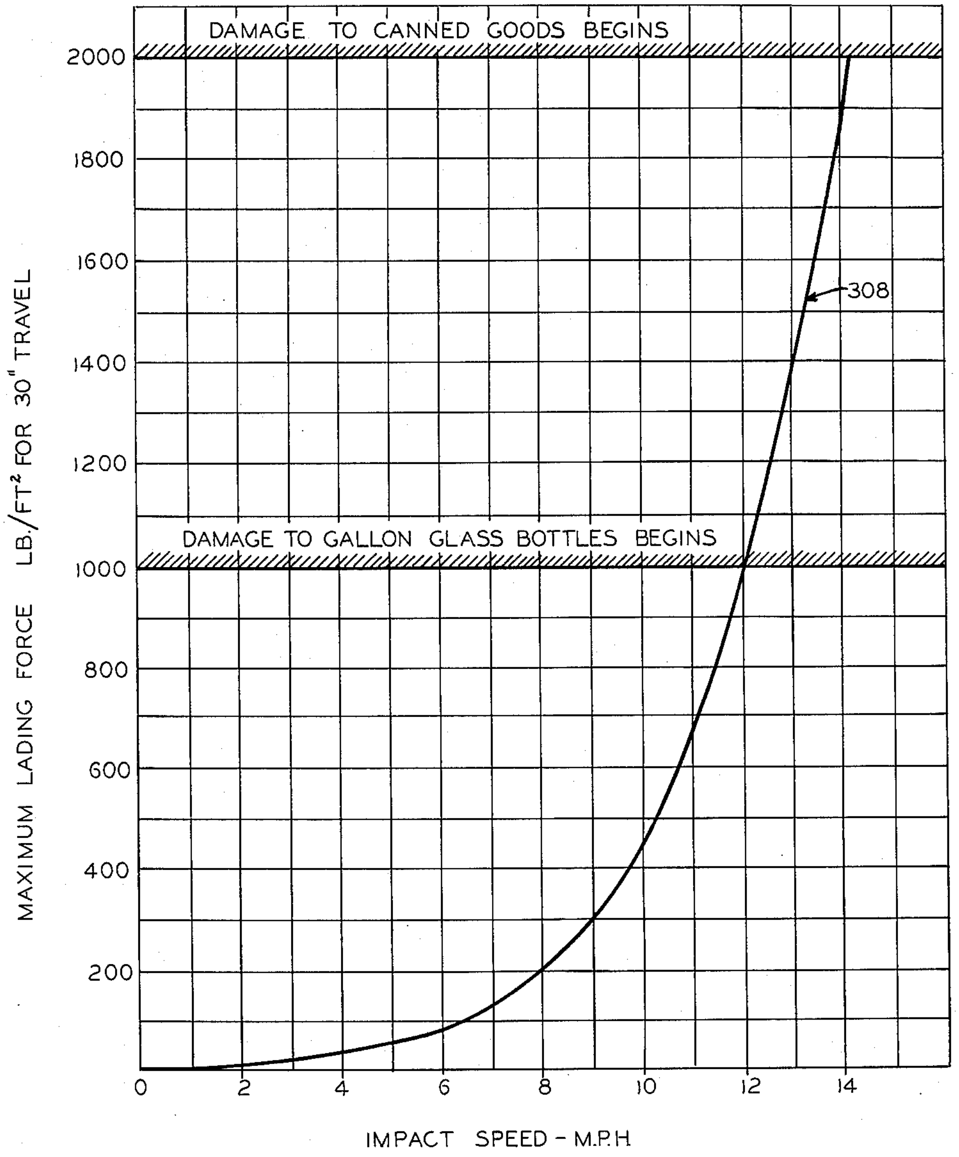
FIGURE 26 is a graph based on test data, but extrapolated to 30 inches of travel to show peak forces that should be experienced by the lading of FIGURES 16 and 17 for impacts up to about 14 miles per hour.

To give some idea as to how the maximum lading force climbs rapidly in relation to impact speed, even with long travel cushioning of the type disclosed in this application, reference is made to FIGURE 26 in which it will be seen from curve 308 that at speeds upwards of eight miles per hour the maximum lading force occasioned by the impact rises exceedingly rapidly. It is all the more amazing that by utilizing the teachings of this invention, the resilient lading may be fully protected at impact speeds which are almost of collision magnitude.

(*D*) *Effect of long travel on lading momentum*

Figure 27:
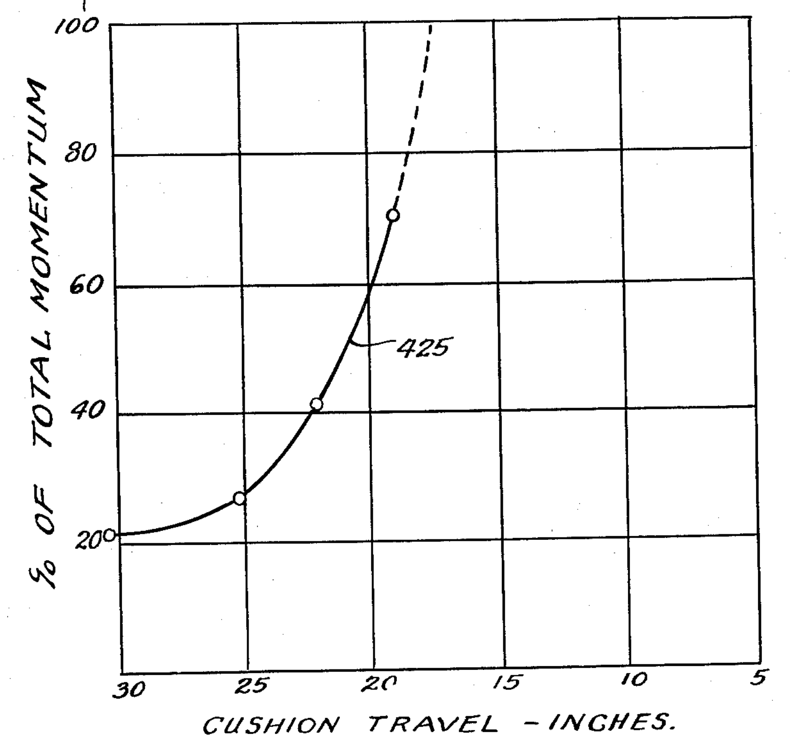
FIGURE 27 is a graph showing vividly the manner in which increased cushion travel results in sharp decreases in the percent of the total impact impulse being transmitted to the lading through the end wall.

FIGURE 27 illustrates diagrammatically the effect of long travel cushioning, within a part of the range contemplated by this invention, on the manner in which lading momentum is acquired or lost.

Lading momentum is acquired or lost by (*a*) impulses delivered by the car end wall to the lading, or (*b*) impulses transmitted to the lading through the frictional forces acting between the lading and the car floor and side walls.

My tests show that at cushion travels having lengths well under those contemplated by my invention, lading momentum is changed primarily by impulses delivered by the car end wall, while at cushion travel lengths in the range contemplated by my invention, momentum changes are effected primarily through the frictional forces acting between the lading and car floor and side walls.

FIGURE 27 illustrates tests results at 9.6 mile per hour impacts for varying cushion travel lengths under the test conditions already mentioned with regard to FIGURES 16 and 17, and it will be noted that with a 19 inch travel the percent of the total impulse applied to the lading by the car end wall was 70.6, while at 30.4 inch of travel, the percent of the total impulse applied to the lading by the car end wall was about 21.4.

Furthermore, the slope of curve 425 of FIGURE 27 shows that, at cushion travels conventionally employed, the ultimate momentum of the load will be achieved almost entirely by the impulse applied to it by the car end wall.

It will thus be seen that where a cushioning unit is employed having a closure travel on the order of 30 inches, an amazingly large amount of the total impulse transmitted by the impact is applied to the car lading through the frictional forces previously discussed, with only a relatively small impulse remaining to be applied to the car lading by the car end wall.

This explains why, at car impacts of 9.6 miles per hour (employing a car built in accordance with my invention), the lading force under the test conditions indicated is only 245 pounds per square foot, which brings it well within the range of complete lading protection.

The data forming the basis of FIGURE 27 was obtained by measuring the average impulse applied by the car end wall to the lading under the test conditions indicated, and also measuring the velocity of the lading after each impact. The momentum of the lading after impact could then be determined by known fundamental relationships. By dividing the average measured impulse applied to the lading by the resulting lading momentum for each impact (as determined from areas under lading force vs. time oscillograph records) the percent of the total momentum achieved by the car end wall impulse on the lading, for a particular cushion travel distance, was obtained.

(*E*) *Limited acceleration of lading through end wall*

The end goal in lading protection is to avoid exerting forces on the lading that will exceed its compressive strength. While it is easy to determine the particular crushing or compressive strength of a particular lading, it has not proved to be so easy to control the compressive forces applied to the lading as a result of railroad car impacts.

Tests have determined that gallon glass bottles packaged in cardboard cartons will begin to experience damage when the compressive forces applied to them are on the order of a thousand pounds per square foot.

It has already been pointed out with reference to FIGURES 2 and 3 that one of the basic principles of this invention involves the utilization of the inherent stability of the vertical tiers of cartons and the frictional forces acting between the cartons themselves and between the entire lading mass and the car body to effect most of the momentum change in the lading. Obviously, this involves consideration of acceleration forces because the lading can be accelerated only so much before the frictional forces will be overcome with the result that excessive forces are applied to the lading by the car end wall.

Since the acceleration of the lading during the impact can only be achieved by the pressure of the car end wall on the lading and the frictional forces acting between the car body and the lading (the car end wall involved will depend upon whether momentum is being added to or subtracted from the car) the ultimate acceleration (positive or negative) of the lading may be expressed as $A_1+A_2=A_{ULT}$, wherein $A_1$ is equal to the force of the end wall ($F_{e.w.}$) on the lading during a particular impact divided by the mass (M) of the lading, while $A_2$ is the summation of the frictional forces ($F_f$) through which the car body sides and floor act on the lading during the impact, divided by the mass (M) of the lading (see the diagram forming part of FIGURE 28 wherein the arrows indicate $A_1$ and $A_2$, respectively).

Furthermore, the maximum acceleration in "g's" that a lading may be accelerated by the car end wall without damage may be expressed as the crushing or compressive strength of a particular lading divided by its weight.

Under the test conditions indicated with regard to FIGURES 16 and 17, the five layers of cartons contacted 33.7 square feet of the car end wall. Assuming that the above mentioned damage level of 1,000 pounds per square foot applies to the lading in question, the maximum damage free acceleration ($A_1$) in "g's" of the load of FIGURES 16 and 17 (which weighed 51,200 pounds) achieved by car end wall pressure may be computed by multiplying the 33.7 square feet by 1,000 pounds (which gives the crushing or compressive strength of the lading) and dividing the product by 51,200 pounds and this equals 0.658 g's.

For a fully loaded boxcar carrying goods of the same type, the car end wall contact area was 47.3 square feet and the load weighed 95,600 pounds. Again assuming the 1,000 pounds per square foot damage level for the lading, the maximum acceleration of the load achieved by the car end wall pressure should be under 0.495 g's, to avoid damage.

In accordance with my invention, lading protection is achieved when $A_2$ is made sufficient high to keep $A_1$ below the latter's maximum values computed above (though, of course, these values will in practice depend upon the weight of any specific load and the amount of end wall surface contacted by such specific load).

Curve 430 of FIGURE 28 illustrates the acceleration, due to car end wall pressure of the lading employed in the tests described in connection with FIGURES 16 and 17, for a series of 9.6 miles per hour impacts at various lengths of cushion car travel. It will be observed that as cushion travel drops below 25 inches, the value of $A_1$ rapidly approaches and passes its damage free maximum.

*(F) Relation of invention to so-called "impact effect"*

It has become common practice for car builders to use such terms as "impact effect," "impact energy," "impact quantum" and the like in referring to the energies involved in inelastic impacts, as when railroad cars collide and are coupled. Thesse terms are commonly defined as being that quantity of energy change which is required to bring the speeds of colliding cars to their resulting common speed in any given impact situation. The mathematical significance of this term may be explained as follows: Referring to the previously described situation of FIGURES 2 and 3, and assuming for simplicity that car D is unloaded, the kinetic energy of car E before impact may be expressed as $$KE_1=\frac{M_1V_1^2}{2}$$

while the combined kinetic energy of cars D and E after impact is $$KE_2=\frac{(M_1+M_2)V_2^2}{2}$$

Tests have shown that for any given impact situation, $KE_1$ will always be greater than $KE_2$, meaning that a certain amount of kinetic energy is lost as the result of the impact. Since, in an inelastic impact, such as being considered here, the cars will move together after impact at the velocity $V_2$, this lost energy is the same as the energy specified in the definition of the terms "impact effect" and the like set forth above.

Thus, the term "impact effect" does not refer to or mean the kinetic energy acquired by a car as a result of an impact, which energy is transferred to a struck car through the cushioning device employed.

The energy involved in the so-called impact effect may be calculated by using the Law of Conservation of Momentum for inelastic bodies, and the relationship $KE_1=KE_2$ plus impact effect; by performing simple algebraic steps it will be found that the impact effect equals $$\frac{(M_1)(M_2)V_2^2}{2(M_1+M_2)}$$

In accordance with this invention, the cushion device employed as device 30 should be designed to dissipate in the form of heat the major portion of the energy represented by this so-called effect. Referring to FIGURE 23, if cushion force curve 305 shown thereon were plotted against inches of cushion travel, the area under the curve would represent the energy absorbed by the cushion during the specific impact indicated. This area measurement was made for the cushion device used in the tests referred to in connection with FIGURES 16 and 17, and it was found that the cushion device dissipated on the order of 85 percent of the energy supposedly involved in the "impact effect" for the impact conditions of FIGURE 23. The cushion device of FIGURES 13–15 substantially duplicates this energy dissipation. The percentage energy dissipation referred to immediately above is not to be confused with the previously defined 100 percent efficient cushioning device I prefer to use in practicing my invention.

The foregoing is offered to clarify the relationship of my invention with the fundamentals of impacts as so aptly depicted by the above referred to concepts of "impact effect," "impact energy," etc.

The expression "energy of impact" should not be confused with the expressions "impact effect," "impact energy," etc.; the former, that is "energy of impact," refers to the kinetic energy of the striking car, whereas the expressions "impact effect," "impact energy," etc. refer to the energy loss which occurs during the inelastic impact.

*(G) Influence of sub-dividing load*

One of the most striking features of my invention is that load-subdividers are not required to give adequate protection to even the most fragile type of resilient lading. This is brought out in the test results illustrated in FIGURE 29.

The graph of FIGURE 29 illustrates free standing impact speeds at which various arrangements will offer complete protection to resilient lading in the form of canned food packed in fibre cartons. In making the tests that resulted in the curves of FIGURE 29, compartmentation was employed which involved the use of removable compartmentizers that in effect divided the resilient lading into separate compartments. The figures from which the graph of FIGURE 29 was developed resulted from tests employing the same system of masses previously described including a moving striking car of 169,900 pounds gross weight and an initially stationary struck car of 52,600 pounds carrying a lading of 51,200 pounds composed of 900 cartons of canned animal food. Again, strain gauges were applied to the end wall in the manner indicated in FIGURE 16 to measure dynamic compressive forces exerted on the cartons, which are the above described lading forces. The two cars were free to move after impact.

It will be noted that when such a struck car employs thirty inches of 100 percent efficient cushion travel and in which all load dividers or compartmentizers were removed, the lading, even if it were glass bottled goods packed in fibre cartons, could withstand an impact of 12.0 miles per hour (the lading tested was undamaged after the 14.2 mile per hour impact previously mentioned). This is to be compared to the situation where only draft gears are acting and the cushioning means and all compartmentizers are removed, wherein the maximum impact speed that could be safely made is 2.4 miles per hour. Draft gears on the average will provide a cushion travel on the order of five and one-quarter inches.

It may be mentioned at this point that the afore-referred to friction acting between the cartons of a resilient load, as distinguished from the load's frictional contact with the sides and floor of the car, helps the load to protect itself and aids, in accordance with this invention, in the acceleration or deceleration thereof without damage. However, as a load is subdivided, as by using compartmentizers, its rigidity is increased without a corresponding increase in its internal friction, which introduces a surging characteristic to the response of the lading from impacts. Also, if the lading resilience is considered as being similar to that of a soft spring, when it is rigidized with load subdividers, in effect a stiffer spring has been made out of it. It is, of course, obvious that higher impact forces are realized with a stiff spring than with a soft spring. Thus, even though the contact area of the lading with the car is increased in proportion to the number of subdividers used, the total lading force obtained without them is not also reduced in the same proportion; rather, a different and much higher total lading force is obtained even though some reduction results. The net effect then, of using load subdividers, is to accomplish a lading force reduction, if any, that is considerably less than the proportion suggested by the increased contact area (assuming the principles of this invention are not employed).

This is why subdividing a load does not reduce lading forces in direct proportion to the number of compartmentizers used. Compartmentizers achieve their greatest effectiveness with shorter cushion travels since in such cases the car is so highly accelerated or decelerated that most of the beneficial inherent friction in the load is lost anyway.

In comparing the lading force curves in FIGURE 29, for 30 inches of 100% efficient cushion travel and 3 compartments and for 30 inches of 100% efficient cushion travel and all load dividers removed, it is apparent that little force reduction is achieved by using 3 compartments over that which exists with no load dividers. This further demonstrates that with this invention, it is possible to take a greater advantage of the inherent friction in the load in accelerating it during an impact whereas with load dividers the lading is accelerated more by pressure of the end wall and load dividers against the lading.

One of the principal advantages of this invention is that it achieves adequate lading protection without requiring compartmentizers, as indicated by the curves of FIGURE 29.

ARRANGEMENTS FOR ACCENTUATING THE EFFECT OF FRICTION FORCES ON THE LOAD

Since friction forces acting on and within a load play an important part in the practice of my invention, it will be apparent that the provision of suitable arrangements for accentuating the frictional effects will serve to further increase the protection provided by my invention.

For instance, the inherent friction within the lading itself may be accentuated by applying strips of gritty material or the like on tops and bottoms of the cartons 202, as indicated at 370 in FIGURE 30, so that strips 370 of adjacent superposed cartons engage each other. Strips 370 are applied to extend longitudinally of the car and may comprise any sticky substance, such as glue, to which a gritty substance such as sand has been applied. Alternatively, strips 370 may take the form of a suitable adhesive tape to the back of which sand or other grit is bonded, or the gritty or abrasive material may be applied in the form of spots heterogeneously applied to the carton sides, tops and bottoms. Also, the additional friction desired can be obtained by employing special inks now made for this purpose, or, the surface of the cartons may be specially treated to achieve a maximum coefficient of friction, or the results desired may be achieved in any other suitable manner.

Also, while the tiers of cartons may be bound to the car floor by suitable tie-down devices, to increase the friction between the lading and the car floor as well as that within the lading itself, the concepts of this invention eliminate any need for such arrangements together with the cost and maintenance thereof and labor required to make them operative.

MODIFIED FORMS AND COMPONENTS OF THE INVENTION

Those skilled in the art will appreciate that the basic principles of my invention may be incorporated in a wide variety of structures to effect the lading protection above described. The various possible alternate or modified forms of the invention relate not only to different car structures adapted to give the long travel cushioning action contemplated by this invention, but also to different cushioning or shock absorbing devices per se that will transfer and absorb the impact energies involved.

Tests have shown that the long travel hydraulic cushion device diagrammatically illustrated in FIGURES 13–15 is a most efficient arrangement for controlling the long travel cushioning action desired.

However, a suitable alternative arrangement is diagrammatically illustrated in FIGURES 31–34, which is designed to frictionally control the movement of a draft and buffing column with respect to a car body in a cushion underframe car structure.

The device 390 is shown applied to friction column 391, which is circular in cross-sectional configuration in the form illustrated and is fixed, as by suitable keys (one of which is indicated at 380 in FIGURE 32), within draft and buffing column **391*a*. The buffing column 391*a*** may be of the type described in Meyer Patent 2,764,299, as may the remainder of the cushion underframe structure, with appropriate modifications being made to accommodate the specific cushion device of FIGURES 31–34, as will be understood by those skilled in the art.

The device 390 comprises a plurality of clamping structures 393 received about the column 391 and actuated by a hydraulic cylinder 394. The individual clamping structures 393 in the embodiment illustrated each comprise diametrically spaced channel-shaped members 395 and 396 (see FIGURE 32) which are pivoted together by pin 397, and which are respectively secured to the spaced channel-shaped beams 398 and 399, as by rivets 400. The lower beam 399 on which single acting cylinder 394 rests is fixed in any suitable manner to a long travel velocity sensing cylinder 401 which in turn is fixed to the car underframe, as by the cross tie structure shown diagrammatically at **391*b*, while piston rod 412 of cylinder 394 is fixed to beam 398**.

Referring now to FIGURE 33, it will be seen that the velocity sensing cylinder 401 has extending therethrough a control rod 402 which has fixed thereto in any suitable manner piston head 403. The control rod is secured to the column 391 at its ends 420 (only one of which is shown). The chamber 404 of sensing cylinder 401 tapers from its ends 405 and 406 to its center portion 407 (it diverging from the ends of the cylinder 401 to the center portion thereof), and the ends 405 and 406 are connected together externally of the cylinder 401 by conduits 408 and 409 which join at two-way check valve 410 (see FIGURE 34) and lead to cylinder 394 through conduit 411 which is in communication with the head end 414 of piston 415.

The two-way check valve 410 in the illustrated form merely is illustrated as a ball 416 that may roll between valve seats 417 and 418, depending upon the pressure flow in conduits 408 and 409. The ball 416 is prevented from rising into conduit 411 by appropriate stops 419.

When an impact is applied to the draft and buffing column 391, for instance, in the direction of arrow 421 of FIGURE 33, the control rod 402 moves to the right of FIGURE 33 and forces hydraulic liquid, with which the sening cyclinder 401, conduits 408 and 409, and hydraulic cylinder 394 up to piston head end 414 are filled, from the end 405 of chamber 404 through conduit 408, which moves ball 416 against seat 417; thence the hydraulic liquid flow is through conduit 411 into the cylinder 394, which forces the piston 415 and its rod 412 upwardly with respect to beam 399 and thereby exerts a clamping action on the friction column through beam 398.

As the movement of the draft column proceeds under the impetus of the impact, the taper of chamber 404 meters the flow of hydraulic liquid past piston 403 and thus controls the pressure of the hydraulic liquid acting on piston 415. Preferably, the taper providing this metering action is such as to provide a substantially constant force travel characteristic with regard to the movement of draft column 391 with respect to clamping structures 393, and the frictional forces acting therebetween.

The clamping structures 393 thus will exert a gradually increasing holding action on the draft column 391, which effects transfer of the impact momentum to the underframe and dissipates excess energy in the form of heat.

Impacts from the opposite direction are handled in substantially the same manner, though the flow of hydraulic liquid is through conduit 409 into cylinder 394.

Of course, the cylinder 401, control rod 402, the friction column 391, and the draft column or center sill 391*a* are arranged to provide a travel on the order of 30 inches and the center sill 391*a* is returned in any suitable manner to its neutral position after the cushion device 390 has completed its stroke, as by suitable compression springs (not shown) which act between the car underframe and the draft column 391*a* in a manner similar to that inherent in the basic Duryea Patent 1,693,194. As the control rod 420 is returned to its neutral position, the piston 403 relieves the pressure on the hydraulic liquid thus releasing the clamp devices 393.

FIGURES 35–41 illustrate diagrammatically a number of distinctly different car arrangements that employ the principles of my invention. These drawing figures are included primarily to illustrate the scope and applicability of the invention in the railroad field.

In the embodiment of FIGURES 35–38, the invention is applied to the freight handling system disclosed and claimed in the copending application of Jack E. Gutridge and William R. Hummel, Serial No. 699,759, filed November 29, 1957, the disclosure of which is hereby incorporated by reference. Reference to this application may be had for a specific description of this freight handling system, though for purposes of this application it may be pointed out that the system of that application contemplates the use of a railroad car 500 provided with retractable brackets 502 and 504 at its rear and front ends, respectively, a highway chassis (not shown) and a freight container 506 which is separably mounted on said chassis.

The railroad car 500 is provided with a fifth wheel stand where indicated at 510 for engagement with the kingpin 511 of the container.

The freight handling system of the Gutridge and Hummel application contemplates that (in one arrangement therein disclosed) the freight container 506 when carried by the chassis will be backed onto the railroad car 500 when the brackets have been lowered to their operative positions (the positions of FIGURE 35). After the container is backed over both the front and rear brackets, air springs of the chassis are deflated to rest the container on the brackets after which the chassis is withdrawn from underneath the container and the fifth wheel stand 510 elevated to releasably engage the kingpin 511. Suitable locking devices are employed to lock the brackets 502 and 504 in extended and retracted positions. Blocks 513 of container 506 engage the front brackets 504 prior to the time that the fifth wheel stand is elevated to engage the kingpin and lift the front end of the container off brackets 504.

In accordance with my invention, the fifth wheel stand 510 is arranged to provide the long travel cushioning action hereinbefore described, in the manner suggested by FIGURES 37 and 38, and the rear brackets 502 are provided with rollers 512 upon which the rear end of the container rests. To accommodate the relative movement between the container 506 and the car 500 during the absorption of longitudinal impacts, the illustrated stand 510 may thus include a hydraulic cushioning device 130 located where indicated in FIGURE 38.

As indicated in FIGURE 37, the fifth wheel stand 510 may comprise spaced trackways 514 (fixed to the bed of car 500 and proportioned to accommodate on the order of 30 inches of movement of the stand with respect to the car) in which rollers 516, that are journalled on shafts 518 and 520, respectively, ride. The shafts 518 also journal the lower ends of vertical struts 522, while the shafts 520 journal the lower ends of telescoping diagonal struts 524, each of which is composed of members 525 and 527 which may be secured in the retracted position of FIGURE 37 by suitable pins 526 passing through both of these members. The pins 518 and 520 are journalled in a channel-shaped housing structure 528 which is received over the hydraulic cushion unit 130 and is free to move longitudinally of trackways 514. The closure members 136 and 137 of the unit 130 (see FIGURE 38) are placed between spaced abutments 530 fixed to the bed of car 500, and lugs 532 carried by each end of the housing structure 528 also engage the closure members 136 and 137 of the hydraulic unit (in the arrangement of FIGURES 35–38). Lugs 532 are fixed to angle members 533 that are in turn fixed to housing member 528.

The fifth wheel stand 510 may include a fifth wheel plate structure 534 of any suitable design that is provided with an appropriate latching device for releasably engaging the kingpin 511 of container 506 to lock the container 506 to the car 500 for transit. The specific fifth wheel stand 510 illustrated is adapted to be elevated and lowered by a chain secured between shaft 536 (see FIGURE 37) and the rear end of, for instance, the trailer chassis, and in its elevated position, lifts and holds container 506 somewhat above brackets 504. The upper ends of the vertical and diagonal struts are pivotally secured to the shaft 536 somewhat as shown, and in the illustrated embodiment the fifth wheel plate structure 534 is pivoted to links 540 in any suitable manner, links 540 being fixed to shaft 536 in the illustrated embodiment. The vertical struts may be secured together by tie plate 542 for reinforcing purposes.

Parenthetically, it may be mentioned that the specific kingpin latching device and elevating mechanism therefor illustrated are shown only for purposes of illustration, since for purposes of my invention any fifth wheel stand structure mounted for long travel cushioning movement in the manner suggested by FIGURES 37 and 38 will be satisfactory.

The rear end of the container body may be provided with angle members 544 against which the rollers 512 engage.

As indicated in FIGURE 36, rollers 512 may be rotatably mounted in any suitable manner in housing structure 550 that is pivoted to stanchion 552 between bracket lugs 559, as at 554 in any suitable manner. Pin 556 is employed between bracket lugs 559 and housing 550 to hold the brackets 502 in the retracted position of FIGURE 36, the pin 556 being applied to hole 558 as well as bracket lugs 559 to hold the brackets 502 in the position of FIGURE 35.

Brackets 504 may be of the type described in said Gutridge and Hummel application, and are shown only diagrammatically, though it may be pointed out that they comprise a shelf-like member 561 pivoted as at 563 to the respective stanchions 565 and held in either the retracted (vertical) position by suitable pins 567 passing through brackets 569 and suitable holes 571 formed in members 561 or the extended (horizontal) position in which the members 561 rest against the tops of stanchions 565.

When a container 506, resting on brackets 502 and 504, is secured to the fifth wheel stand 510 (which elevates it above brackets 504, though it continues to rest on rollers 512), impacts applied to the railroad car 500 will be absorbed in accordance with the principles described above (the container floor corresponding to platform 43 of FIGURE 3). The relative movement between the container and the car occurring during contract and extension of cushion 130 is accommodated by rollers 512.

When the car 500 employs an underframe of the types shown, for instance, in FIGURES 4–12, the fifth wheel stand may be merely a simple uncushioned elevatable jack or support structure, and the same beneficial results will be provided, though in addition, the car structure itself will be protected against longitudinal impacts.

In the showing of FIGURE 39, semi-trailer container body 560 is shown applied to car 500 (brackets 504 not being shown for clarity of illustration); the semi-trailer kingpin is secured to the fifth wheel stand 510 (the latter being proportioned to raise body 560 off its landing gear 562 in the position shown). Stand 510, of course, includes the cushioning arrangements shown in FIGURES 37 and 38, and front and rear brackets 502 and 504 are locked in their inoperative positions, the body 560 at its rear end resting on its wheels 564.

The semi-trailer 560 may be positioned on the railroad car 500 in accordance with standard piggyback practices, and suitable provision may be made for guiding movement of the trailer 560 with respect to car 500 during the absorption of impacts (such as guide rails 568 on either side of the car).

Referring now to the showing of FIGURE 40, reference numeral 580 generally indicates what is intended to represent a conventional flatcar carrying a carriage structure 581 arranged to support a conventional form of freight container shown in outline at 582.

Interposed between the carriage structure 581 and the bed of the flatcar 580 is a long travel cushioning arrangement, arranged in accordance with the present invention, where indicated by reference numeral 583.

The carriage structure 581 is of a very simplified nature and includes a pair of end bolster structures 584 having secured therebetween a pair of spaced beams 585, which in the form shown, are of channel-shaped cross section. The carriage 581 rides on rollers 586 journaled at the ends of the bolster structures 584 and riding in tracks 587 fixed to the flatcar bed.

The cushioning arrangement 583 generally comprises a hydraulic cushion device 130 applied between beams 585 and interposed between stops 588 fixed to the flatcar. The closure members 136 and 137 of the hydraulic device also engage suitable lugs 589 that are fixed in spaced pairs to the respective beams 585.

The bolster structures 584 adjacent each end thereof carry a cone-like bracket structure 590 of a well-known form that, respectively, engage within complementary recesses (not shown) formed in the undersurface of the container 582. The bracket structures 590 and the corresponding recesses in the container conventionally are formed with alignable holes to receive suitable latch pins, as is well-known in the art.

When longitudinal impacts are applied to the car 580, the cushion arrangement 583 effects the cushioning action contemplated by my invention, and the carriage structure 581 rides on tracks 587 the 20 to 40 inch distance necessary in accordance with my invention. This arrangement provides complete protection to lading within container 582 as well as to the container itself. Since freight containers must be of fairly light construction because of weight limitations for highway transit, the benefits of this invention necessarily will permit railroad use of such containers to an extent heretofore not considered feasible.

The showing of FIGURE 40 deals with a device arranged to handle seagoing or maritime containers that are designed to form trailer bodies, but obviously the container 582 may assume any suitable form and may be secured to the carriage structure in any suitable manner. Furthermore, the arrangement for guiding the longitudinal movement of the carriage structure with respect to the flatcar may be of any suitable type, the guiding action of the track sides 592 being illustrative only.

In the showing of FIGURE 41, reference numeral 600 generally indicates a deckless flatcar having an underframe composed essentially of bolster structures 602 connected together by a center sill structure 603 having the well-known Z–26 center sill cross-sectional configuration. The bolster structures 602 are connected by conventional center plate and kingpin arrangements to conventional trucks 604, which are only diagrammatically illustrated.

The car 600 supports at its ends freight container 606 (which is shown in outline). Container 606 rides on rollers 607 rotatably mounted at the ends of the bolster structures, rollers 607 being formed with annular flanges 608 to maintain the freight container properly centered with respect to the car 600.

A long travel cushioning arrangement having the characteristics contemplated by this invention is interposed between the car 600 and the container 606 where indicated by reference numeral 609. The arrangement 609 includes a hydraulic cushion device 130 received between the two Z-members 610 that make up the center sill structure 603 and applied between the spaced lugs 611 that are fixed in spaced pairs to the respective Z-members 610. The closure members 136 and 137 of cushion device 130 also bear against spaced stops 612 fixed to sliding plate 613, which, in the form shown, includes hooked sides 614 that are received over tracks 615 fixed to the sides of the center sill structure. In the form illustrated, plate 613 is provided with a number of upstanding pins 616 which lodge in correspondingly located recesses formed in the undersurface of container 606.

The remainder of the car 600 need include only those structures required to make operative the conventional safety and other apparatus required by A.A.R. rules, some of these being diagrammatically indicated in the drawing, such as the hand brake 617 and a platform 618 for operating same and uncoupling device 619 for unlocking coupler 620, and the ladder arrangement generally indicated at 621.

It will thus be seen that when longitudinal impacts are applied to couplers 620, the cushioning arrangement 609 effects on container 606 the long travel cushioning action contemplated by this invention. As the cushion 130 contracts and returns to its extended position in performing its intended function, rollers 607 permit the necessary relative movement between the container and the car. Of course, a sufficient spacing must be allowed between the ends of the container and car end structures such as guard wall 622 to permit the long travel action contemplated by this invention.

The cushion rack arrangement shown in FIGURE 40 is specifically disclosed and claimed in the copending application of Jack E. Gutridge et al., Serial No. 21,056, filed April 8, 1960, and the container car arrangement shown in FIGURE 41 is specifically disclosed and claimed in the copending application of Kenneth J. Austgen, Serial No. 9,135, filed February 16, 1960.

GENERAL SUMMARY OF INVENTION

The competition between air, rail and highway transportation is one of the sagas of current American history.

Already air transportation has practically destroyed the rail passenger business, and highway truck transportation has made great inroads on rail freight transportation. One reason for such inroads is because of the damage done to certain classes of rail freight which cannot withstand the impacts which railroad cars often receive when the trains are being made up in classification yards.

The railroads pay out annually over one hundred million dollars a year on lading damage claims and the greater part of the damage claims arise out of excessive longitudinal impacts delivered to cars containing the lading. The cost of investigating the claims and processing them is also enormous and adds materially to the drain from railroad revenue. The problem of freight lading damage is obviously one of the most serious problems facing the railroad industry today.

The same excessive longitudinal impacts which cause damage to lading also in most instances cause damage to the car structure itself. The cost of repairing such cars further substantially reduces the opportunity of railroads to operate at a profit.

Not only is the monetary cost of lading damage, and freight car repair as a result of such damage, of importance to the railroads, but it is even more distressing that many shippers because of the lading damage problem, have found it expedient to ship their goods by truck. This situation coupled with the loss of substantial segments of the passenger transportation business has helped to place the railroads in their present strained financial circumstances.

Although the lading damage problem has existed from the beginning of railroading, and many investigators and concerns having a vital interest in this problem have given their best efforts to find a solution and have spent many millions of dollars in this effort, none has come up with an answer prior to the invention disclosed herein. The reason for this failure can be rather simply explained. It was generally believed that lading damage was roughly proportional to coupler force, and the coupler force curve indicated that when one extends cushion travel beyond 8 or 10 inches, the shape of the coupler force curve would indicate that very little reduction in lading damage could be expected, unless one went to extremely long travel lengths and even then, the results were not assured. When it is appreciated what additional car structure changes must be made in order to have extremely long travel lengths, one can easily understand why this approach to lading damage protection was not promising or pursued.

There were some investigators who attempted to solve the problem through vibration analysis studies, but even this approach did not offer any substantial promise of providing a real answer to the problem, and the conclusions reached were so varied as to lead nowhere.

One should bear in mind that the problem with which I was confronted was the protection of lading at high speed impacts, because conventional draft gears and cushioned underframe cars of the prior art satisfactorily protected lading at low speed impacts. The difficulty was that all known prior approaches to the problem of providing adequate lading protection at high speed impacts offered no promise.

Whether one started with the commonly accepted concept that lading force is roughly proportional to coupler force, or whether one thought in more sophisticated terms in the light of vibration analysis theory, as represented by curve 301 of FIGURE 19, there was nothing in either of these approaches which remotely suggested any benefits to be gained by extending travel to 20 inches and beyond unless one possibly went to extreme distances; and, even then, there was no real assurance that substantial benefits could be gained. The state of the art at the time I made my invention makes the results depicted in FIGURE 18 stand out in bold relief as revealing amazingly unexpected and unpredictable benefits which can be achieved with the 20–40 inch range of cushion travel disclosed herein.

Even when I had the benefit of my own research and tried with hindsight to explain through vibration analysis the results which I had observed in tests as represented by the curve 302, the best I could do with new equations and values was to get curve 303, which only indicated lading force reductions in direct proportion to cushion force reductions for cushion travel distances in the range with which I was concerned, and in this respect, the promise offered by this curve was no more encouraging than the already commonly accepted concept that lading force follows coupler force in substantially direct proportion in the travel range under consideration. However, it should be understood that no one to my knowledge had the values to plot curve 303 until after I had made my invention and tested it.

Figure 18:
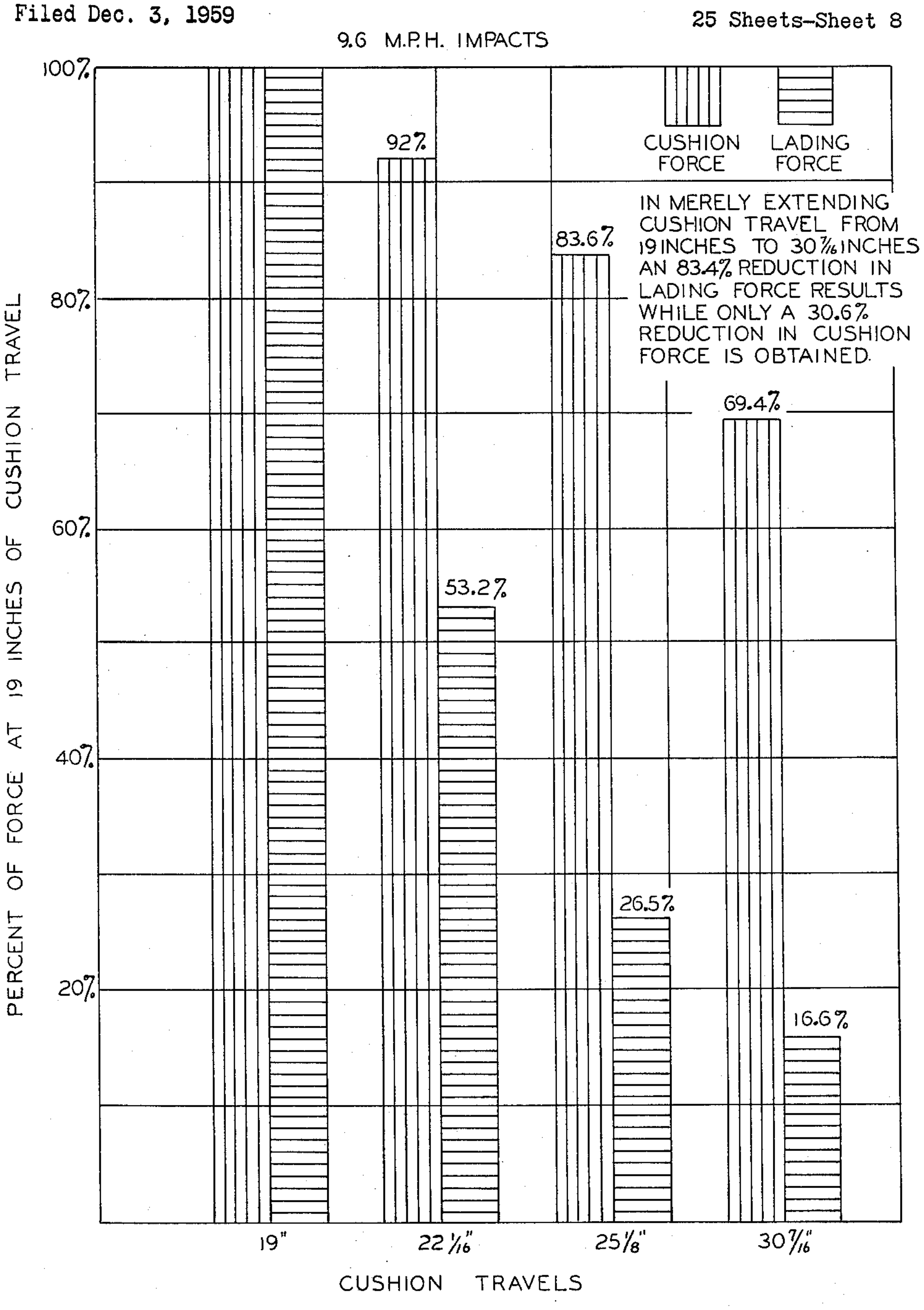
FIGURE 18 is a bar chart illustrating the unexpectedly high percent reduction of lading forces, as compared to coupler or cushion forces, when cushion travel is extended from 19 inches to 30 inches.

It is a significant fact that if I were to take the theoretical curve 303 of FIGURE 19 and make a bar chart corresponding to FIGURE 18 based upon this curve alone, the cushion force bars and lading force bars would be of the same height for each given cushion travel distance.

With this background in mind, the advantages which are gained by the practice of my invention become noteworthy. Briefly, these advantages include the following:

(1) Railway cars can now be built capable of cushioning either resilient lading or rigid lading and give substantially one hundred percent protection to such lading and to the cars themselves even when impacted against a string of standing cars at speeds of 10 miles per hour or higher.

(2) It is possible to design railway cars using less material because of the reduction which my invention makes in the end wall pressures exerted by lading during impact.

(3) The greater protection which my invention provides for lading enables goods to be packed in less expensive containers with consequent savings to the shipper.

(4) Goods which have heretofore been thought too fragile to ship by rail can now be shipped by rail and endure the longitudinal impacts to which the cars are subjected in classification yards. The high revenue which this class of merchandise can earn for the railroads is tremendous.

(5) My invention does not require compartmentizers; it sharply reduces dunnage and bracing now being used according to recommended A.A.R. loading practices; an it very substantially lowers the cost of labor and material in applying such devices and in loading and unloading cars.

(6) The savings effected by the railroads in eliminating lading damage claims due to excessive longitudinal impacts and car repairs resulting therefrom is a staggering amount.

(7) One of the bright spots in the railroad industry during recent years has been the rapid growth in highway-trailer piggyback service, but unfortunately, the highway trailers, and particularly the end walls of the trailers, are not built to withstand excessive longitudinal impacts. In order to protect the piggyback trailers, it has been common practice to operate the piggyback cars with special handling which meant avoidance of any switching or humping operation. The growth of piggyback service has more recently necessitated operation of this type of freight hauling in interchange service, which again brings up the problem of impacts in classification yards, with the result that lading damage claims involving piggyback cars and damage to the trailers used in such service have gone up tremendously. My invention enables this service to expand without the consequent damage problem to lading and trailers.

(8) The reduction of end wall pressure which results from the use of my invention has the very useful effect of permitting large door openings on the side of the cars without having them become skewed during impact, which has been a severe problem in the past. The well-known problem of rigid lading bulging out freight car end walls as a result of longitudinal impacts is also eleminated by my invention and solves a long-standing problem in railroad car design.

(9) One of the most amazing results achieved by my invention is the elimination of car bounce and pitch at high speed impacts. For instance, during my tests referred to in connection with FIGURES 16 and 17, I found that the maximum car body vertical movement (measured at its corners), for cushioned travels in excess of about 20 inches, was only .46 inches and this includes the test conditions of FIGURE 23 (32½ inches of cushioned travel at a 14.2 mile per hour impact). This is to be contrasted with test results employing a car provided with what has heretofore been thought to be adequate cushioning wherein moving-picture records show that at impacts on the order of 9 miles per hour, the car body bolsters actually separate from their truck bolsters, indicating a pitching or bouncing movement well in excess of truck spring movement (which averages between 3 and 4 inches for conventional trucks). Since truck spring deflection is always less than car body movement (as measured at the car body corners), it will be seen that my invention achieves striking reductions in car body bounce and pitch on impacts.

(10) The elimination of vertical bounce has another useful effect in eliminating a major cause of hot boxes since it is well known that excessive vertical bouncing enables waste grabs to develop as the journal brass is lifted from the bearing.

(11) When a sliding sill car equipped with my invention is impacted against a standard car at relatively high speed, the struck car is substantially protected against damage due to the cushioning on my car.

It should be understood that the cushioning contemplated by this invention may be interposed at any point between the vehicle load, or its point of connection to the vehicle, and the car coupler, although preferably the arrangement employed should insure that train slack is kept to a minimum. Of course, more than one cushioning device may be employed to give the travel range indicated.

Although the range of cushion travel between 20–40 inches has been emphasized throughout this specification, it is recognized that this range (and the equivalent closure time) are entitled to some leeway on either side on the basis of the present disclosure as indicated, for example, by the fact that at about 18½ inches of travel maximum compaction of cartoned goods is achieved (see FIGURE 22) and at this length of cushion travel the unexpected reduction in lading forces begins to appear. For this reason, it should be understood that the appended claims should be construed as broadly as the prior art will permit, but in speaking of a range of about 20 inches to about 40 inches, or in speaking of equivalent cushion closure times, a variation on either side of the range limits of not more than 7 percent is contemplated as being within the scope of this invention. The 7 percent limitation for equivalents is based upon the fact that the present disclosure reveals that, with respect to the lower end of the range, the unexpected results begin to appear at 18.5 inches of cushion travel, and with respect to the upper end of the range, the entire range shifts upwardly to the extent that the dissipative energy cushion is not 100 percent efficient.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. In a railway freight car adapted to carry a shiftable load thereon, the combination of a car underframe, couplers at each end of the underframe, a load carrying body supported by the underframe and longitudinally movable relative to the couplers, and a cushioning device interposed between the couplers and said body, said cushioning device having energy transferring and dissipating characteristics equivalent to a 100% efficient cushioning mechanism having a cushion travel in one direction within the range from about 20 inches to about 40 inches, and in which, for an impact of 10 miles per hour delivered to one of said couplers by another car, the cushioning device will not close in less than about .23 second, said cushioning device having a cushion stroke length for closing in one direction of not more than about 40 inches.

2. In a railroad vehicle, the combination of a member adapted to receive a load, a supporting structure, mounted on railway trucks, carrying said load receiving member, said member and said structure being connected for relative longitudinal movement therebetween, and a substantially dissipative energy type shock absorbing means interposed between said member and structure, said shock-absorbing means having energy transferring and dissipating characteristics equivalent to a 100% efficient cushioning mechanism having a cushion travel in one direction within the range from about 20 inches to about 40 inches and in which, for an impact of 10 miles per hour delivered to one end of said vehicle by another car thereby setting up forces tending to longitudinally displace said member relative to said supporting structure, said shock-absorbing means will cushion the relative movement between said member and said structure and will not close in less than about .23 second, said shock-absorbing means having a cushion stroke length for closing in one direction of not more than about 40 inches.

3. In a railroad vehicle, the combination of a wheeled railroad car bed, a fifth wheel stand carried by said railroad car bed, said stand being mounted on said bed for movement with respect to said bed longitudinally of said car, and a substantially dissipative energy type shock absorbing means interposed between said bed and said stand, said shock-absorbing means having energy transferring and dissipating characteristics equivalent to a 100% efficient cushioning device having cushion travel in one direction within the range from about 20 inches to about 40 inches and in which, for an impact of 10 miles per hour delivered to one end of said vehicle by another car, the shock-absorbing means will not close in less than about .23 second, said shock-absorbing means having a cushion stroke length for closing in one direction of not more than about 40 inches.

4. In apparatus for transporting freight, the combination of a container provided with a kingpin at the front end thereof, a railroad car adapted to carry the container thereon and provided with retractable brackets at the rear end of the car and a fifth wheel stand at the front end of the car, said fifth wheel stand including means for releasably engaging said container kingpin, and being mounted on said car for longitudinal movement with respect to said car, and a substantially dissipative energy type shock absorbing means interposed between said fifth wheel stand and said car for providing cushioned travel therebetween, said retractable brackets including roller means on which said container rests when mounted on said car for transportation thereby, said shock-absorbing means having energy transferring and dissipating characteristics equivalent to a 100% efficient cushioning device having a cushion travel in one direction within the range from about 20 inches to about 40 inches, and in which, for an impact of 10 miles per hour delivered to one end of said railroad car, said shock-absorbing means will not close in less than about .23 second, said shock-absorbing means having a cushion stroke length for closing in one direction of not more than about 40 inches.

5. A long travel friction type hydraulic cushion device comprising spaced pairs of clamping structures proportioned to receive a portion of a cushion underframe draft and buffing column, each of said clamping structures comprising opposed clamping members pivoted together at like ends and adapted to be received over the column portion in the operative position of the device, spaced beams positioned to extend parallel to said column portion in the operative position of the device, means for securing the other ends of the said members disposed on one side of the device to one of said beams, means for securing the other ends of the said members disposed on the other side of the device to the other of said beams, hydraulic jack means interposed between said beams and positioned to force said clamping structures into clamping engagement with the column, in the operative position of the device, and a hydraulic column motion sensing device in communication with said jack means and including means for closing said clamping structures at the rate required to provide the column with a cushioned travel in the range of twenty to forty inches.

6. An impact absorbing arrangement for protecting a vehicle load, said arrangement comprising spaced elongate members fixed to each other to define a column, said column having oppositely extending ends adapted to receive impacts acting longitudinally thereof, a first pair of lugs carried by said members and aligned transversely of said column, a second pair of lugs carried by said members and aligned transversely of said column, but spaced from said first pair of lugs, a first stop member positioned between said first pair of lugs and in substantial alignment therewith transversely of the column, a second stop member positioned between said second pair of lugs and in substantial alignment therewith transversely of the column, said stop members being spaced apart a distance equivalent to the distance between said pairs of lugs, and being fixed with respect to the vehicle load, and a 100 percent efficient cushion travel cushion device interposed between said pairs of lugs and said stop members respectively, said cushion device having energy transferring and dissipating characteristics equivalent to a 100 percent efficient cushion travel cushioning device having a cushion travel in one direction within the range of from 20 to 40 inches, and in which, for an impact of 10 miles per hour delivered to one end of said column, the cushion device will not close in less than about .23 second, said cushion device having a cushion closure stroke of not more than about 40 inches.

7. A railway freight car adapted to carry lading, said car comprising, in combination, a car underframe, couplers at opposite ends of said underframe, means for transmitting buff and draft forces applied to said couplers from one end of the underframe to the other, means for supporting said underframe for travel over the rails of a track, a lading support member mounted on the car and capable of longitudinal movement relative to the couplers and cushioning means operatively interposed between the couplers and the support member for cushioning impacts delivered to the car through the couplers, said cushioning means being substantially of the 100% efficient dissipative energy type and having a closure time of not less than about .23 of a second for impacts with another car having a relative speed of about 10 miles per hour and a travel distance of not more than about 40 inches.

8. A railway freight car adapted to carry lading and comprising in combination, a car structure having couplers at opposite ends of said structure, means including draft gears operatively connected to said couplers, and located inwardly thereof, for transmitting buff and draft forces applied to said couplers in train operation from one end of the car to the other, means for supporting said structure for travel over the rails of a track, a lading support member carried by said car structure and capable of longitudinal movement relative to said couplers, and cushion means operatively interposed between said buff and draft transmitting means and said lading support member for controlling the forces delivered to said support member when heavy impacts are delivered to one of the couplers, said cushion means being of the dissipative energy type and having energy transferring and dissipating characteristics equivalent to a 100% efficient cushioning device having a cushion stroke, for a given impact causing closure of the device, of from about 20 inches to about 40 inches, said cushion means have a closure time for impacts of 10 miles per hour of not less than about .23 second and a cushion stroke for closing in one direction of not more than about 40 inches.

9. A railway freight car adapted to carry lading and comprising in combination, a car structure having couplers at opposite ends of said structure, means including draft gears operatively connected to said couplers and located inwardly thereof for transmitting buff and draft forces applied to said couplers in train operation from one end of the car to the other, means for supporting said structure for travel over the rails of a track, a lading support member carried by said car structure and capable of longitudinal movement relative to said couplers, and cushion means operatively interposed between said buff and draft transmitting means and said lading support member for controlling the forces delivered to said support member when heavy impacts are delivered to one of the couplers, said cushion means being of the dissipative energy type and having energy transferring and dissipating characteristics equivalent to a 100% efficient cushioning device having a cushion stroke, for a given impact causing closure of the device, of about 30 inches, said cushion means having a closure time for impacts of 10 miles per hour of not less than about .34 second, and a cushion stroke for closing in one direction of not more than about 40 inches.

10. A railroad vehicle comprising a center sill structure provided with bolsters adjacent each end thereof and supported on railroad car trucks, rollers carried by said bolsters and respectively journalled for rotation about horizontal axes that extend transversely of the vehicle, a load supporting body carried by said rollers, said body being mounted on said rollers for movement longitudinally of said center sill structure a distance in either direction in the range of 20 to 40 inches, and a substantially dissipative energy system type cushioning device interposed between said center sill structure and said body, said cushioning device having energy transferring and dissipating characteristics equivalent to a 100% efficient cushioning mechanism having a cushion travel in one direction within the range from about 20 inches to about 40 inches, and in which, for an impact of 10 miles per hour delivered to one of said couplers by another car, the cushioning device will not close in less than about .23 second, said cushioning device having a cushion stroke length for closing in one direction of not more than about 40 inches.

11. A railroad car cushioning arrangement comprising a center sill structure defined by an elongate sill member having a hollow center portion intermediate the ends thereof, spaced lugs carried within said hollow center portion and spaced longitudinally thereof, a dissipative energy type, double acting hydraulic cushion device having two relatively movable members operatively interposed between said lugs, and a load supporting body operatively associated with said center sill structure, said body having secured thereto spaced stop members between which said relatively movable members of the cushion device are also interposed, said body being applied to said center sill structure for movement longitudinally thereof, and resilient means for restoring said cushion device and said body to neutral position, said hydraulic cushion device having energy transferring and dissipating characteristics equivalent to a 100% efficient cushioning mechanism having a cushion travel in one direction within the range from about 20 inches to about 40 inches and in which, for an impact of 10 miles per hour delivered to one end of said sill, the cushion device will not close in less than about .23 second, said hydraulic cushion device having a cushion stroke length for closing in one direction of not more than about 40 inches.

12. For use in a railroad vehicle adapted to carry a load, a cushioning arrangement comprising a sill structure, and a dissipative energy type cushioning means mounted on the sill structure and adapted to be operatively connected between the sill structure and the load for cushioning impact forces acting longitudinally of said structure, said cushioning means having energy transferring and dissipating characteristics equivalent to a 100% efficient cushioning device having a cushon travel in one direction within the range from about 20 inches to about 40 inches, and in which, when said impact forces are of a magnitude to cause closure of said cushioning means, the closure will not occur in less than about .23 second, said cushioning means having a cushion stroke length for closing in one direction of not more than about 40 inches.

13. A railroad car cushioning arrangement comprising a center sill structure over which a load is adapted to be supported with the sill structure being defined by an elongate sill member, hydraulic dissipative energy type cushioning means operatively secured to said sill structure and adapted to be interposed between the sill structure and the load for cushioning impact forces acting longitudinally of said structure over a travel in the range of from about 20 inches to about 40 inches, said cushioning means having substantially constant force-travel characteristics and being further characterized by having a closure time for a 10 mile per hour impact delivered to said sill structure of not less than about .23 second and comprising a hydraulic device including a pair of relatively movable elements and hydraulic means operatively interposed between said elements including orifice means for metering the flow of hydraulic liquid on relative movement of said cushioning device elements under the impetus of said impact forces, and static seal means operatively associated with said elements for hermetically sealing said device against leakage.

14. A railroad car center sill structure comprising an elongate sill member and a bolster structure secured thereto adjacent each end thereof, and cushioning means operatively secured to said sill structure for cushioning impacts applied longitudinally of said structure, said cushioning means being substantially of the 100% efficient dissipative energy type and having a cushioning stroke in the range of from about 20 to about 40 inches, and means for operatively coupling said cushioning means to a load carrying structure that is movable relative to said sill structure longitudinally thereof whereby relative movement between the load carrying structure and the sill structure due to impacts applied against one of them is cushioned within said range by said cushioning means, said cushioning means being further characterized by having a closure time for a 10 mile per hour impact delivered to said sill structure of not less than about .23 second and a cushion stroke length for closing in one direction of not more than about 40 inches.

15. A railroad car cushion underframe comprising a frame structure, a draft and buffing column carried by said frame structure and capable of longitudinal relative movement therebetween, and dissipative energy type cushioning means interposed between said frame structure and said column for providing cushioned travel therebetween, said cushioning means having energy transferring and dissipating characteristics equivalent to a 100% efficient cushioning mechanism having a cushion travel in one direction within the range from about 20 inches to about 40 inches, and in which, for an impact of 10 miles per hour delivered to one end of said draft and buffing column, the cushioning means will not close in less than about .23 second, said cushioning means having a cushion stroke length for closing in one direction of not more than about 40 inches.

16. A railroad vehicle adapted to carry a load and comprising, in combination, a vehicle structure having couplers at opposite ends of said structure and including bed means, longitudinally movable with respect to the couplers, for supporting the load, means for supporting said vehicle structure for travel over the rails of a track, and dissipative energy type cushioning means operatively interposed between the couplers and said bed means, said cushioning means having energy transferring and dissipating characteristics equivalent to a 100% efficient cushioning device having a cushion travel in one direction within the range from about 20 inches to about 40 inches, and in which, for an impact of 10 miles per hour delivered to one of said couplers by another car, the cushioning means will not close in less than about .23 second, said cushioning means having a cushion stroke length for closing in one direction of not more than about 40 inches.

17. In a railway freight car adapted to carry lading including a car structure having couplers at opposite ends of said structure, means for transmitting buff and draft forces applied to said couplers from one end of the car to the other, means for supporting said structure for travel over the rails of a track, and dissipative energy type cushioning means operatively interposed between the couplers and the lading when on the car for cushioning impacts delivered to the car through the couplers, the improvement wherein said cushion means has a cushioning stroke in the range of from about 20 to about 40 inches, has force-travel characteristics which approximate a 100% efficient cushion, and has a closure time, for an impact of 10 miles per hour of not less than about .23 second.

18. In a railway freight car, the combination of an underframe, couplers at opposite ends of the underframe, means for supporting the underframe for movement along the rails of a track, means for supporting lading on the underframe for longitudinal movement relative to the couplers, and cushioning means interposed between said lading supporting means and said couplers for cushioning impacts delivered to the car through the couplers, said cushioning means having energy transferring and dissipating characteristics equivalent to a 100% efficient cushioning device having a cushion travel in one direction within the range from about 20 inches to about 40 inches, and in which, when said impacts are of a magnitude to cause closure of said cushioning means, the closure will not occur in less than about .23 second, said cushioning means having a cushion stroke length for closing in one direction of not more than about 40 inches.

19. In a railway freight car, the combination of an underframe, couplers at opposite ends of the underframe, means for supporting the underframe for movement along the rails of the track, means for connecting lading to the car for longitudinal movement relative to said couplers, and cushioning means interposed between said connecting means and said couplers for cushioning impacts delivered to the car through the couplers, said cushioning means having energy transferring and dissipating characteristics equivalent to a 100% efficient cushioning device having a cushion travel in one direction within the range from about 20 inches to about 40 inches, and in which, when said impacts are of a magnitude to cause closure of said cushioning means, the closure will not occur in less than about .23 second, said cushioning means having a cushion stroke length for closing in one direction of not more than about 40 inches.

20. In a railway freight car adapted to carry resilient lading, the combination of an underframe, couplers at opposite ends of the underframe, means for supporting the underframe for movement along the rails of a track, a lading support mounted on the car and having end walls for limiting longitudinal movement of lading carried on the support when the car is subjected to impacts, resilient lading carried by the support, and cushioning means interposed between said lading support and said couplers for cushioning impacts delivered to the car through the couplers, said cushioning means being of the dissipative energy type and having a closure time of not less than about .23 of a second for impacts with another car having a relative speed of about 10 miles per hour and having a cushion stroke not to exceed about 40 inches, said cushioning means developing force-travel relationships which preclude any sustained peak lading forces over 2000 lbs. per sq. ft. from being applied to the resilient lading at impact speeds of 10 miles per hour.

21. For use in a railway car adapted to carry lading, a car underframe, said underframe having means at each end of the car for reception of a coupler, a cushioning unit mounted on the car underframe and being of the dissipative energy type having a cushioning closure stroke, for a given impact, equivalent to 100% efficient cushioning device having a cushion closure travel within the range of about 20 inches to about 40 inches, means associated with the cushioning unit for receiving buff and draft forces from the couplers, and means also associated with the cushion unit and movable relative to said last named means for transmitting cushion forces to a connection means for lading, said cushioning unit having a closure time for an impact of 10 miles per hour of not less than about .23 second and a cushion stroke length for closing in one direction of not more than about 40 inches.

22. In a railway freight car, the combination of an underframe, couplers at opposite ends of the underframe, means for supporting the underframe for movement along the rails of the track, a lading support mounted on the car and having end walls for limiting longitudinal movement of lading carried on the support when the car is subjected to impacts, resilient lading carried by the support, said support being capable of longitudinal movement relative to the couplers, and cushioning means operatively interposed between said couplers and the lading support for cushioning impacts delivered to the car through said couplers, said cushioning means being of the dissipative energy, substantially constant-force travel type and having a cushioning stroke duration that is at least as great as .23 second for 10 mile per hour impacts, and exceeds the time required for the lading to achieve peak lading forces against said end wall resulting from such impacts, said cushioning stroke being not greater than about 40 inches.

23. The method of protecting lading that is carried on a railway freight car between end walls of a support which is carried on the car and capable of longitudinal movement with respect to a part of the car, and in which the car is subjected to a longitudinal impact with another car at a relative velocity of 10 miles per hour or more thereby being conducive to having damage inflicted to the lading or the end walls or both, said method including substantially eliminating vertical bouncing of the lading due to the impact by dissipating a part of the energy of impact through a dissipative energy system acting over a period of at least .23 of a second and with a travel stroke of not more than about 40 inches, translating substantially all of the residual energy of impact, except that required for recentering the support, into kinetic energy of the lading during such period of at least .23 of a second to cause the ultimate kinetic energy of the lading to be achieved in large measure through frictional forces acting between the lading and the support and while the dissipative energy system is still acting, and recentering the support with respect to said car by utilizing the remainder of said residual energy of impact.

24. In a railroad vehicle, the combination of a member adapted to receive a load, a supporting structure mounted on railway trucks and carrying said load-receiving member, said member and said structure being connected for relative longitudinal movement therebetween, and substantially dissipative energy type shock-absorbing means interposed between said member and structure, said shock-absorbing means having energy transferring and dissipating characteristics equivalent to a 100% efficient cushioning device having a cushion travel in one direction of about 30 inches and in which, for an impact of 10 miles per hour delivered to one end of the vehicle by another car, said shock-absorbing means will not close in less than about .34 second and has a closure travel not in excess of about 40 inches.

25. In a railway freight car, the combination of, a car structure having couplers at opposite ends of such structure, a lading support mounted on the car structure for movement longitudinally thereof, lading carried on the support, means for transmitting buff and draft forces applied to said couplers from one end of the car structure to the other, means for supporting said structure for travel over the rails of a track, and cushioning means operatively interposed between the couplers and the support for cushioning impacts delivered to the car through the couplers and protecting the car and lading from damage at impacts of at least 10 miles per hour, said cushioning means being of the dissipative energy type and having a cushion stroke, for a given impact causing closure of the cushioning means, of from about 20 inches to about 40 inches, said cushioning means having a closure time for 10 miles per hour impacts of not less than about .23 second and force-travel characteristics which approximate a 100% efficient cushion.

26. For use in a railroad vehicle adapted to carry a load, a cushioning arrangement comprising a sill structure, and a dissipated energy type cushioning means mounted on the sill structure and adapted to be operatively connected between the sill structure and the load for cushioning impact forces acting longitudinally of said structure, said cushioning means having a cushion stroke, for impact forces causing closure of the cushioning means, of about 30 inches; a closure time for impacts of 10 miles per hour of not less than about .34 second; and force-travel characteristics which approximate a 100% efficient cushion.

27. In a railway freight car, the combination of an underframe, couplers at opposite ends of the underframe, means for supporting the underframe for movement along the rails of a track, means for supporting lading on the underframe for longitudinal movement relative to the couplers, and cushioning means interposed between said lading supporting means and said couplers for cushioning impacts delivered to the car through the couplers, said cushioning means having energy transferring and dissipating characteristics equivalent to a 100% efficient cushioning device having a cushion stroke, for a given impact causing closure of the device, of about 30 inches, said cushioning means having a closure time for impacts of 10 miles per hour of not less than about .34 second, and a cushion stroke for closing in one direction of not more than about 40 inches.

References Cited in the file of this patent

UNITED STATES PATENTS

| | | |
|---|---|---|
| 240,044 | Shaw | Apr. 12, 1881 |
| 254,917 | Canet | Mar. 14, 1882 |
| 271,478 | Langley | Jan. 30, 1883 |
| 636,126 | Fenton | Oct. 31, 1899 |
| 680,831 | Bachelier | Aug. 20, 1901 |
| 874,150 | Young | Dec. 17, 1907 |
| 916,822 | Young | Mar. 30, 1909 |
| 1,237,088 | Pervelis | Aug. 14, 1917 |
| 1,675,562 | Kellett | July 3, 1928 |
| 1,693,193 | Duryea | Nov. 27, 1928 |
| 1,693,194 | Duryea | Nov. 27, 1928 |
| 1,961,130 | Duryea | June 5, 1934 |
| 2,047,955 | Fitch | July 21, 1936 |
| 2,129,545 | Duryea | Sept. 6, 1938 |
| 2,129,546 | Duryea | Sept. 6, 1938 |

(Other references on following page)

UNITED STATES PATENTS

| | | |
|---|---|---|
| 2,159,622 | Sanford | May 23, 1939 |
| 2,220,101 | Hall | Nov. 5, 1940 |
| 2,256,024 | Hill | Sept. 16, 1941 |
| 2,330,706 | Hankins et al. | Sept. 28, 1943 |
| 2,530,444 | Woods | Nov. 21, 1950 |
| 2,730,968 | Faus | Jan. 17, 1956 |
| 2,764,105 | Stiegel | Sept. 25, 1956 |
| 2,764,299 | Meyer | Sept. 25, 1956 |
| 2,803,353 | Meyer | Aug. 20, 1957 |
| 2,818,982 | McCafferty et al. | Jan. 7, 1958 |
| 2,826,156 | Hall | Mar. 11, 1958 |
| 2,845,878 | Gutridge | Aug. 5, 1958 |
| 2,880,681 | Markestine | Apr. 7, 1959 |
| 2,911,112 | MacCurdy | Nov. 3, 1959 |
| 2,911,113 | MacCurdy | Nov. 3, 1959 |
| 2,960,043 | Clejan | Nov. 15, 1960 |

OTHER REFERENCES

"Sante Fe Builds 100 Shock Control Cars," October 1958, Railway Locomotives & Cars, pages 21 and 22 relied upon. (Copy available in Div. 34.)

"Hydraulic Squeeze to Ease Shocks," July 1957, Railway Freight Traffic, page 21, relied upon. (Copy available in Div. 34.)

UNITED STATES PATENT OFFICE
CERTIFICATION OF CORRECTION

Patent No. 3,003,436 October 10, 1961

William H. Peterson

It is hereby certified that error appears in the above numbered patent requiring correction and that the said Letters Patent should read as corrected below.

Column 7, line 66, after "for" insert -- a --; column 11, line 64, after "of" insert -- a --; column 14, line 71, for "its" read -- it --; column 15, line 12, for "cushioning" read -- cushion --; column 15, lines 28 to 30, the formula should appear as shown below instead of as in the patent:

$$A_x = A_o \sqrt{1 - \frac{x}{d}}$$

column 16, line 37, for "is" read -- it --; line 42, after "lading" insert -- from --; column 18, line 38, beginning with "In other words, and", strike out the entire paragraph ending with "arrangements.", in line 66, same column, and insert the same between lines 74 and 75, same column 18; column 21, in the chart between lines 40 and 65, the bottom two numbers in the 4 M.P.H. impact speed column, for "1,135" and "1,702", respectively, read -- 1.135 -- and -- 1.702 -- respectively; column 24, line 4, for "tests" read -- test --; column 25, line 30, for "sufficient" read -- sufficiently --; line 48, for "Thesse" read -- These --; column 27, line 75, for "surface" read -- surfaces --; column 31, line 16, for "contract" read -- contraction --; column 38, line 9, for "have" read -- having --; column 42, line 31, for "dissipated" read -- dissipative --.

Signed and sealed this 22nd day of May 1962.

(SEAL)
Attest:

ERNEST W. SWIDER
Attesting Officer

DAVID L. LADD
Commissioner of Paten